US006197941B1

(12) United States Patent
Zamponi et al.

(10) Patent No.: US 6,197,941 B1
(45) Date of Patent: Mar. 6, 2001

(54) REACTIVE DYES WITH A HETEROCYCLIC ANCHOR

(75) Inventors: Andrea Zamponi, Didsbury (GB); Manfred Patsch, Wachenheim (DE); Helmut Hagen, Frankenthal (DE); Bernd-Peter Walther, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/269,186

(22) PCT Filed: Sep. 15, 1997

(86) PCT No.: PCT/EP97/05041

§ 371 Date: Mar. 29, 1999

§ 102(e) Date: Mar. 29, 1999

(87) PCT Pub. No.: WO98/14522

PCT Pub. Date: Apr. 9, 1998

(30) Foreign Application Priority Data

Sep. 30, 1996 (GB) .......................................... 196 40 189

(51) Int. Cl.[7] .......................... C09B 62/503; D06P 1/38

(52) U.S. Cl. ......................... 534/618; 534/634; 534/635; 534/641; 544/76; 540/127; 548/125

(58) Field of Search .................................. 534/618, 634, 534/635, 641; 544/76; 540/127; 548/125

(56) References Cited

FOREIGN PATENT DOCUMENTS

| | | |
|---|---|---|
| 2 202 820 | 7/1973 | (DE) . |
| 22 60 827 | 7/1974 | (DE) . |
| 23 08 663 | 8/1974 | (DE) . |
| 31 19 349 A1 | 12/1982 | (DE) . |
| 0 097 465 | 10/1981 | (EP) . |
| 0 311 969 A2 | 4/1989 | (EP) . |
| 0 141 359 B1 | 5/1989 | (EP) . |
| 0 315 046 A2 | 5/1989 | (EP) . |
| 96/03463 | 2/1996 | (WO) . |
| 97/05124 | 2/1997 | (WO) . |
| 97/27248 * | 7/1997 | (WO) . |

* cited by examiner

*Primary Examiner*—Fiona T. Powers
(74) *Attorney, Agent, or Firm*—Oblon, Spivak, McClelland, Maier & Neustadt, P.C.

(57) ABSTRACT

Reactive dyes of the formula I (I)

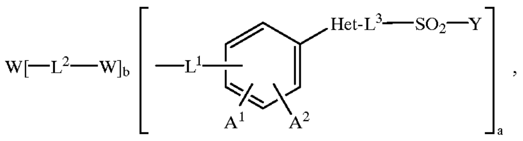

where a is 1 or 2, b is 0 or 1,

Y is vinyl or a radical of the formula $C_2H_4Q$, where Q is an alkali-detachable group, Het is the radical of a 5- or 6-membered aromatic heterocyclic ring having from 1 to 3 hetero atoms selected from the group consisting of oxygen, sulfur and nitrogen, W is either in case 1) the radical of a coupling component, of a monoazo dye or additionally, when b=0, of a disazo dye, which may each bear further fiber-reactive groups, or in case 2) the radical of a chromophore which optionally has further fiber-reactive groups and is derived from an optionally metallized mono- or disazo dye, a triphendioxazine, an anthraquinone, a metallized formazan or a metallized phthalocyanine, and $L^1$ and $L^2$ are each a bridge member, are useful for dyeing or printing hydroxyl-containing or nitrogenous substrates.

8 Claims, No Drawings

REACTIVE DYES WITH A HETEROCYCLIC ANCHOR

The present invention relates to novel reactive dyes of the formula I (I)

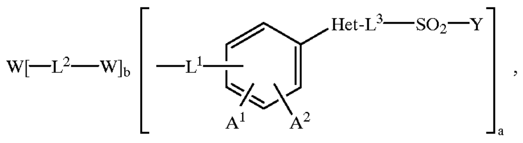

where a is 1 or 2, b is 0 or 1,

Y is vinyl or a radical of the formula $C_2H_4Q$, where Q is an alkali-detachable group, Het is the radical of a 5- or 6-membered aromatic heterocyclic ring having from 1 to 3 hetero atoms selected from the group consisting of oxygen, sulfur and nitrogen, W is either in case 1) the radical of a coupling component, of a monoazo dye or additionally, when b=0, of a disazo dye, which may each bear further fiber-reactive groups, or in case 2) the radical of a chromophore which optionally has further fiber-reactive groups and is derived from an optionally metallized mono- or disazo dye, a triphendioxazine, an anthraquinone, a metallized formazan or a metallized phthalocyanine, $L^1$ is either in case 1) an azo bridge or in case 2) a bridge member of the formula $O_2S—NZ^1$, $OC—NZ^1$, $Z^1N—SO_2$, $Z^1N—CO$, $Z^1N—CO—NZ^2$, $NZ^1$ or

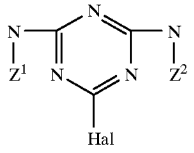

where $Z^1$ and $Z^2$ are independently of each other hydrogen, $C_1$–$C_6$-alkyl or phenyl and Hal is fluorine, chlorine or bromine, or $NZ^1$ or $NZ^2$ also represents 1,4-piperazinediyl, $L^2$ is a radical of the formula

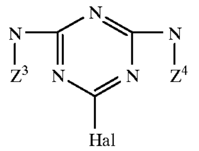

or

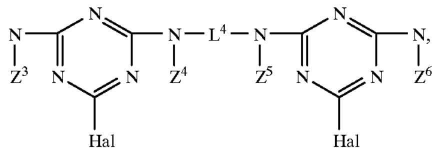

where $Z^3$, $Z^4$, $Z^5$ and $Z^6$ are each independently of the others hydrogen, $C_1$–$C_6$-alkyl or phenyl, $L^4$ is $C_2$–$C_8$-alkylene or unsubstituted or $C_1$–$C_4$-alkyl-, $C_1$–$C_4$-alkoxy- or hydroxysulfonyl-substituted phenylene, and Hal is in each case as defined above, $L^3$ is a direct bond or $C_1$–$C_6$-alkylene with or without interruption by 1 or 2 oxygen or sulfur atoms in ether function or 1 or 2 unadjacent imino, $C_1$–$C_4$-alkylimino or $C_1$–$C_4$-alkanoylimino groups, and $A^1$ and $A^2$ are independently of each other hydrogen, $C_1$–$C_4$-alkyl, $C_1$–$C_4$-alkoxy, halogen, nitro, amino, hydroxysulfonyl or a radical of the formula $L^3—SO_2—Y$, where $L^3$ and Y are each as defined above and also to a process for dyeing and printing hydroxyl-containing or nitrogenous substrates with the novel dyes.

It is an object of the present invention to provide novel reactive dyes having advantageous application properties. The novel dyes shall be especially suitable for the exhaust and cold pad-batch process and shall be notable in particular for high yield, high wetfastness properties and brilliant dyeings. In addition, the unfixed portions shall be easy to wash off.

We have found that this object is achieved by the reactive dyes of the formula I defined at the beginning and also their use for dyeing or printing hydroxyl-containing or nitrogenous organic substrates.

The novel reactive dyes of the formula I are each indicated in the form of the free acid. It will be appreciated that their salts are likewise encompassed by the claims.

Suitable cations are derived from metal or ammonium ions. Metal ions are especially lithium, sodium or potassium ions. Ammonium ions for the purposes of the present invention are substituted or unsubstituted ammonium cations. Examples of substituted ammonium cations are monoalkyl-, dialkyl-, trialkyl-, tetraalkyl- or benzyltrialkylammonium cations or those cations derived from nitrogenous five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is generally straight-chain or branched $C_1$–$C_{20}$-alkyl, which may be substituted by 1 or 2 hydroxyl groups and/or interrupted by from 1 to 4 oxygen atoms in ether function.

In general, all alkyl and alkylene groups mentioned above and appearing in formulae which follow may be straight-chain or branched.

Substituted alkyl radicals preferably contain, unless otherwise stated, 1, 2 or 3 substituents, especially 1 or 2 substituents, in any desired position.

$Z^1$, $Z^2$, $Z^3$, $Z^4$, $Z^5$ and $Z^6$ are each for example methyl, ethyl, propyl, isopropyl, butyl, isobutyl, sec-butyl, tert-butyl, pentyl, isopentyl, neopentyl, tert-pentyl, hexyl or 2-methylpentyl.

$A^1$ and $A^2$ are each for example methyl, ethyl, propyl, isopropyl, butyl, isobutyl, sec-butyl, tert-butyl, methoxy, ethoxy, propoxy, isopropoxy, butoxy, isobutoxy, sec-butoxy, tert-butoxy, fluorine, chlorine or bromine.

$L^3$ and $L^4$ are each for example $(CH_2)_2$, $(CH_2)_3$, $(CH_2)_4$, $CH(CH_3)CH_2$, $CH(CH_3)CH(CH_3)$, $(CH_2)_5$, $(CH_2)_6$.

$L^3$ may also be methylene, $(CH_2)_2O(CH_2)_2$, $(CH_2)_3O(CH_2)_2$, $(CH_2)_2O(CH_2)_2O(CH_2)_2$, $(CH_2)_2S(CH_2)_2$, $(CH_2)_3S(CH_2)_2$, $(CH_2)_2S(CH_2)_2S(CH_2)_2$, $(CH_2)_2NH(CH_2)_2$, $(CH_2)_3NH(CH_2)_2$, $(CH_2)_2NH(CH_2)_2NH(CH_2)_2$,

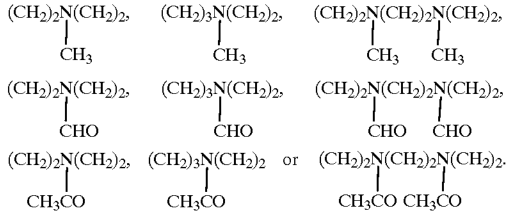

$L^4$ may also be for example $(CH_2)_7$, $(CH_2)_8$, 1,2-, 1,3- or 1,4-phenylene, which may be mono- or disubstituted by methyl, methoxy or hydroxysulfonyl.

Het is the radical of a 5- or 6-membered aromatic heterocyclic ring containing from 1 to 3 heteroatoms selected from the group consisting of oxygen, sulfur and nitrogen.

Suitable heterocyclic parent species, which may bear substituents, for derivations of the Het radicals include for example pyrrole, furan, thiophene, pyrazole, imidazole, oxazole, thiazole, isothiazole, 1,2,4-triazole, 1,2,4-oxadiazole, 1,3,4-oxadiazole, 1,2,4-thiadiazole, 1,3,4-thiadiazole, pyridine, pyridazine, pyrimidine or pyrazine. Suitable substituents include for example $C_1$–$C_4$-alkyl, phenyl, halogen, cyano, carboxyl or $C_1$–$C_4$-alkoxycarbonyl.

Q is an alkali-detachable group. Such groups include for example chlorine, bromine, $C_1$–$C_4$-alkylsulfonyl, phenylsulfonyl, $OSO_3H$, $SSO_3H$, $OP(O)(OH)_2$, $C_1$–$C_4$-alkylsulfonyloxy, phenylsulfonyloxy, $C_1$–$C_4$-alkanoyloxy, $C_1$–$C_4$-dialkylamino or a radical of the formula

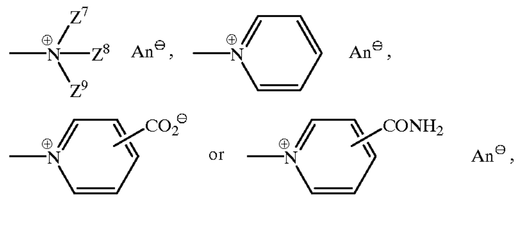

where $Z^7$, $Z^8$ and $Z^9$ are identical or different and each is independently of the others $C_1$–$C_4$-alkyl or benzyl and $An^\ominus$ is in each case one equivalent of an anion. Suitable anions include for example fluoride, chloride, bromide, iodide, mono-, di- or trichloracetate, methanesulfonate, benzenesulfonate or 2- or 4-methylbenzenesulfonate.

When a is 2, the radicals

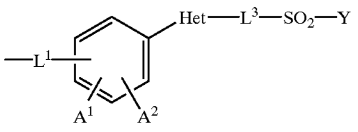

can be identical or different.

When b is 1, the radicals W can likewise be identical or different.

The fiber-reactive group of the formula II (II)

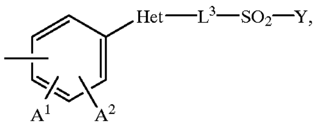

where $A^1$, $A^2$, Het, $L^3$ and Y are each as defined above, will hereinafter be referred to as "E".

Preference is given to reactive dyes of the formula I where $L^3$ is $C_1$–$C_4$-alkylene with or without interruption by one oxyen atom in ether function.

Preference is further given to reactive dyes of the formula I where $A^1$ and $A^2$ are independently of each other hydrogen, nitro, amino, hydroxysulfonyl or a radical of the formula $SO_2C_2H_4OSO_3H$. Preferred substituents $A^1$ and/or $A^2$ are in particular hydrogen and hydroxysulfonyl.

Preference is further given to reactive dyes of the formula I where Het is the radical of a 5-membered heterocycle. Emphasis is given in this connection to those radicals which have 3 heteroatoms, in particular those which are derived from 1,3,4-oxadiazole, 1,2,4-thiadiazole or 1,3,4-thiadiazole, especially 1,2,4-oxadiazole-3,5-diyl.

Preference is further given to reactive dyes of the formula I where Y is a radical of the formula —$C_2H_4SSO_3H$, —$C_2H_4Cl$, —$C_2H_4OCOCH_3$ and also in particular —$C_2H_4OSO_3H$ or vinyl. Particular technical interest pertains to the fiber-reactive groups of the formula IIa or IIb (IIa)

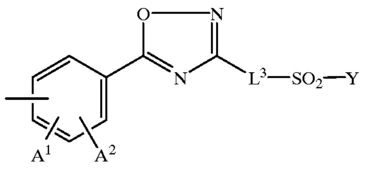

(IIb)

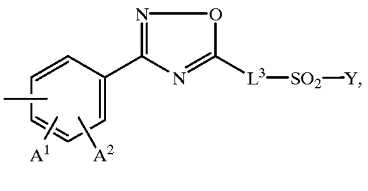

where $A^1$ and $A^2$ are independently of each other hydrogen, nitro, amino, hydroxysulfonyl or a radical of the formula $SO_2C_2H_4OSO_3H$, $L^3$ is $C_1$–$C_4$-alkylene, and Y is as defined above.

Preference is further given to reactive dyes of the formula I where $L^1$ is a bridge member of the formula

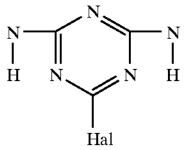

in case 2).

Preference is further given to reactive dyes of the formula I where $L^1$ is ortho-disposed to the heterocycle in case 1).

Preference is additionally given to dyes of the formula I where the substituents are selected from a combination of the above-recited preferred substituents.

The $SO_2Y$ radicals are aliphatic fiber-reactive groups as distinct from heterocyclic fiber-reactive groups. Fiber-reactive groups are the groups which react with the hydroxyl or nitrogenous groups of the substrates substitutively or additively.

Substitutive reaction of the fiber-reactive group with the relevant groups in the substrates, for example with the hydroxyl groups of cellulose, means that the leaving groups or atoms (e.g. fluorine or chlorine) in the fiber-reactive group are substitutively replaced by the hydroxyl groups of the cellulose as per the following scheme:

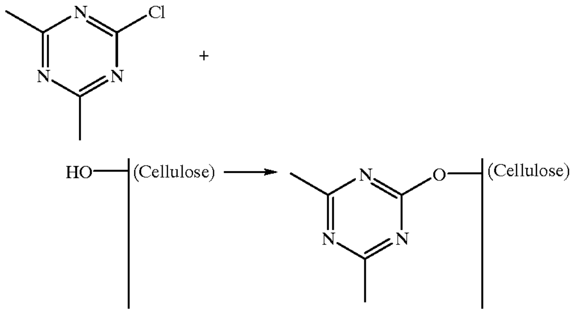

Additive reaction of the fiber-reactive group with the relevant groups in the substrates, for example with the hydroxyl groups of cellulose, means that the hydroxyl groups of the cellulose undergo an addition reaction with the fiber-reactive group as per the following scheme:

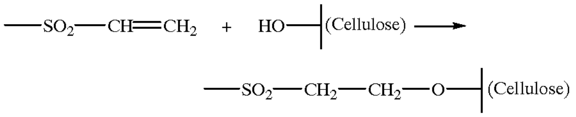

Examples of heterocyclic fiber-reactive groups are halogen-substituted radicals derived from 1,3,5-triazine, quinoxaline, phthalazine, pyrimidine, pyridazine or 2-alkylsulfonyl benzothiazole as heterocyclic parent species.

The following heterocyclic radicals are particularly suitable:

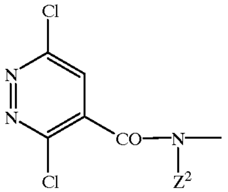

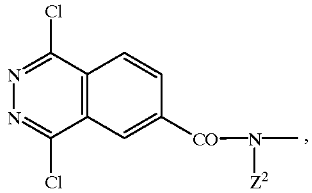

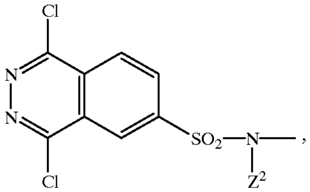

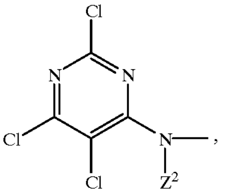

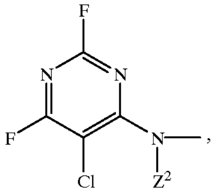

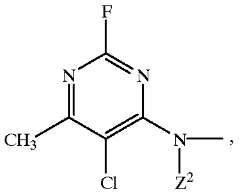

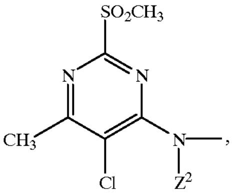

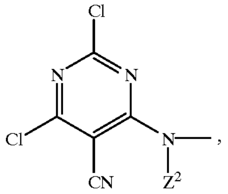

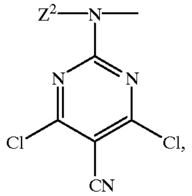

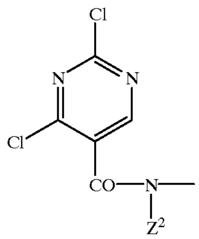

,

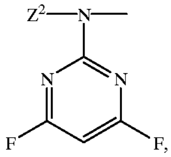

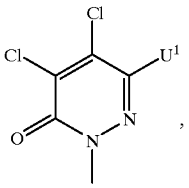

,

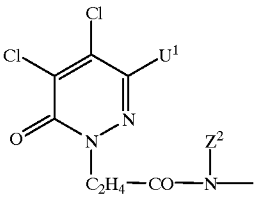

,

-continued

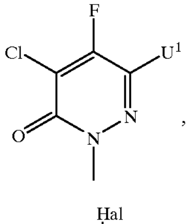

,

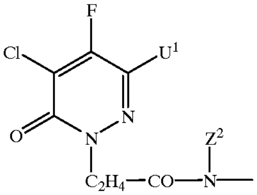

,

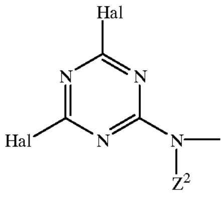

,

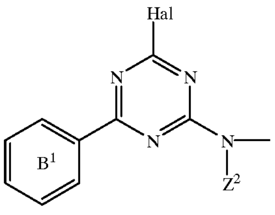

,

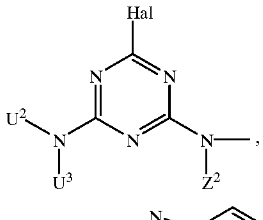

,

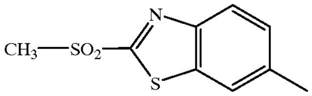

or

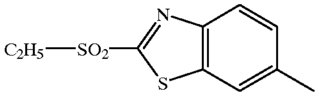

, where $Z^2$ and Hal are each as defined above, $U^1$ is hydrogen or nitro, and $U^2$ and $U^3$ are independently hydrogen or $C_1$–$C_6$-alkyl with or without substitution by hydroxyl, halogen, cyano, hydroxy-sulfonyl or a radical of the formula —$SO_2$—Y, where Y is as defined above, and in each case with or without interruption by 1 or 2 oxygen atoms in ether function, imino or $C_1$–$C_4$-alkylimino groups, or $U^2$ and $U^3$ are together with the linking nitrogen atom pyrrolidinyl, piperidinyl, morpholinyl, piperazinyl or N-($C_1$–$C_4$-alkyl) piperazinyl, or $U^2$ can also be a radical of the formula

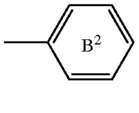

, and the rings $B^1$ and $B^2$ may each be mono- or disubstituted by hydroxysulfonyl and/or benzofused, and the ring $B^2$ may independently be mono- or disubstituted by chlorine, nitro, $C_1$–$C_4$-alkyl, $C_1$–$C_4$-alkoxy, cyano, carboxyl, acetylamino, hydroxysulfonylmethyl or a radical of the formula $CH_2$—$SO_2$—Y, $SO_2$—Y, NH—CO—Y or $NU^2$—CO—$NU^2$—$L^5$—$SO_2$—Y, where Y and $U^2$ are each as defined above and $L^5$ is $C_2$–$C_6$-alkylene with or without substitution by hydroxyl, chlorine, cyano, carboxyl, $C_1$–$C_4$-alkoxycarbonyl, $C_1$–$C_4$-alkanoyloxy or sulfato with or without interruption by 1 or 2 oxygen atoms in ether function or imino or $C_1$–$C_4$-alkylimino groups.

Fiber-reactive groups of the aliphatic series include for example acryloyl, mono-, di- or trichloroacryloyl, mono-, di- or tri-bromoacryloyl, —CO—CCl═CH—COOH, —CO—CH═CCl—COOH, 2-chloropropionyl, 1,2-dichloropropionyl, 1,2-dibromopropionyl, 3-phenylsulfonylpropionyl, 3-methylsulfonylpropionyl, 2-sulfatoethylaminosulfonyl, 2-chloro-2,3,3-trifluorocyclobutylcarbonyl, 2,2,3,3-tetrafluorocyclobutylcarbonyl, 2,2,3,3-tetrafluorocyclobutylsulfonyl, 2-(2,2,3,3-tetrafluorocyclobutyl)acryloyl, 1- or 2-alkyl- or 1- or 2-arylsulfonylacryloyl, such as 1- or 2-methylsulfonylacryloyl, or a radical of the formula $SO_2$—Y, CONH—$L^6$—$SO_2$—Y or NHCONH—$L^6$—$SO_2$—Y, where Y is as defined above and $L^6$ is $C_1$–$C_4$-alkylene or phenylene.

W in the formula I is in case 1) for example the radical of a coupling component, of a monoazo dye or additionally, when b=0, of a disazo dye which optionally has additional reactive groups. In this case, the fiber-reactive group E is linked to the radical W via an azo bridge (—N═N—). If W is a monoazo dye, its coupling component will be linked to the fiber-reactive group E via an azo bridge. Correspondingly, if W is a disazo dye, coupling takes place onto its diazo component.

Dyes of this class conform for example to the formula IIIa, IIIb, IIIc or IIId $$(E—N═N—)_aK \quad \text{(IIIa)}$$

$$E—N═N—K—N═N—D \quad \text{(IIIb)}$$

$$E—N═N—(D—N═N—K)—N═N—D \quad \text{(IIIc)}$$

$$(E—N═N—)_2(K—N═N—D) \quad \text{(IIId)}$$

where K is the radical of a coupling component, D is the radical of a diazo component, a is 1 or 2 and E is as defined above. If, in the formulae IIIa and IIId, the radical E occurs twice (a=2), then the radicals E can be either identical or different from each other. Similarly, the radicals D can be identical or different in formula IIIc.

Useful dyes of this class are for example water-soluble azo dyes, especially monoazo dyes of the formula IIIa (a=1), disazo dyes of the formula IIIa (a=2) or IIIb or trisazo dyes of the formulae IIIc or IIId which have hydroxysulfonyl and/or carboxyl groups. Important coupling components HK are derived for example from compounds of the benzene, naphthalene, pyrazole, pyridine, pyrimidine, indole or N-arylacetoacetamide series.

Important diazo components D—$NH_2$ are derived for example from compounds of the aniline or aminonaphthalene series. It is possible to use them as coupling components at the same time. So the terms diazo and coupling component are not mandatory for the preparative process, but merely reflect one possible process.

W in the formula I is further for example, in case 2), the optionally metallized radical of an azo dye. Suitable azo dyes from which such radicals are derived are known per se and have been described in large numbers, for example in K. Venkataraman, The Chemistry of Synthetic Dyes, Vol. VI, Academic Press, New York, London, 1972. The azo dyes conform to the formula V $$D—N=N—K(—N=N—D)_1 \quad (V),$$

where D is the radical of a diazo component, K is the radical of a coupling component and 1 is 0 or 1 and where, when 1 is 1, the radicals D are identical or different from each other.

Useful dyes from which the radical W is derived include for example water-soluble azo dyes, especially monoazo dyes of the formula V (1=0) which may have hydroxysulfonyl and/or carboxyl groups.

The radical W is preferably derived from unmetallized azo dyes, especially from those containing sulfonic acid and/or carboxyl groups, of which those having from 1 to 6 sulfonic acid groups are particularly to be emphasized.

Important azo dyes from which the radical W is derived not only in case 1) but also in case 2) are for example those of the phenyl-azo-naphthalene, phenyl-azo-1-phenylpyrazol-5-one, phenyl-azo-benzene, naphthyl-azo-benzene, phenyl-azo-aminonaphthalene, naphthyl-azo-naphthalene, naphthyl-azo-1-phenylpyrazol-5-one, phenyl-azo-pyridone, phenyl-azo-aminopyridine, naphthyl-azo-pyridone, naphthyl-azo-aminopyridine or stilbyl-azo-benzene series.

Radicals $D^1$ of diazo components of the aniline or aminonaphthalene series which do not bear fiber-reactive groups are derived for example from amines of the formulae VIa–f (VIa)

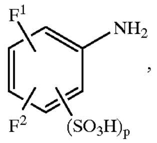

, (VIb)

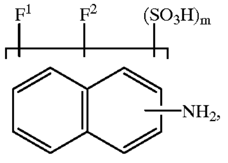

(VIc)

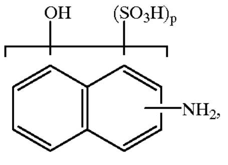

(VId)

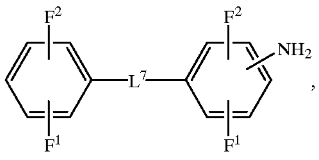

, (VIe)

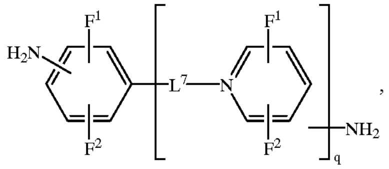

,

-continued (VIf)

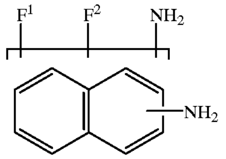

where m is 0, 1, 2 or 3, p is 0, 1 or 2, q is 0 or 1, $F^1$ is hydrogen, $C_1$–$C_4$-alkyl, $C_1$–$C_4$-alkoxy, acetyl, cyano, carboxyl, hydroxysulfonyl, $C_1$–$C_4$-alkoxycarbonyl, hydroxyl, carbamoyl, mono- or di-($C_1$–$C_4$)-alkylcarbamoyl, fluorine, chlorine, bromine or trifluoromethyl, $F^2$ is hydrogen, $C_1$–$C_4$-alkyl, $C_1$–$C_4$-alkoxy, cyano, carboxyl, hydroxysulfonyl, hydroxysulfonylmethyl, acetylamino, $C_1$–$C_4$-alkoxycarbonyl, carbamoyl, mono- or di- ($C_1$–$C_4$)alkylcarbamoyl, fluorine, chlorine, nitro, sulfamoyl, $C_1$–$C_4$-mono- or dialkylsulfamoyl, $C_1$–$C_4$-alkylsulfonyl, phenylsulfonyl or phenoxy and $L^7$ is a direct bond, oxygen, sulfur or a radical of the formula —NHCO—, —NHCONH—, —CONH—, —CO—, —$NHSO_2$—, —$SO_2NH$—, —$SO_2$—, —CH=CH—, —$CH_2$—$CH_2$—, —$CH_2$—, —NH—, or —N=N—.

Preference is given to those components in which $F^1$ is hydrogen, methyl, methoxy, carboxyl, hydroxysulfonyl, hydroxyl or chlorine, $F^2$ is hydrogen, methyl, methoxy, carboxyl, hydroxysulfonyl, acetylamino or chlorine, and $L^7$ is a radical of the formula —CO—, —$SO_2$—, —CH=CH—, —$CH_2$—$CH_2$—, —$CH_2$— or —N=N—.

Aromatic amines suitable for use as diazo components and conforming to the formula VIa, VIb, VIc or VId include for example aniline, 2-methoxyaniline, 2-methylaniline, 4-chloro-2-aminoanisole, 4-methylaniline, 4-methoxyaniline, 2-methoxy5-methylaniline, 2,5-dimethoxyaniline, 2,5-dimethylaniline, 2,4-dimethylaniline, 2,5-diethoxyaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-phenylsulfonylaniline, 2-ethoxy-1-naphthylamine, 1-naphthylamine, 2-naphthylamine, 4-methylsulfonylaniline, 2,4-dichloroanilin-5-carboxylic acid, 2-aminobenzoic acid, 4-aminobenzoic acid, 3-aminobenzoic acid, 3-chloroaniline-6-carboxylic acid, aniline-2- or -3- or -4-sulfonic acid, aniline-2,5-disulfonic acid, anilin-2,4-disulfonic acid, aniline-3,5-disulfonic acid, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-hydroxysulfonyl-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3- or -4-sulfonic acid, 3-acetyl-aminoaniline-6-sulfonic acid, 4-acetyl-aminoaniline-2-sulfonic acid, 1-aminonaphthalene-4- sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5- or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 1-hydroxy-2-aminonaphthalene-5,8- or -4,6-disulfonic acid, 4-aminodiphenylamine, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4-(6'-hydroxysulfonylnaphthylazo)-1-aminonaphthalene, 4-(2',5'-dihydroxysulfonylphenylazo)-1-aminonaphthalene, 4'-amino-3'-methyl-3-nitrobenzophenone, 4-aminobenzophenone, 4-(4'-aminophenylazo)-benzenesulfonic acid, 4-(4'-amino-3'-methoxyphenylazo) benzenesulfonic acid or 2-ethoxy-1-naphthylamine-6-sulfonic acid.

Aromatic diamines suitable for use as tetrazo components or else for doubling (e.g. with cyanuric chloride) and conforming to the formula VIe or VIf include for example 1,3-diamino-benzene, 1,3-diaminobenzene-4-sulfonic acid, 1,4-diamino-benzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzen sulfonic acid, 1,3-diamino-5-methylbenzene, 1,6-diaminonaphthalene-4-sulfonic acid, 2,6-diaminonaphthalene-4,8-disulfonic acid, 3,3'-diaminodiphenyl sulfone, 4,4'-diaminodiphenyl sulfone, 4,4'-diaminostilbene-2,2'-disulfonic acid, 2,2'-diaminodiphenyl sulfone, 2,2'-sulfonyldiaminobiphenyl-4,5-disulfonic acid, 4,4'-diamino-benzophenone, 4,4'-diamino-3,3'-dinitrobenzophenone, 3,3'-diamino-4,4'-dichlorobenzophenone, 4,4'- or 3,3'-diaminodiphenyl, 4,4'-diamino-3,3'-dichlorodiphenyl, 4,4'-diamino-3,3'-dimethoxy- or -3,3'-dimethyl- or -2,2'-dimethyl- or -2,2'-dichloro or -3,3'-diethoxy-biphenyl, 4,4'-diamino-3,3'-dimethyl-6,6'-dinitrobiphenyl, 4,4'-diaminobiphenyl-2,2'- or -3,3'-disulfonic acid, 4,4'-diamino-3,3'-dimethyl- or -3,3'-dimethoxy- or -2,2'-dimethoxy-biphenyl-6,6'-disulfonic acid, 4,4'-diamino-2,2',5,5'-tetrachlorobiphenyl, 4,4'-diamino-3,3'-dinitrobiphenyl, 4,4'-diamino-2,2'-dichloro-5,5'-dimethoxybiphenyl, 4,4'-diamino-biphenyl-2,2'- or -3,3'-dicarboxylic acid, 4,4'-diamino-3,3'-dimethylbiphenyl-5,5'-disulfonic acid, 4,4'-diamino-2-nitrobiphenyl, 4,4'-diamino-3-ethoxy- or -3-hydroxy-sulfonylbiphenyl, 4,4'-diamino-3,3'-dimethylbiphenyl-5-sulfonic acid, 4,4'-diaminodiphenylmethane, 4,4'-diamino-3,3'-dimethyldiphenylmethane, 4,4'-diamino-2,2',3,3'-tetramethyldiphenylmethane, 4,4'-diaminodiphenylethane, 4,4'-diaminostilbene or 4,4'-diaminodiphenylmethane-3,3'-dicarboxylic acid.

Aromatic radicals $D^2$ of diazo components of the aniline or aminonaphthalene series which bear further fiber-reactive radicals are derived for example from amines of the formulae VIIa–c (VIIa)

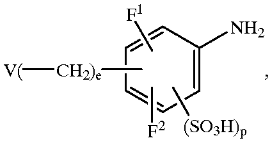

(VIIb)

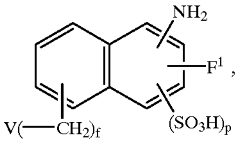

(VIIc)

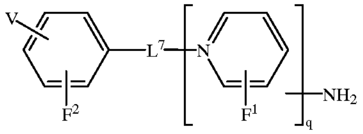

where $F^1$, $F^2$, p, q and $L^7$ are each as defined above, e and f are identical or different and each is independently of the other 0 or 1, and V is a fiber-reactive radical.

Fiber-reactive radicals V are derived for example from the radical E or are, as observed above, heterocyclic or aliphatic fiber-reactive radicals.

Aromatic amines which form the basis of the derivatives of the formula VIIa, VIIb or VIIc which have a fiber-reactive radical V include for example 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diaminonaphth2-ol-4-sulfonic acid, 1,6-diaminonaphthalene-4-sulfonic acid, 2,6-diaminonaphthalene-4,8-disulfonic acid, 2,6-diaminonaphth-1-ol-4,8-disulfonic acid, 1,3-diaminobenzene-5-sulfonic acid, 1,3-diamino-5-methylbenzene, 2,6-diaminophenol-4-sulfonic acid, 5-aminomethyl-2-aminonaphthalene-1-sulfonic acid, 5-(N-methylaminomethyl)-2-aminonaphthalene-1-sulfonic acid, 4,4'-diaminostilbene-3,3'-dicarboxylic acid, 4-(N-methylamino-methyl)aniline-2-sulfonic acid or 3-(N-methylaminomethyl)-aniline-6-sulfonic acid.

The radicals K of the coupling component are preferably selected from the benzene, naphthalene, pyrazole, pyridine, pyrimidine, indole or N-arylacetoacetamide series and may also bear fiber-reactive groups.

Coupling components free of fiber-reactive groups are preferably compounds of the naphthalene, aniline, pyrazolone, aminopyrazole, 2,6-diaminopyridine, pyridone, hydroxypyrimidine, indole, N-aryl-acetoacetamide series and correspond for example to the compounds of the formulae VIII a–m (VIIIa)

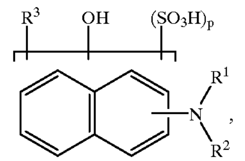

(VIIIb)

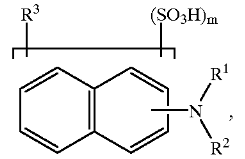

(VIIIc)

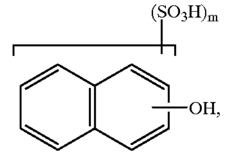

(VIIId)

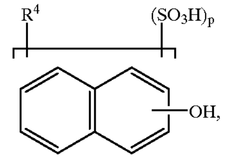

(VIIIe)

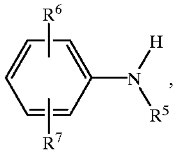

(VIIIf)

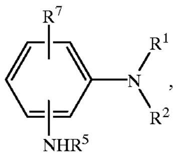

(VIIIg)

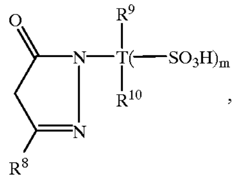

(VIIIh)

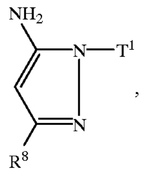

-continued (VIIIj)

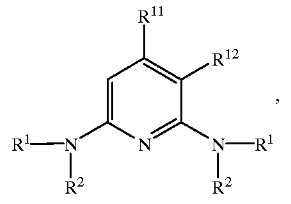

(VIIIk)

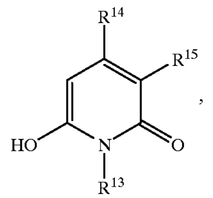

(VIIIl)

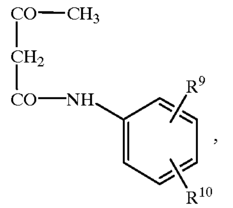

(VIIIm)

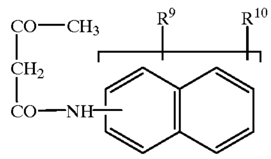

where m is 0, 1, 2 or 3, p is 0, 1 or 2, $R^1$ is hydrogen or $C_1$–$C_4$-alkyl or unsubstituted or hydroxyl-, cyano-, carboxyl-, hydroxysulfonyl-, sulfato-, methoxycarbonyl-, ethoxycarbonyl- or acetoxy-substituted, $R^2$ is hydrogen, $C_1$–$C_4$-alkyl, unsubstituted or hydroxyl-, cyano-, carboxyl-, hydroxysulfonyl-, sulfato-, methoxycarbonyl-, ethoxycarbonyl- or acetoxy-substituted, benzyl or unsubstituted or $C_1$–$C_4$-alkyl, $C_1$–$C_4$-alkoxy-, chlorine- or hydroxysulfonyl-substituted phenyl, $R^3$ is hydrogen or unsubstituted or hydroxysulfonyl- or carboxyl-substituted $C_1$–$C_4$-alkyl, $R^4$ is $C_1$–$C_6$-alkylureido, phenylureido, unsubstituted or chlorine-, methyl-, methoxy-, nitro-, hydroxysulfonyl- or carboxyl-substituted, $C_1$–$C_6$-alkanoylamino, unsubstituted or hydroxysulfonyl- or chlorine-substituted, cyclohexylcarbonylamino, benzoylamino, unsubstituted or chlorine-, methyl-, methoxy-, nitro-, hydroxysulfonyl- or carboxyl-substituted, or hydroxyl, $R^5$ is hydrogen, $C_1$–$C_6$-alkyl, especially $C_1$–$C_4$-alkyl, both unsubstituted or phenyl-, $C_1$–$C_4$-alkoxy-, hydroxyl-, phenoxy- or $C_1$–$C_4$-alkanoyloxysubstituted, $C_5$–$C_7$-cycloalkyl, hydroxysulfonylphenyl, $C_1$–$C_4$-alkanoyl, carbamoyl, mono- or di- $(C_1$–$C_4)$-alkylcarbamoyl, phenylcarbamoyl or cyclohexylcarbamoyl, $R^6$ is $C_1$–$C_4$-alkoxy, chlorine, bromine, hydroxysulfonyl, $C_1$–$C_4$-alkanoylamino, amino, ureido, methylsulfonylamino, ethylsulfonylamino, dimethylaminosulfonylamino, methylamino, ethylamino, dimethylamino or diethylamino $R^7$ is hydrogen, $C_1$–$C_4$-alkyl, $C_1$–$C_4$-alkoxy, hydroxysulfonyl, chlorine or bromine, T is the radical of a benzene or naphthalene ring, $T^1$ is $C_1$–$C_4$-alkyl, cyclohexyl, benzyl or unsubstituted or fluorine-, chlorine-, bromine-, methoxy-, nitro-, hydroxysulfonyl-, carboxyl-, acetyl-, acetylamino-, methylsulfonyl-, sulfamoyl- or carbamoyl-monosubstituted, -disubstituted or -trisubstituted phenyl, $R^8$ is methyl, carboxyl, $C_1$–$C_4$-alkoxycarbonyl or phenyl, $R^9$ is hydrogen, $C_1$–$C_4$-alkyl, $C_1$–$C_4$-alkoxy, acetyl, cyano, carboxyl, hydroxysulfonyl, $C_1$–$C_4$-alkoxycarbonyl, hydroxyl, carbamoyl, mono- or di-$C_1$–$C_4$-alkylcarbamoyl, fluorine, chlorine, bromine or trifluoromethyl, $R^{10}$ is hydrogen, $C_1$–$C_4$-alkyl, $C_1$–$C_4$-alkoxy, cyano, carboxyl, hydroxysulfonyl, acetylamino, $C_1$–$C_4$-alkoxycarbonyl, carbamoyl, mono- or di-$(C_1$–$C_4)$-alkylcarbamoyl, fluorine, chlorine, nitro, sulfamoyl, mono- or di-$(C_1$–$C_4)$-alkylsulfamoyl, $C_1$–$C_4$-alkylsulfonyl, phenylsulfonyl or phenoxy, $R^{11}$ is hydrogen or unsubstituted or $C_1$–$C_4$-alkoxy-, or cyano-substituted $C_1$–$C_4$-alkyl, $R^{12}$ is hydrogen, methyl, hydroxysulfonylmethyl, hydroxysulfonyl, cyano or carbamoyl, $R^{13}$ is hydrogen, $C_1$–$C_4$-alkyl, unsubstituted or phenyl-, hydroxysulfonylphenyl-, hydroxyl-, amino-, $C_1$–$C_4$-alkoxy-, carboxyl-, hydroxysulfonyl-, acetylamino-, benzoylamino- or cyano-substituted, cyclohexyl, phenyl, unsubstituted or carboxyl-, hydroxysulfonyl-, benzoylamino-, acetylamino-, methyl-, methoxy-, cyano- or chlorine-substituted, or phenyl-, $C_1$–$C_4$-alkyl-, $C_1$–$C_4$-alkanoyl- or benzoyl-substituted amino, $R^{14}$ is hydrogen, $C_1$–$C_4$-alkyl, phenyl, hydroxyl, cyano, acetyl, benzoyl, carboxyl, methoxycarbonyl, carbamoyl or hydroxysulfonylmethyl and $R^{15}$ is hydrogen, chlorine, bromine, acetylamino, amino, nitro, hydroxysulfonyl, sulfamoyl, methylsulfonyl, phenylsulfonyl, carboxyl, $C_1$–$C_4$-alkoxycarbonyl, $C_1$–$C_4$-alkanoyl, benzoyl, carbamoyl, cyano or hydroxysulfonylmethyl.

$U^2$, $U^3$, $F^1$, $F^2$, $R^1$, $R^2$, $R^3$, $R^5$, $R^7$, $T^1$, $R^9$, $R^{10}$, $R^{11}$, $R^{13}$ and $R^{14}$ and also the below-described radicals $G^3$, $G^5$, $G^{12}$ and $G^{13}$ are each for example methyl, ethyl, propyl, isopropyl, butyl, isobutyl, sec-butyl or tert-butyl.

$U^2$, $U^3$ and $R^5$ may each also be pentyl, isopentyl, neopentyl, tert-pentyl, hexyl or 2-methylpentyl.

$U^2$, $U^3$, $R^1$, $R^2$, $R^5$ and $R^{13}$ are each hydroxy-$C_1$–$C_4$-alkyl such as hydroxymethyl, 1-hydroxyeth-1-yl, 2-hydroxyeth-1-yl, 1-hydroxyprop-1-yl, 2-hydroxyprop-1-yl, 3-hydroxyprop-1-yl, 1-hydroxyprop-2-yl, 2-hydroxyprop-2-yl, 1-hydroxybut-1-yl, 2-hydroxybut-1-yl, 3-hydroxybut-1-yl, 4-hydroxybut-1-yl, 1-hydroxybut-2-yl, 2-hydroxybut-2-yl, 1-hydroxybut-3-yl, 2-hydroxybut-3-yl, 1-hydroxy-2-methylprop-3-yl, 2-hydroxy-2-methylprop-3-yl, 3-hydroxy-2-methylprop-3-yl, or 2-hydroxymethylprop-2-yl.

$U^2$, $U^3$, $R^1$, $R^2$, $R^{11}$ and $R^{13}$ may each also be for example cyanomethyl, cyanoethyl, cyanopropyl or cyanobutyl.

$R^1$, $R^2$, $R^3$ and $R^{13}$ are each for example carboxymethyl, carboxyethyl, 2- or 3-carboxypropyl or 2- or 4-carboxybutyl.

$U^2$, $U^3$, $R^1$, $R^2$ and $R^3$ may each also be for example hydroxysulfonylmethyl, 2-hydroxysulfonylethyl, 2- or 3-hydroxysulfonylpropyl, 2- or 4-hydroxysulfonylbutyl.

$R^1$ and $R^2$ may each also be for example 2-sulfatoethyl, 2- or 3-sulfatopropyl, 2- or 4-sulfatobutyl, methoxycarbonylmethyl, 2-methoxycarbonylethyl, 2- or 3-methoxycarbonylpropyl, 2- or 4-methoxycarbonylbutyl, ethoxycarbonylmethyl, 2-ethoxycarbonylethyl, 2- or 3-ethoxycarbonylpropyl, 2- or 4-ethoxycarbonylbutyl, acetoxymethyl, 2-acetoxyethyl, 2- or 3-acetoxypropyl, 2- or 4-acetoxybutyl.

$R^2$ may also be for example 2-, 3- or 4-methylphenyl, 2-, 3- or 4-ethylphenyl, 2-, 3- or 4-propylphenyl, 2,- 3- or 4-isopropylphenyl, 2-, 3- or 4-butylphenyl, 2-, 3- or 4-isobutylphenyl, 2-, 3- or 4-sec-butylphenyl, 2-, 3- or 4-tert-butylphenyl, 2-, 3- or 4-methoxyphenyl, 2-, 3- or 4-ethoxyphenyl, 2-, 3- or 4-propyloxyphenyl, 2-, 3- or 4-isopropyloxyphenyl, 2-, 3- or 4-butyloxyphenyl, 2-, 3- or 4-isobutyloxyphenyl, 2-, 3- or 4-sec-butyloxyphenyl, 2-, 3- or 4-tert-butyloxyphenyl, 2-, 3- or 4-chlorophenyl.

$R^2$, $R^5$ and $T^1$ may each also be for example 2-, 3- or 4-hydroxysulfonylphenyl.

$R^4$ is for example methylureido, ethylureido, propylureido, butylureido, pentylureido, hexylureido, formylamino, acetylamino, propionylamino, butyrylamino, isopropylcarbonylamino, valerylamino, isobutylcarbonylamino, sec-butylcarbonylamino, tert-butylcarbonylamino, pentylcarbonylamino.

$R^5$ and $R^{13}$ are each for example benzyl, 1-phenylethyl, 2-phenylethyl, 1-phenylprop-1-yl, 2-phenylprop-1-yl, 3-phenylprop-1-yl, 1-phenylbut-1-yl, 2-phenylbut-1-yl, 3-phenylbut-1-yl, 4-phenylbut-1-yl, 1-phenylbut-2-yl, 2-phenylbut-2-yl, 3-phenylbut-2-yl, 3-phenylbut-2-yl, 4-phenylbut-2-yl, 1-(phenylmethyl)-eth-1-yl, 1-(phenylmethyl)-1-(methyl)-eth-1-yl or 1-(phenylmethyl)-prop-1-yl, preferably benzyl or 2-phenylethyl.

$R^5$, $R^{11}$ and $R^{13}$ may each also be for example methoxymethyl, ethoxymethyl, n-propoxymethyl, (1-methylethoxy)methyl, n-butoxymethyl, (1-methylpropoxy)methyl, (2-methylpropoxy)methyl, (1,1-dimethylethoxy)methyl, 2-(methoxy)ethyl, 2-(ethoxy)ethyl, 2-(n-propoxy)ethyl, 2-(1-methoxyethoxy)ethyl, 2-(n-butoxy)ethyl, 2-(1-methoxypropoxy)ethyl, 2-(2-methylpropoxy)ethyl, 2-(1,1-dimethylethoxy)ethyl, 2-(methoxy)propyl, 2-(ethoxy)propyl, 2-(n-propoxy)propyl, 2-(1-methylethoxy)propyl, 2-(n-butoxy)-propyl, 2-(1-methylpropoxy)propyl, 2-(2-methylpropoxy)propyl, 2-(1,1-dimethylethoxy)propyl, 3-(methoxy)propyl, 3-(ethoxy)-propyl, 3-(n-propoxy)propyl, 3-(1-methylethoxy)propyl, 3-(n-butoxy)propyl, 3-(1-methylpropoxy)propyl, 3-(2-methylpropoxy)propyl, 3-(1,1-dimethylethoxy)propyl, 2-(methoxy)butyl, 2-(ethoxy)butyl, 2-(n-propoxy)butyl, 2-(1-methylethoxy)butyl, 2-(n-butoxy)butyl, 2-(1-methylpropoxy)butyl, 2-(2-methylpropoxy)butyl, 2-(1,1-dimethylethoxy)butyl, 3-(methoxy)butyl, 3-(ethoxy)butyl, 3-(n-propoxy)butyl, 3-(1-methylethoxy)butyl, 3-(n-butoxy) butyl, 3-(1-methylpropoxy)butyl, 3-(2-methylpropoxy) butyl, 3-(1,1-dimethylethoxy)butyl, 4-(methoxy)butyl, 4-(ethoxy)butyl, 4-(n-propoxy)butyl, 4-(1-methylethoxy) butyl, 4-(n-butoxy)butyl, 4-(1-methylpropoxy)butyl, 4-(2-methylpropoxy)butyl or 4-(1,1-dimethylethoxy)butyl.

$R^5$ can also be for example phenoxymethyl, 2-phenoxyethyl, 2- or 3-phenoxypropyl, 2- or 4-phenoxybutyl, formyloxymethyl, 2-(formyloxy)ethyl, 3-(formyloxy)propyl, 2- or 4-(formyloxy)butyl, methylcarbonyloxymethyl, 2-(methylcarbonyloxy)ethyl, 2- or 3-(methylcarbonyloxy)propyl, 2- or 4-(methylcarbonyloxy)butyl, ethylcarbonyloxymethyl, 2-(ethylcarbonyloxy)ethyl, 2- or 3-(ethylcarbonyloxy) propyl, 2- or 4-(ethylcarbonyloxy)butyl, propylcarbonyloxymethyl, 2-(propylcarbonyloxy)ethyl, 2- or 3-(propylcarbonyloxy)propyl, 2- or 4-(propylcarbonyloxy)butyl, cyclopentyl, cyclohexyl, cycloheptyl.

$R^5$, $R^{15}$ and also the below-described radicals $G^4$ are each for example formyl, acetyl, propionyl, butyryl, isobutyryl.

$F^1$, $F^2$, $R^5$, $R^9$, $R^{10}$ and also the below-described radicals $G^4$ are each for example mono- or dimethylcarbamoyl, mono- or diethylcarbamoyl, mono- or dipropylcarbamoyl, mono- or dibutylcarbamoyl.

$F^1$, $F^2$, $R^6$, $R^7$, $R^9$, $R^{10}$ and also the below-described radicals $G^3$ and $G^5$ can each also be for example methoxy, ethoxy, propoxy, isopropoxy, butoxy, sec-butoxy, isobutoxy, tert-butoxy.

$R^6$ and $R^{13}$ are each for example formylamino, methylcarbonylamino, ethylcarbonylamino, propylcarbonylamino, isopropylcarbonylamino.

$T^1$ may also be for example 2-, 3- or 4-fluorophenyl, 2-, 3- or 4-chlorophenyl, 2-, 3- or 4-bromophenyl, 2-, 3- or 4-methoxyphenyl, 2-, 3- or 4-nitrophenyl, 2-, 3- or 4-carboxyphenyl, 2-, 3- or 4-acetylphenyl, 2-, 3- or 4-acetylaminophenyl, 2-, 3- or 4-methylsulfonylphenyl, 2-, 3- or 4-sulfamoylphenyl or 2-, 3- or 4-carbamoylphenyl.

$F^1$, $F^2$, $R^8$, $R^9$, $R^{10}$, $R^{15}$ and also the below-described radicals $R^{16}$ may also be for example methoxycarbonyl, ethoxycarbonyl, propoxycarbonyl, isopropoxycarbonyl, butoxycarbonyl, isobutoxycarbonyl, sec-butoxycarbonyl or tert-butoxycarbonyl.

$F^2$ and $R^{10}$ may also be for example mono- or dimethylsulfamoyl, mono- or diethylsulfamoyl, mono- or dipropylsulfamoyl, mono- or dibutylsulfamoyl, methylsulf6nyl, ethylsulfonyl, propylsulfonyl or butylsulfonyl.

$R^{13}$ may also be for example hydroxysulfonylphenylmethyl, 2-hydroxysulfonylphenylethyl, 2- or 3-hydroxysulfonylphenylpropyl, 2- or 4-hydroxysulfonylphenylbutyl, aminomethyl, 2-aminoethyl, 2- or 3-aminopropyl, 2- or 4-aminobutyl, hydroxysulfonylmethyl, 2-hydroxysulfonylethyl, 2- or 3-hydroxysulfonylpropyl, 2- or 4-hydroxysulfonylbutyl, acetylaminomethyl, 2-acetylaminoethyl, 2- or 3-acetylaminopropyl, 2- or 4-acetylaminobutyl, benzoylaminomethyl, 2-benzoylaminoethyl, 2- or 3-benzoylaminopropyl, 2- or 4-benzoylaminobutyl, 2-, 3- or 4-carboxyphenyl, 2-, 3- or 4-hydroxysulfonylphenyl, 2-, 3- or 4-benzoylaminophenyl, 2-, 3- or 4-acetylaminophenyl, 2-, 3- or 4-methylphenyl, 2-, 3- or 4-methoxyphenyl, 2-, 3- or 4-cyanophenyl, 2-, 3- or 4-chlorophenyl, phenylamino, methylamino, ethylamino, propylamino, isopropylamino, butylamino, isobutylamino, sec-butylamino, tertbutylamino or benzoylamino.

The radicals $L^5$ and also the below-described radicals $L^8$ are each for example $(CH_2)_2$, $(CH_2)_3$, $(CH_2)_4$, $CH(CH_3)CH_2$, $CH(CH_3)CH(CH_3)$, $(CH_2)_5$ or $(CH_2)_6$.

$L^5$ may also be for example $(CH_2)_2O(CH_2)_2$, $(CH_2)_3O(CH_2)_2$, $(CH_2)_2O(CH_2)_2O(CH_2)_2$, $(CH_2)_2S(CH_2)_2$, $(CH_2)_3S(CH_2)_2$, $(CH_2)_2S(CH_2)_2S(CH_2)_2$, $(CH_2)_2NH(CH_2)_2$, $(CH_2)_3NH(CH_2)_2$, $(CH_2)_2NH(CH_2)_2NH(CH_2)_2$,

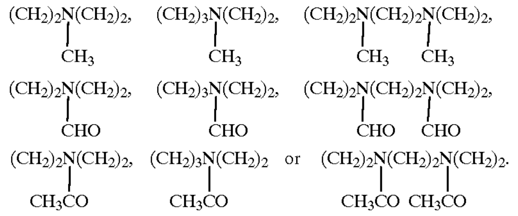

or $L^6$ and $L^{10}$ are each $CH_2$, $(CH_2)_2$, $(CH_2)_3$, $(CH_2)_4$, $CH(CH_3)CH_2$ or $CH(CH_3)CH(CH_3)$.

In what follows, coupling components KH are recited by way of example. Specific examples of naptholsulfonic acid coupling components KH are 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxynaphthalene-3,6-disulfonic acid, 2,6-dihydroxynapthalene-8-sulfonic acid and 2,8-dihydroxynaphthalene-6-sulfonic acid.

Further examples are 1-naphthylamine, N-phenyl-1-naphthylamine, N-ethyl-1-naphthylamine, N-phenyl-2-naphthylamine, 1-naphthol, 2-naphthol, 1,5-dihydroxynaphthalene, 1,6-dihydroxynaphthalene, 1,7-dihydroxynaphthalene and 2,7-dihydroxynaphthalene.

Examples of aminonaphthalenesulfonic acids are 1-naphthylamine-6-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid, 2-naphthylamine-6,8-disulfonic acid, 2-hydroxysulfonylmethylaminonaphthalene-5-sulfonic acid and 2-hydroxysulfonylmethylaminonaphthalene-6-sulfonic acid.

Examples of aminonaphtholsulfonic acids are 1-amino-5-hydroxynaphthalene-7-sulfonic acid, 1-amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid,2-amino-8-hydroxynaphthalene-3,6-disulfonic acid, 2-amino-5-hydroxynaphthalene-1,7-disulfonic acid, 3-amino-7-hydroxysulfonylmethyl-8-hydroxynaphthalene-3,6- disulfonic acid, 2-amino-7-hydroxysulfonylmethyl-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid, 2-methylamino-8-hydroxynaphthalene-6-sulfonic acid, 2-hydroxysulfonylmethylamino-8-hydroxynaphthalene-6-sulfonic acid, 2-hydroxysulfonylmethylamino-7-hydroxysulfonylmethyl-8-hydroxynaphthalene-6-sulfonic acid, 2-hydroxysulfonylmethylamino-8-hydroxynaphthalene-3,6-disulfonic acid, 2-hydroxysulfonylmethylamino-7-hydroxysulfonylmethyl-8-hydroxynaphthalene-3,6-disulfonic acid, 2-(3'- or 4'-hydroxysulfonylphenylamino)-8-hydroxynaphthalene-6-sulfonic acid, 2-acetylamino-5-hydroxynaphthalene-7-sulfonic acid and 2-acetylamino-8-hydroxynaphthalene-6-sulfonic acid.

Examples of benzene coupling components are o- or m-toluidine, o- or m-anisidine, cresidine, 2,5-dimethylaniline, 2,5-dimethoxyaniline, m-aminoacetanilide, 3-amino-4-methoxyacetanilide, 3mino-4-methylacetanilide, m-aminophenylurea, N-methylaniline, N-methyl-m-toluidine, N-ethylaniline, N-ethyl-m-toluidine, N-(2-hydroxyethyl)aniline and N-(2-hydroxyethyl)-m-toluidine.

Examples of pyrazolone coupling components are 3-methyl-, 3-carboxy- or 3-($C_1$–$C_4$-alkoxycarbonyl)-pyrazol-5-ones with or without substitution in position 1 by unsubstituted or methyl-, ethyl-, fluorine-, chlorine-, bromine-, trifluoromethyl-, methoxy-, ethoxy-, cyano-, phenoxy-, phenylsulfonyl-, methylsulfonyl-, hydroxysulfonyl-, acetylamino-, nitro-, hydroxyl-, carboxyl-, carbamoyl- or sulfamoyl-substituted phenyl or by hydroxysulfonyl-substituted 1- or 2-naphthyl. Specific examples are 1-phenyl-, 1-(2'-chlorophenyl)-, 1-(2'-methoxyphenyl)-, 1-(2'-methylphenyl)-, 1-(1',5'-dichlorophenyl)-, 1-(2',6'-dichlorophenyl)-, 1-(2'- methyl-6'-chlorophenyl)-, 1-(2'-methoxy-5'-methylphenyl)-, 1-(2'-methoxy-5'-hydroxysulfonylphenyl)-, 1-(2',5'-dichloro-4'-hydroxysulfonylphenyl)-, 1-(2',5'-dihydroxysulfonylphenyl)-, 1-(2'-carboxyphenyl)-, 1-(3'-hydroxysulfonylphenyl)-, 1-(4'-hydroxysulfonylphenyl)- or 1-(3'-sulfamoylphenyl)-3-carboxypyrazol-5-one, 1-(3'- or 4'-hydroxysulfonylphenyl)-, 1-(2'-chloro-4'- or -5'-hydroxysulfonylphenyl)-, 1-(2'-methyl-4'-hydroxysulfonylphenyl)-, 1-(2',5'-dichlorophenyl)-, 1-(4',8'-dihydroxysulfonyl-1-naphthyl)-, 1-(6'-hydroxysulfonyl-1-naphthyl)-3-methylpyrazol-5-one, ethyl 1-phenylpyrazol-5-one-3-carboxylate, ethyl pyrazol-5-one-3-carboxylate or pyrazol-5-one-3-carboxylic acid.

Other pyrazole coupling components include for example 1-methyl-, 1-ethyl-, 1-propyl-, 1-butyl-, 1-cyclohexyl-, 1-benzyl- or 1-phenyl-5-aminopyrazole, 1-(4'-chlorophenyl)-, 1-(4'-methylphenyl)-5-aminopyrazole or 1-phenyl-3-methyl-5-aminopyrazole.

N-Arylacetoacetamides are particularly acetoacetanilide or its derivatives having one or more substituents selected from the group consisting of chlorine, methyl, ethyl, methoxy, ethoxy, acetylamino, hydroxysulfonyl, carboxyl, carbamoyl and sulfamoyl in the phenyl ring.

Pyridine coupling components are the derivatives described in DE-A-2 260 827, for example.

Suitable pyrimidine coupling components include for example the compounds recited in DE-A-2 202 820, DE-A-2 308 663 or DE-A-3 119 349. Also suitable are barbituric acid and its N-substitution products. Suitable N-substituents include in particular $C_1$–$C_4$-alkyl or phenyl.

Examples of suitable indole coupling components are 2-methylindole, 2-phenylindole, 2-phenylindole-5-sulfonic acid, 1-methyl-2-phenylindole, 1-(2'-hydroxyethyl)-, 1-(2'-carboxyethyl)-, 1-(2'carbamoylethyl)-2-methylindole or -2-phenylindole.

Examples of suitable pyridone coupling components are 1-ethyl-2-hydroxy-4-methyl-5-carbamoylpyrid-6-one, 1-(2'-hydroxyethyl)-2-hydroxy-4-methyl-5-carbamoylpyrid-6-one, 1-phenyl-2-hydroxy-4-methyl-5-carbamoylpyrid-6-one, 1-ethyl-2-hydroxy-4-methyl-5-cyanopyrid-one, 1-ethyl-2-hydroxy-4-methyl-5-hydroxysulfonylmethylpyrid-6-one, 1-methyl-2-hydroxy-4-methyl-5-cyanopyrid-6-one, 1-methyl-2-hydroxy-5-acetylpyrid-6-one, 1,4-dimethyl-2-hydroxy-5-cyanopyrid-6-one, 1,4-dimethyl-5-carbamoylpyrid-6-one, 2,6-dihydroxy-4-ethyl-5-cyanopyridine, 2-hydroxy-4-ethyl-5-carbamoylpyrid-6-one, 1-ethyl-2-hydroxy-4-methyl-5-hydroxysulfonylmethylpyrid-6-one, 1-methyl-2-hydroxy-4-methyl-5-methylsulfonylpyrid-6-one and 1-carboxymethyl-2-hydroxy-4-ethyl-5-phenylsulfonylpyrid-6-one.

Coupling components K of the naphthalene, benzene, pyrazolone, aminopyrazole, 2,6-diaminopyridine, pyridone, hydroxypyrimidine, aminopyrimidine, indole or N-arylacetoacetamide series which contain a fiber-reactive group include for example compounds of the formulae IXa–m

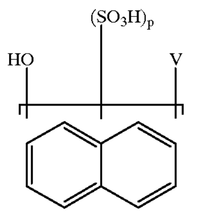

(IXa)

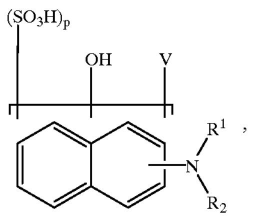

(IX b)

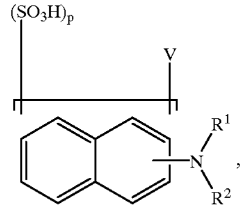

(IX c)

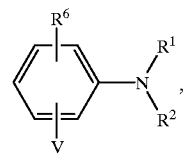

(IX d)

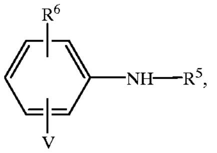

(IX e)

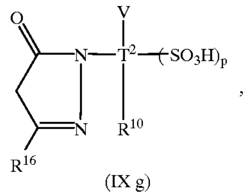

(IX g)

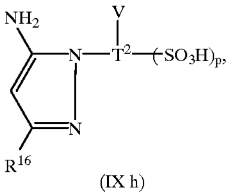

(IX h)

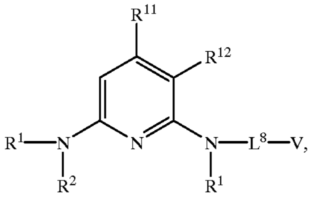

(IX i)

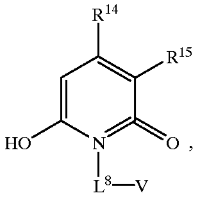

(IX k)

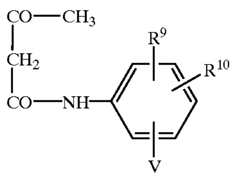

(IX l)

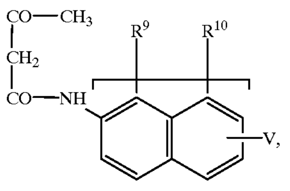

(IX m)

where $T^2$ is the radical of a benzene or naphthalene ring, $R^{16}$ is methyl, carboxyl, $C_1$–$C_4$-alkoxycarbonyl or phenyl, $L^8$ is $C_1$–$C_6$-alkylene, and $R^1$, $R^2$, $R^5$, $R^6$, $R^9$, $R^{10}$, $R^{11}$, $R^{12}$, $R^{14}$, $R^{15}$, p and V are each as defined above.

Pyrazolone coupling components bearing fiber-reactive radicals V are derived for example from the following pyrazolones: 1-(3'- or 4-aminophenyl)-, 1-(2'-hydroxysulfonyl-5'-aminophenyl)- or 1-(2'-methoxy-5'-aminophenyl)-3-carboxypyrazol-5-one, 1-(3'- or 4'-aminophenyl)- or 1-(6'-amino-4',8'-dihydroxysulfonylnaphth-2'-yl)-3-carboxypyrazol-5-one.

Particular preference is given to dyes of the formula X $$E—N=N—K^1 \quad (X),$$

where E is as defined above and $K^1$ is the radical of a coupling component of the benzene, naphthalene, pyrazole or pyridine series which optionally has further fiber-reactive groups, especially the group E, the group of the formula $SO_2$—Y, where Y is as defined above, or those of the halotriazine series.

Particular preference is given to reactive dyes having amino-substituted naphthalenes as coupling components, of which the 2-aminonaphthalenesulfonic acids which are coupled in the 1-position especially are notable for their particularly good lightfastness. The dyes of the general formula XI (XI)

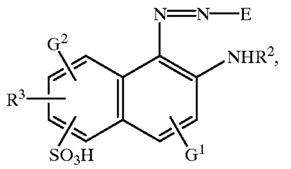

where $G^1$ is hydrogen or hydroxysulfonyl, $G^2$ is hydrogen or hydroxyl, and

E, $R^2$ and $R^3$ are each as defined above, are therefore preferred above all.

Of the group of the reactive dyes of the formula XI, emphasis is given to those in which $R^2$ and/or $R^3$ are each hydrogen, $C_1$–$C_4$-alkyl which are substituted by hydroxysulfonyl or carboxyl, especially hydrogen, hydroxysulfonylmethyl or carboxymethyl.

It will be appreciated that, of the group of dyes of the general formula XI, those having preferred fiber-reactive groups of the formula IIa or IIb are likewise preferred. They are compounds of the general formulae XIa and XIb (XIa)

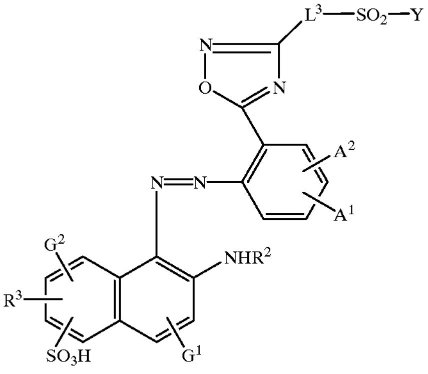

-continued (XIb)

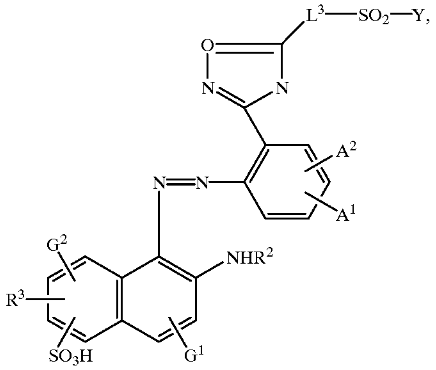

where $A^1$ and $A^2$ are independently of each other hydrogen, nitro, amino, hydroxysulfonyl or a radical of the formula $SO_2C_2H_4OSO_3H$, $L^3$ is $C_1$–$C_4$-alkylene, $G^1$ is hydrogen or hydroxysulfonyl, $G^2$ is hydrogen or hydroxy, $R^2$ and $R^3$ are independently of each other hydrogen, hydroxysulfonylmethyl or carboxymethyl, and Y is as defined above.

Particular preference is further given to dyes of the formulae (XIIa)

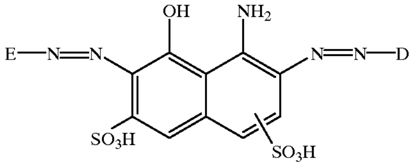

(XIIb)

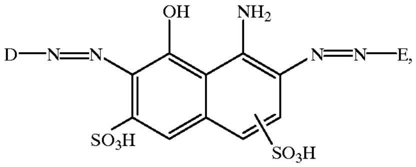

where the radical E is as defined above and D is the radical of a diazo component of the aniline or naphthalene series which optionally has further fiber-reactive groups, especially the group E, the group $SO_2Y$ or those of the halotriazine series.

Particular preference is further given to the reactive dyes of the formula XIII (XIII)

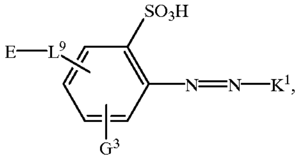

where E and $K^1$ are each as defined above, $L^9$ is a radical of the formula $O_2S—NZ^1$, $OC—NZ^1$, $Z^1N—SO_2$, $Z^1N—CO$, $Z^1N—CO—NZ^2$, $NZ^1$ or

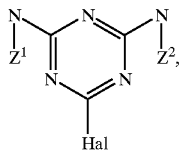

where $Z^1$, $Z^2$ and Hal are each as defined above, and $G^3$ is hydrogen, $C_1$–$C_4$-alkyl, $C_1$–$C_4$-alkoxy, chlorine or hydroxysulfonyl.

Particular preference is further given to reactive dyes of the formula XIV (XIV)

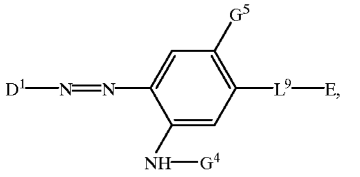

where $D^1$, E and $L^9$ are each as defined above, $G^4$ is $C_1$–$C_4$-alkanoyl, carbamoyl, mono- or di($C_1$–$C_4$)-alkylcarbamoyl, phenylcarbamoyl or cyclohexylcarbamoyl, and $G^5$ is hydrogen, $C_1$–$C_4$-alkyl, $C_1$–$C_4$-alkoxy, hydroxysulfonyl or chlorine.

Particular preference is further given to reactive dyes of the formula XV (XV)

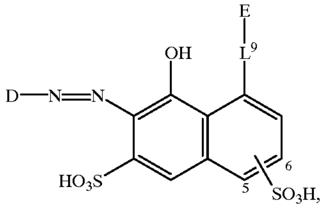

where D, E and $L^9$ are each as defined above and the hydroxyulfonyl group is disposed in ring position 5 or 6.

Particular preference is further given to reactive dyes of the formula XVI (XVI)

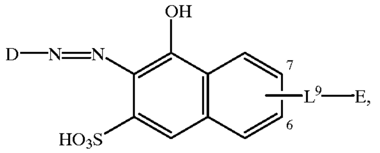

where D, E and $L^9$ are each as defined above and the group —$L^9$—E is disposed in ring position 6 or 7.

Useful compounds further include those of the formula XVII (XVII)

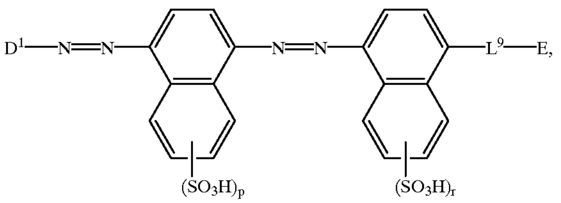

where $D^1$, E and $L^9$ are each as defined above and p and r are independently of each other 0, 1 or 2.

Useful compounds further include those of the formula XVIII (XVIII)

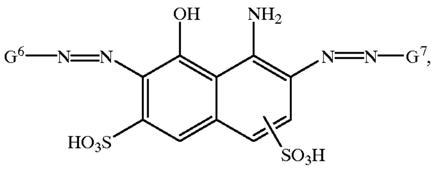

where one of the two radicals $G^6$ and $G^7$ is D, D having the above-mentioned meanings, and the other is the radical

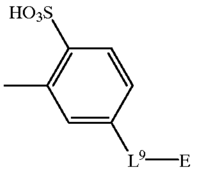

or else $G^6$ and $G^7$ are each a radical of the formula

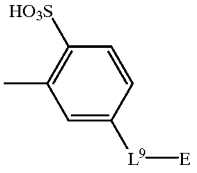

where $L^9$ and E are each as defined above.

Instead of the azo dye radicals, the dyes of the formula I may also contain corresponding metal complex azo dye radicals. Contemplated complexing metals include in particular copper, cobalt, chromium, nickel or iron, of which copper, cobalt or chromium are preferred.

The metallized groups are preferably disposed in each case ortho to the azo groups, for example in the form of o,o'-dihydroxy-, o-hydroxy-o'-carboxy-, o-carboxy-o'-amino- or o-hydroxy-o'-amino-azo groups.

W in the formula I may also be for example the radical of a metallized formazan dye, in which case copper formazans should be mentioned in particular. Copper formazans are known per se and described for example in K. Venkataraman, The Chemistry of Synthetic Dyes, Vol. III, Academic Press, New York, London, 1970.

Particular preference is given to copper formazan dyes of the formula XIX (XIX)

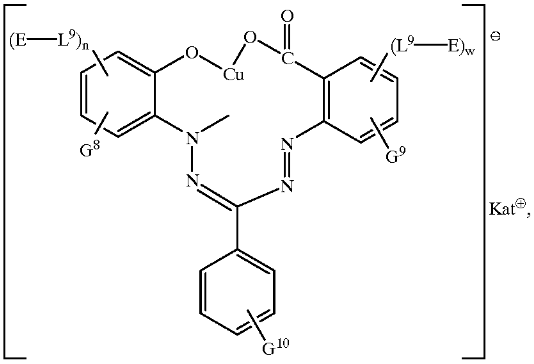

where

Kat$^{\oplus}$ is the equivalent of a cation, $G^8$, $G^9$ and $G^{10}$ are identical or different and each is independently of the other hydrogen or hydroxysulfonyl, n is 0 or 1, w is 0 or 1, and E and $L^9$ are each as defined above, with the proviso that n and w are not both 0.

Kat$^{\oplus}$ in the formula XIX is the equivalent of a cation. It is either a proton or derived from metal or ammonium ions. Metal ions are in particular the lithium, sodium or potassium ions. Ammonium ions for the purposes of this invention are the abovementioned substituted or unsubstituted ammonium cations.

Preferred cations are protons or lithium, sodium or potassium ions, the metal cations mentioned also being preferred cations when the reactive dyes XIX are present in salt form.

One method of preparing the formazans underlying these dyes is described in EP-A-315 046 for example.

W in the formula I may also be for example the radical of an anthraquinone dye. Anthraquinones are known per se and described for example in K. Venkataraman, The Chemistry of Synthetic Dyes, Vol. II, Academic Press, New York, 1952.

Particular preference is given to anthraquinone dyes of the formula XX (XX)

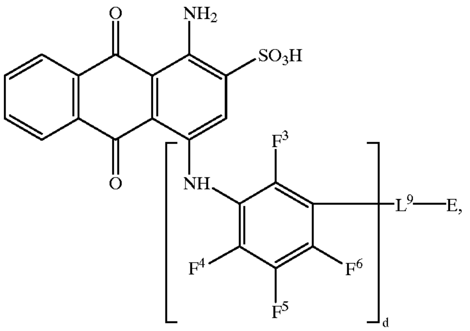

where E and $L^9$ are each as defined above, d is 0 or 1

$F^3$ and $F^4$ are independently of each other hydrogen or methyl and one of the two radicals $F^5$ and $F^6$ is hydrogen or methyl and the other is hydroxysulfonyl.

W in the formula I may also be for example the radical of a triphendioxazine dye. Triphendioxazines are known per se and described for example in EP-A-141 359 or EP-A-311 969.

Particular preference is given to triphendioxazine dyes of the formula XXI (XXI)

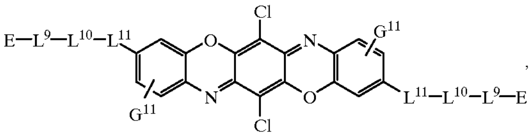

where E and $L^9$ are each as defined above, $G^{11}$ is hydroxysulfonyl or the radical $SO_2—C_2H_4—SO_3H$, $L^{10}$ is $C_2$–$C_4$-alkylene or phenylene, and $L^{11}$ is oxygen, imino or $C_1$–$C_4$-alkylimino.

W in the formula I may also be for example the radical of a metallized phthalocyanine dye. Phthalocyanines are known per se and described for example in F. H. Moser, D. L. Thomas, The Phthalocyanines, Vol. II, CRC Press, Boca Raton, Fla. 1983.

Particular preference is given to the phthalocyanine dyes of the formula XXII (XXII)

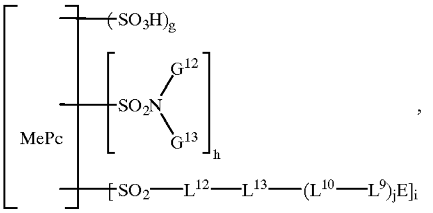

where

PC is the phthalocyanine radical, $G^{12}$ and $G^{13}$ are independently of each other hydrogen or $C_1$–$C_4$-alkyl, $L^{12}$ is imino or $C_1$–$C_4$-alkylimino, $L^{13}$ is a direct bond or $C_1$–$C_4$-alkylene, Me is copper or nickel, g is 0, 1 or 2, h is 0, 1 or 2, i is 1 or 2, j is 0, 1, 2 or 3, and E, $L^9$ and $L^{10}$ are in each case as defined above.

The novel reactive dyes of the formula I can be prepared in a conventional manner.

When the radical w is a coupling component, the dyes of the invention are obtained by, for example, diazotizing and coupling the fiber-reactive compound of the formula XXIII $$H_2N—E \quad \text{(XXIII)},$$

where E is as defined above, in a conventional manner with a coupling component of the formula XXIV $$W^1—H \quad \text{(XXIV)}$$

where $W^1$ is the radical of a coupling component, of a monoazo dye or additionally, when b=O, of a disazo dye, which may each have further fiber-reactive groups.

For example, a suitable dye of the formula XXV $$W^2—G^{14} \quad \text{(XXV)},$$

where $W^2$ is the radical of a chromophore which optionally has further fiber-reactive groups and is derived from and optionally metallized mono- or disazo dye, a triphendioxazine, an anthraquinone, a metallized formazan or a metallized phthalocyanine and $G^{14}$ is an amino radical of the formula $NHZ^1$ or an acid halide radical of the formula COHal or $SO_2Hal$, where $Z^1$ and Hal are each as defined above, can be reacted with a fiber-reactive compound of the formula XXVI $$G^{15}—E \qquad (XXVI),$$

where E is as defined above and $G^{15}$ is one of the radicals $G^{14}$, with the proviso that, in either case, an amine reacts with an acid halide.

When $L^1$ (case 2) is a urea bridge or a triazine radical, the synthesis steps customary with these classes of compounds are included as well.

It is also possible to start from such precursors of compounds of the formula XXV as form part of the later chromophore and to react them first with the fiber-reactive compound XXVI and then to construct the chromophore radical $W^2$.

When b in the formula I is 1, the bridge chromophores can be obtained for example by either bridging the finished individual chromophores or else by first bridging suitable intermediates and then constructing the respective chromophoric systems.

The preparation of the fiber-reactive compounds of the formulae XXVI and XXIII is known per se and is described for example in DE-A-195 28 189.

In this way it is possible to start from intermediates suitable for constructing the heterocycle underlying the radical Het.

This is more particularly described in the following synthetic schemes where $L^3$, Y, $A^1$ and $A^2$ are each as defined above and Hal is chlorine or bromine for the case where Het is derived from 1,2,4-oxadiazole:

Scheme 1

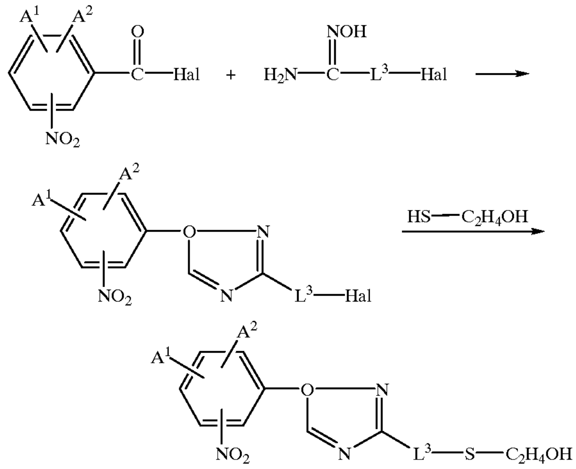

(XXVII)

Scheme 2

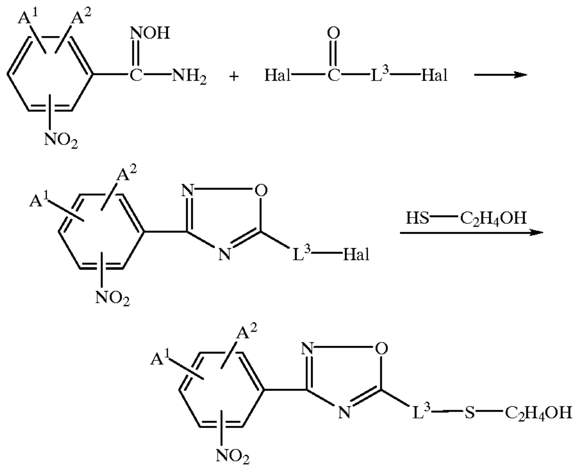

(XXVIII)

The two heterocyclic intermediates XXVII and XXVIII are subsequently subjected to reactions, carried out in a conventional manner in any order, whereby the nitro group is reduced to an amino group, the sulfide is oxidized to sulfone and the hydroxyethyl group is converted into an alkali-detachable group.

The novel reactive dyes of the formula I are advantageously useful for dyeing or printing hydroxyl-containing or nitrogenous organic substrates. Such substrates include for example leather or fiber material comprising predominantly natural or synthetic polyamides or natural or regenerated cellulose. The novel dyes are preferably useful for dyeing and printing textile material based on wool or in particular cotton.

Substrates based on cellulose in particular are dyed with a very high yield of fixation in strong shades which possess very good lightfastness and also excellent wetfastness properties, such as wash, chlorine bleach, peroxide bleach, alkali, seawater or perspiration fastness.

The Examples which follow illustrate the invention.

EXAMPLE 1

Preparation of the Fiber-reactive Oxadiazole Moiety a) 3-(2-Hydroxyethylsulfonyl)propionitrile 328 g (2.50 mol) of 3-[(2-hydroxyethyl)thio]propionitrile in 500 ml of water were admixed with 10 ml of glacial acetic acid, 2 g of sodium acetate and 2 g of sodium tungstenate dihydrate, followed by 520 ml (5.09 mol) of a 30% strength by weight aqueous hydrogen peroxide added dropwise at 60–70° C. over 4 h. To maintain the stated temperature range, the reaction had to be cooled with ice-water from time to time.

After cooling, excess hydrogen peroxide was destroyed with sodium dithionite and the solvent was distilled off under reduced pressure. The oily residue was triturated with 200 ml of acetone and the precipitate was filtered off. The filtrate was concentrated to dryness under reduced pressure to leave 405 g of a viscid oil having a 3-(2-hydroxyethylsulfonyl)propionitrile content of 86.4% (85.8% of theory).

$$NC—C_2H_4SO_2C_2H_4OH$$

b) 3-(2-Hydroxyethylsulfonyl)propionamide oxime

To a solution of 163 g (1.00 mol) of the compound described under a) and 69.5 g (1.00 mol) of hydroxylammonium chloride in 1 liter of methanol were added 190 ml (1.00 mol) of a 30% strength by weight solution of sodium methoxide in methanol. The reaction mixture was refluxed for 6 h. After cooling, the precipitate was filtered off with suction and dried at 50° C. under reduced pressure to leave 151 g of a light brown microcrystalline powder having a 3-(2-hydroxyethylsulfonyl)propionamide oxime content of 71.4% (55.0% of theory).

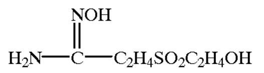

c) 5-(2'-Aminophenyl)-3-[2-(2-hydroxyethylsulfonyl) ethyl]-1,2,4-oxadiazole

A solution, heated to 50° C., in 1 liter of 1-methoxy-2-propanol of 98.1 g (0.50 mol) of the compound described under b) was slowly admixed with 81.6 g (0.50 mol) of isatoic anhydride and, after the evolution of gas had ceased, refluxed for 6 h. The solvent was then distilled off under reduced pressure, the residue was covered with isopropanol and the resulting precipitate was filtered off with suction. Yield: 76.8 g (51.7% of theory) of a beige powder, melting point 118–119° C., of the formula

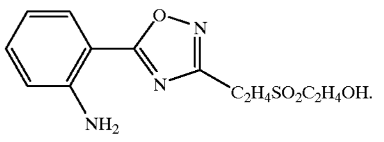

d) 5-(2'-Aminophenyl)-3-[2-(2-sulfatoethylsulfonyl)ethyl]-1,2,4-oxadiazol 59.4 g (0.2 mol) of 5-(2'-aminophenyl)-3-[2-(2-hydroxyethylsulfonyl)ethyl]-1,2,4-oxadiazole were added at 10–15° C. to 100% strength sulfuric acid and stirred in at 35–40° C. for 1 h. The reaction solution was poured onto 210 g of ice and the resulting precipitate was filtered off with suction and washed with a little ice-water to leave 98.8 g of the compound of the formula

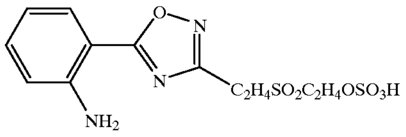

as a moist beige powder.

e) Sulfonation 59.4 g (0.2 mol) of 5-(2'-aminophenyl)-3-[2-(2-hydroxyethylsulfonyl)ethyl]-1,2,4-oxadiazole were added at 10–15° C. to 100% strength sulfuric acid and stirred in at 40° C. for 1 h. 240 ml of 24% strength by weight oleum were then added at 40° C. a little at a time over 20 h. After heating at 60° C. for 8 h, the reaction solution was poured onto ice, the pH was adjusted to pH 4–5 with sodium bicarbonate, and the product was salted out with 500 g of potassium chloride to afford 95.3 g of 5-(2'-amino-5'-sulfophenyl)-3-[2-(2-hydroxyethylsulfonyl)ethyl]-1,2,4-oxadiazole.

The 3,5-disulfonated compound of the formula

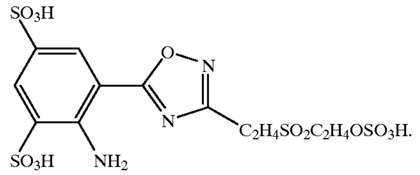

was obtained on dropwise addition of 65%, rather than 24%, strength by weight oleum at 10–15° C., stirring at 40° C. for 2 h and 75° C. for 6 h, pouring onto ice, adjustment of the pH to 5 with sodium bicarbonate, subsequent filtration of the resulting sodium sulfate and salting out with potassium chloride.

Preparation of dyes

EXAMPLE 1.1

20 g (0.05 mol) of 5-(2-aminophenyl)-3-[2-(2-sulfatoethylsulfonyl)ethyl]-1,2,4-oxadiazole were suspended in 200 ml of ice-water, admixed with 20 ml 10N hydrochloric acid and diazotized by dropwise addition of 15 ml of 23% strength by weight aqueous sodium nitrite solution at from 0 to 5° C. with stirring. After 2 hours' stirring at from 0 to 5° C., the small excess of nitrous acid was destroyed with amidosulfuric acid.

To this solution were added at from 0 to 5° C. 22 g (0.053 mol) of 2-amino-8-hydroxy-3,6-disulfonic acid and the reaction solution was maintained at pH 2.5 to 3 with sodium acetate. After the reaction had ended, the reaction mixture was warmed to room temperature and adjusted to pH 5–5.5 with sodium carbonate. 100 g of sodium chloride were added to the precipitate, the product, 40.2 g (0.046 mol) of the red dye

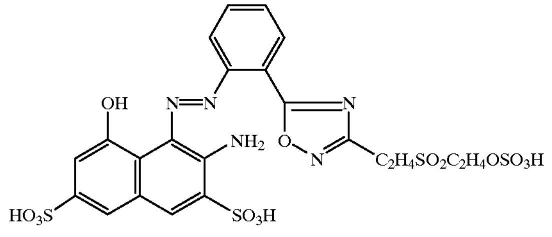

being obtained.

The same method affords the dyes listed below in Table 1.

TABLE 1
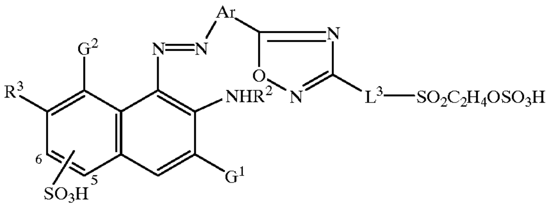
| Ex. No. | $R^2$ | $R^3$ | $G^1$ | $G^2$ | Position of $SO_3H$ group | Ar | $L^3$ | Hue |
|---|---|---|---|---|---|---|---|---|
| 1.2 | H | H | H | OH | 6 | 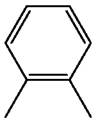 | $CH_2CH_2$ | bluish red |
| 1.3 | H | H | H | H | 5 | 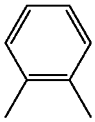 | $CH_2CH_2$ | reddish orange |
| 1.4 | H | H | $SO_3H$ | H | 6 | 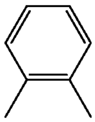 | $CH_2CH_2$ | bluish red |
| 1.5 | $CH_2SO_3H$ | H | H | OH | 6 | 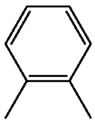 | $CH_2CH_2$ | bluish red |
| 1.6 | H | H | $SO_3H$ | OH | 6 | 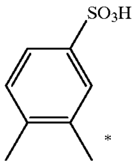 | $CH_2CH_2$ | bluish red |
| 1.7 | $CH_2SO_3H$ | H | H | OH | 6 | 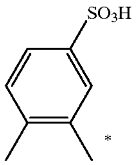 | $CH_2CH_2$ | bluish red |
| 1.8 | H | H | $SO_3H$ | OH | 6 | 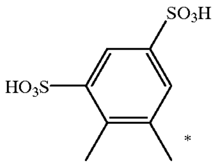 | $CH_2CH_2$ | bluish red |
| 1.9 | H | H | H | H | 5 | 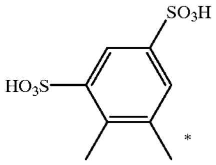 | $CH_2CH_2$ | reddish orange |

TABLE 1-continued
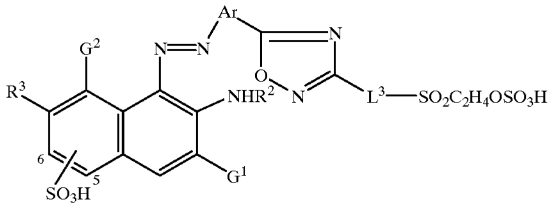
| Ex. No. | $R^2$ | $R^3$ | $G^1$ | $G^2$ | Position of $SO_3H$ group | Ar | $L^3$ | Hue |
|---|---|---|---|---|---|---|---|---|
| 1.10 | H | H | H | OH | 6 | 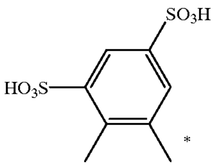 | $CH_2CH_2$ | bluish red |
| 1.11 | $CH_2SO_3H$ | H | H | H | 5 | 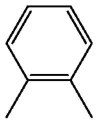 | $CH_2CH_2$ | reddish orange |
| 1.12 | $CH_2SO_3H$ | H | H | H | 5 | 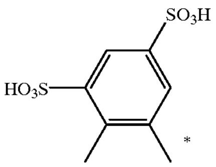 | $CH_2CH_2$ | reddish orange |
| 1.13 | H | $CH_2SO_3H$ | $SO_3H$ | OH | 6 | 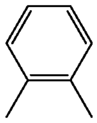 | $CH_2CH_2$ | bluish red |
| 1.14 | H | $CH_2SO_3H$ | H | OH | 6 | 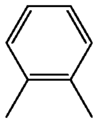 | $CH_2CH_2$ | bluish red |
| 1.15 | $CH_2SO_3H$ | $CH_2SO_3H$ | H | OH | 6 | 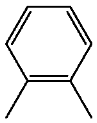 | $CH_2CH_2$ | bluish red |
| 1.16 | $CH_2SO_3H$ | $CH_2SO_3H$ | H | OH | 6 | 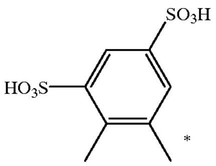 | $CH_2CH_2$ | bluish red |
| 1.17 | $CH_2SO_3H$ | H | H | OH | 6 | 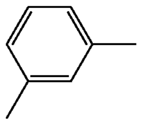 | $CH_2CH_2$ | bluish red |

TABLE 1-continued
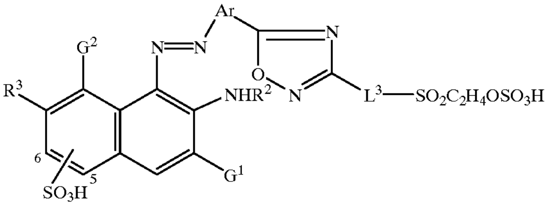
| Ex. No. | $R^2$ | $R^3$ | $G^1$ | $G^2$ | Position of $SO_3H$ group | Ar | $L^3$ | Hue |
|---|---|---|---|---|---|---|---|---|
| 1.18 | H | H | H | H | 5 | 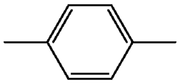 | $CH_2CH_2$ | reddish orange |
| 1.19 | H | $CH_2SO_3H$ | $SO_3H$ | OH | 6 | 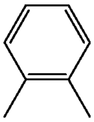 | $CH_2$ | bluish red |
| 1.20 | H | $CH_2SO_3H$ | $SO_3H$ | OH | 6 | 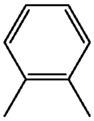 | $CH_2CH_2CH_2$ | bluish red |
| 1.21 | $CH_2SO_3H$ | H | H | H | 5 | 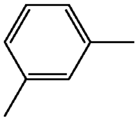 | $CH_2$ | reddish orange |
| 1.22 | H | $CH_2SO_3H$ | $SO_3H$ | OH | 6 | 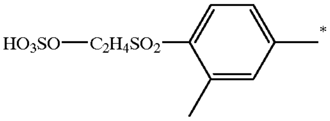 | $C_2H_4$ | bluish red |
| 1.23 | $CH_2SO_3H$ | H | H | OH | 6 | 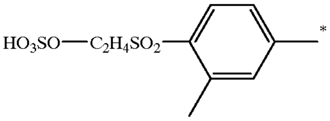 | $C_2H_4$ | bluish red |
| 1.24 | H | H | H | H | 5 | 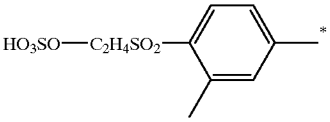 | $C_2H_4$ | reddish orange |
| 1.25 | H | H | H | H | 6 | 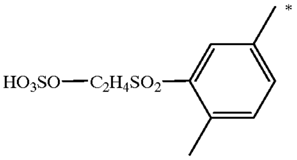 | $C_2H_4$ | reddish orange |
| 1.26 | $CH_2SO_3H$ | $CH_2SO_3H$ | H | OH | 6 | 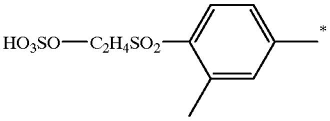 | $C_2H_4$ | bluish red |

TABLE 1-continued

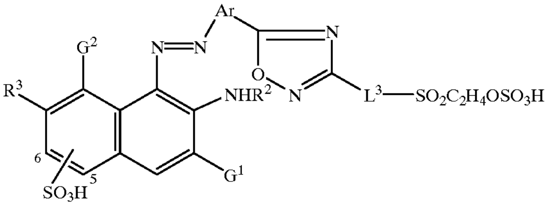

| Ex. No. | $R^2$ | $R^3$ | $G^1$ | $G^2$ | Position of $SO_3H$ group | Ar | $L^3$ | Hue |
|---|---|---|---|---|---|---|---|---|
| 1.27 | H | H | H | H | 5 | 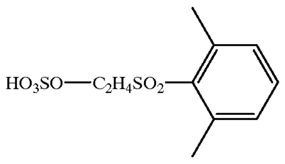 | $C_2H_4$ | reddish orange |
| 1.28 | H | H | $SO_3H$ | OH | 6 | 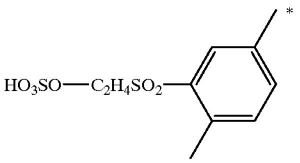 | $C_2H_4$ | bluish red |
| 1.29 | H | H | H | OH | 6 | 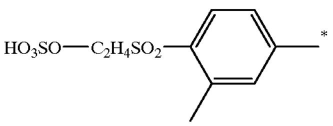 | $C_2H_4$ | bluish red |
| 1.30 | $CH_2SO_3H$ | H | H | H | 6 | 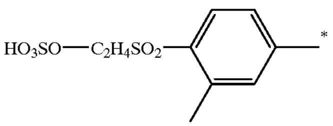 | $C_2H_4$ | reddish orange |
| 1.31 | $CH_2SO_3H$ | H | H | H | 6 | 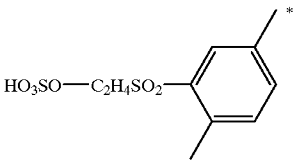 | $C_2H_4$ | reddish orange |
| 1.32 | $CH_2SO_3H$ | H | H | H | 5 | 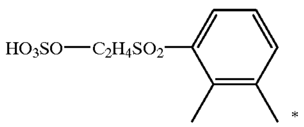 | $C_2H_4$ | reddish orange |

*Site of attachment to heterocycle

EXAMPLE 2

Preparation of Fiber-reactive Oxadiazole Moiety a) 3-[(2-Hydroxyethylthio)methyl]-5-(3'-nitrophenyl)-1,2,4-oxadiazole A mixture of 132 g (0.55 mmol) of 3-chloromethyl-5-(3'-nitrophenyl)-1,2,4-oxadiazole (obtainable by reaction of 3-nitrobenzoyl chloride with chloroacetamide oxime), 39.0 ml (0.56 mol) of mercaptoethanol and 80 ml of triethylamine in 700 ml of 1-methoxy-2-propanol was heated to 100° C. for 4 h and, after cooling down, poured onto ice-water. The precipitated solid was filtered off with suction, washed with water and dried at 40° C. under reduced pressure. 142 g of the compound of the formula

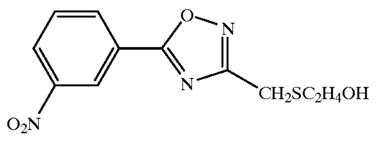

were obtained.

b) 3-[(2-Hydroxyethylsulfonyl)methyl]-5(3'-nitrophenyl)-1,2,4-oxadiazole 140 g (0.50 mol) of the compound described under a) in 1 liter of water were admixed with 40 ml of glacial acetic acid, 20 g of sodium acetate and 1 g of sodium tungstate dihydrate, followed at 70–80° C. by the dropwise addition of 115 ml (1.13 mol) of 30% strength by weight aqueous hydrogen peroxide over 2 h. On completion of the addition the mixture was stirred at 90° C. for a further 2 h. The solid precipitated on cooling was filtered off with suction, washed with water and dried at room temperature under reduced pressure. 105 g of the compound of the formula

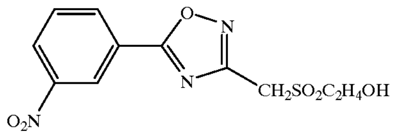

were obtained.

c) 5-(3'-Aminophenyl)-3-[(2-hydroxyethylsulfonyl)methyl]-1,2,4-oxadiazole 6.10 g (19.5 mmol) of the compound described under b) were added to 110 ml (127 mmol) of a 15% strength by weight solution of titanium trichloride in 10% strength by weight hydrochloric acid and the reaction mixture was stirred at room temperature for 20 h. The remaining precipitate was filtered off, the mother liquor was rendered alkaline with sodium hydroxide solution and the resulting precipitate was filtered off with suction and dried. The precipitate was then triturated with 10 ml of tetrahydrofuran, and the soluble residue was filtered off. The filtrate was concentrated to dryness under reduced pressure, and the residue was dried at 50° C. under reduced pressure. 1.40 g of the compound of the formula

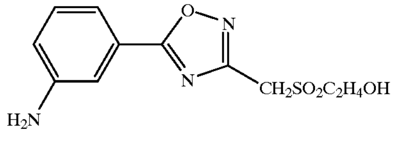

were obtained.

d) 5-(3'-Aminophenyl)-3-[(2-sulfatoethylsulfonyl)methyl]-1,2,4-oxadiazole

The compound described under 2c) was sulfated by the procedure described under 1d).

Preparation of Dyes

EXAMPLE 2.1 a) 94 g of cyanuric chloride were dispersed in a mixture of 400 ml of ice-water, 1 ml of 30% strength by weight hydrochloric acid and 0.5 g of a dispersant and admixed at 0°–5° C. with a solution of 126 g of aniline-2,5-disulfonic acid in 250 ml of water and 35 ml of 50% strength by weight sodium hydroxide solution. The reaction mixture was stirred for four 40 hours at 0–50° C. and pH 4–5, maintained with 47 g of sodium bicarbonate, until the reaction had ended and then clarified.

The filtrate was admixed with a solution of 170 g of 1-amino-8-hydroxy-naphthalene-3,6-disulfonic acid (monosodium salt) in 500 ml of water and 25 ml of 50% strength by weight sodium hydroxide solution while a pH of 4.5 to 5 was maintained with sodium bicarbonate without further cooling. After stirring at room temperature overnight, the condensate was precipitated with 600 g of sodium chloride, filtered off with suction, washed with 20% strength by weight aqueous sodium chloride solution and dried at 50° C. under reduced pressure.

b) 18.2 g of the fiber-reactive moiety compound of the formula

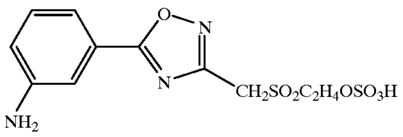

were dissolved in 200 ml of water with 4 g of sodium bicarbonate at pH 4.4. After cooling with 150 g of ice, 18 ml of 30% strength by weight hydrochloric acid were added, and the mixture was diazotized by dropwise addition of 15 ml of 3.33N aqueous sodium nitrite solution. After 30 minutes' stirring at 0°–5° C., a slight nitrite excess was removed with amidosulfuric acid, and the reaction mixture was admixed with a solution of 52 g of the compound obtained under a) (purity: 95%, sodium chloride content: 20%) in 200 ml of water. Coupling took place by dropwise addition of an aqueous sodium acetate solution to pH 5.

Precipitation with 200 g of potassium chloride, filtration with suction and drying led to the isolation of the dye of the formula

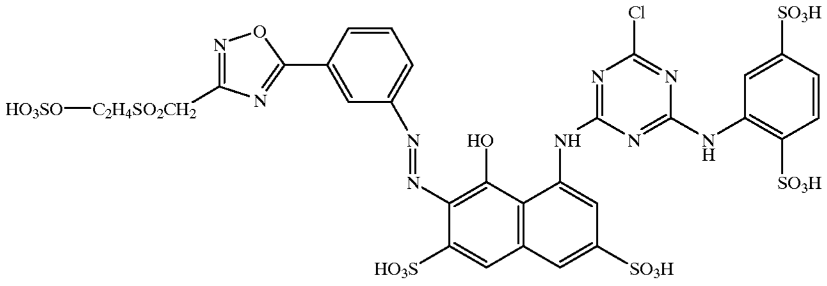

in the form of the pentasodium salt. It dyes cotton in bluish reds either by the exhaust method at 40–60° C. or by the cold pad-batch method at room temperature. The dyeings are notable for very good end-use fastness properties and high degrees of fixation and are highly insensitive to dyeing temperature fluctuations.

The same method can be used to obtain the dyes listed below in Table 2.

TABLE 2

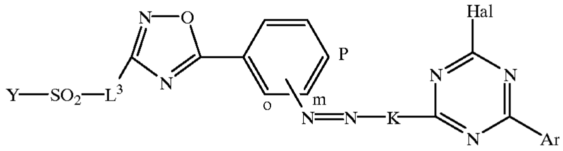

| Ex. No. | Y | $L^3$ | Pos | K | Hal | Ar | Hue |
|---|---|---|---|---|---|---|---|
| 2.2 | $(CH_2)_2OSO_3H$ | $(CH_2)_2$ | m | 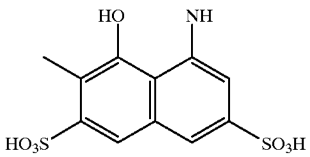 | Cl | 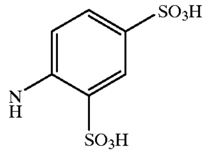 | bluish red |
| 2.3 | $(CH_2)_2OSO_3H$ | $(CH_2)_2$ | m | 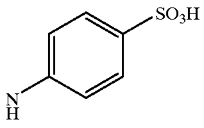 | Cl | 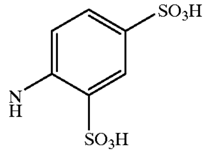 | bluish red |
| 2.4 | $(CH_2)_2OSO_3H$ | $(CH_2)_2$ | m | 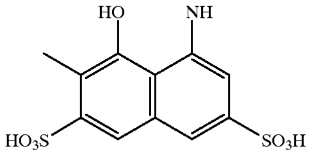 | Cl | 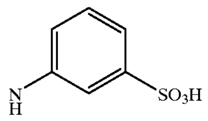 | bluish red |
| 2.5 | $(CH_2)_2OSO_3H$ | $(CH_2)_2$ | m | 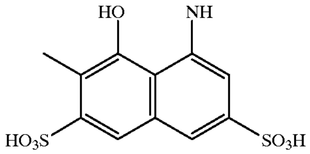 | Cl | 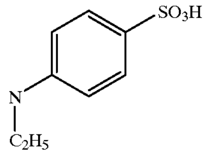 | bluish red |
| 2.6 | $(CH_2)_2OSO_3H$ | $(CH_2)_2$ | m | 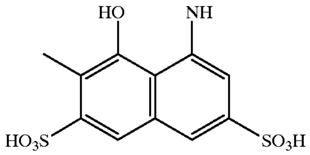 | Cl | 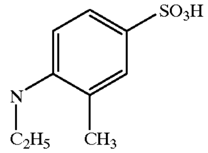 | bluish red |

TABLE 2-continued
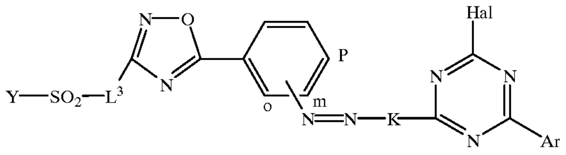
| Ex. No. | Y | $L^3$ | Pos | K | Hal | Ar | Hue |
|---|---|---|---|---|---|---|---|
| 2.7 | $(CH_2)_2OSO_3H$ | $(CH_2)_2$ | m | 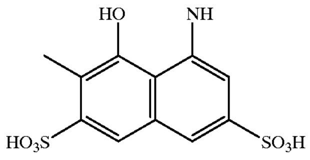 | Cl | 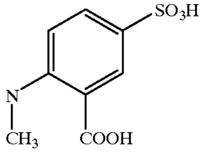 | bluish red |
| 2.8 | $(CH_2)_2OSO_3H$ | $(CH_2)_2$ | m | 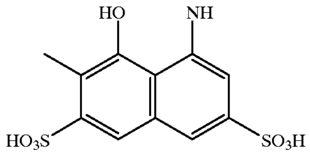 | Cl | 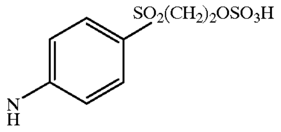 | bluish red |
| 2.9 | $(CH_2)_2OSO_3H$ | $(CH_2)_2$ | m | 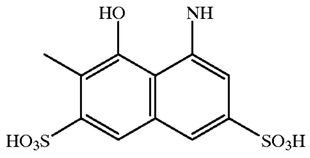 | Cl | 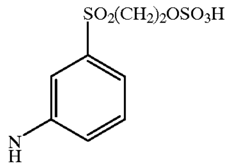 | bluish red |
| 2.10 | $(CH_2)_2OSO_3H$ | $(CH_2)_2$ | m | 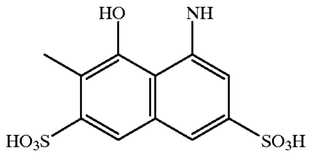 | Cl | 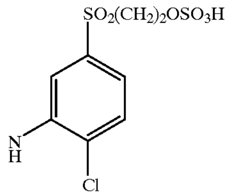 | bluish red |
| 2.11 | $(CH_2)_2OSO_3H$ | $(CH_2)_2$ | m | 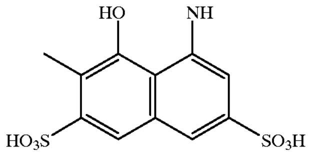 | Cl | 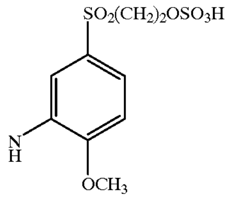 | bluish red |
| 2.12 | $(CH_2)_2OSO_3H$ | $(CH_2)_2$ | m | 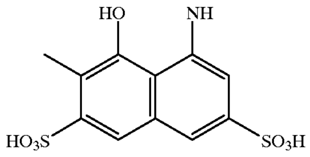 | Cl | 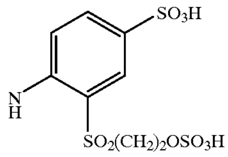 | bluish red |
| 2.13 | $(CH_2)_2Cl$ | $(CH_2)_2$ | m | 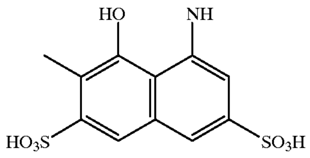 | Cl | 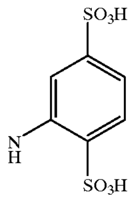 | bluish red |

TABLE 2-continued
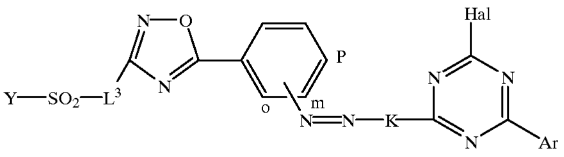
| Ex. No. | Y | $L^3$ | Pos | K | Hal | Ar | Hue |
|---|---|---|---|---|---|---|---|
| 2.14 | $(CH_2)_2Cl$ | $(CH_2)_2$ | m | 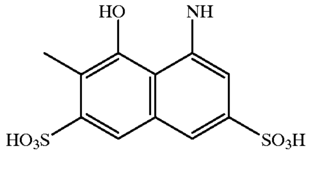 | Cl | 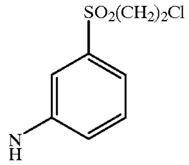 | bluish red |
| 2.15 | $CH{=}CH_2$ | $(CH_2)_2$ | m | 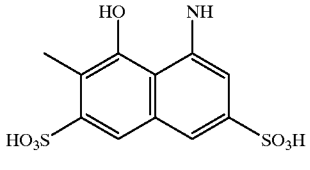 | Cl | 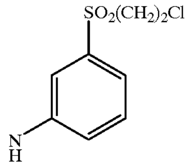 | bluish red |
| 2.16 | $CH{=}CH_2$ | $(CH_2)_2$ | m | 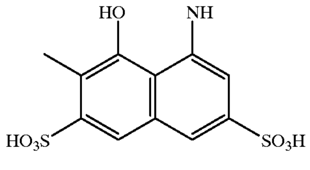 | Cl | 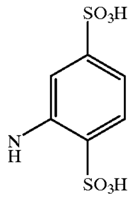 | bluish red |
| 2.17 | $(CH_2)_2SSO_3H$ | $(CH_2)_2$ | m | 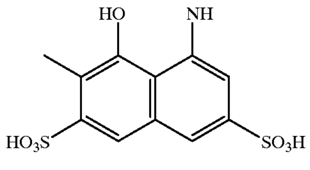 | Cl | 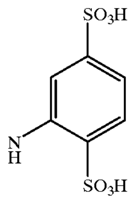 | bluish red |
| 2.18 | $(CH_2)_2OSO_3H$ | $(CH_2)_2$ | m | 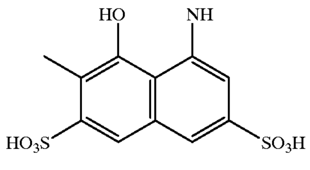 | F | 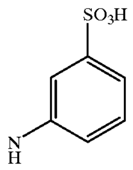 | bluish red |
| 2.19 | $(CH_2)_2OSO_3H$ | $CH_2$ | m | 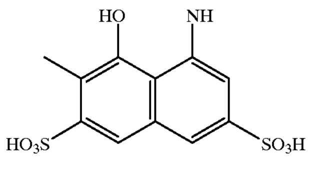 | Cl | 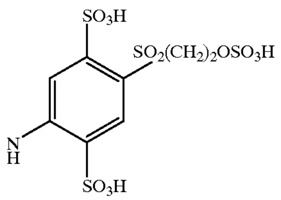 | bluish red |

TABLE 2-continued
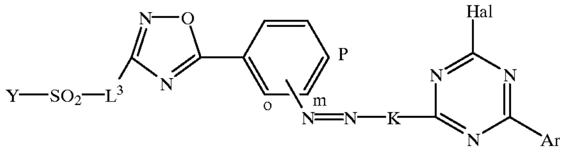
| Ex. No. | Y | $L^3$ | Pos | K | Hal | Ar | Hue |
|---|---|---|---|---|---|---|---|
| 2.20 | $(CH_2)_2OSO_3H$ | $(CH_2)_2$ | m | 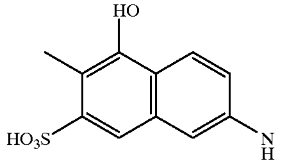 | Cl | 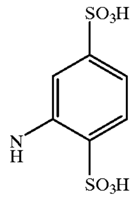 | orange |
| 2.21 | $(CH_2)_2OSO_3H$ | $(CH_2)_2$ | m | 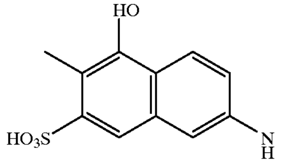 | Cl | 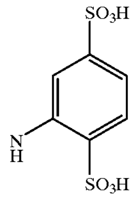 | orange |
| 2.22 | $(CH_2)_2OSO_3H$ | $(CH_2)_2$ | m | 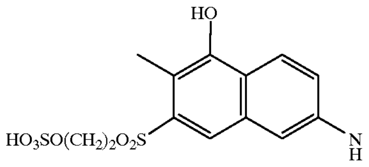 | Cl | 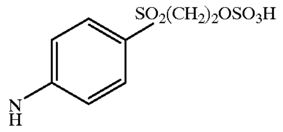 | reddish orange |
| 2.23 | $(CH_2)_2OSO_3H$ | $(CH_2)_2$ | m | 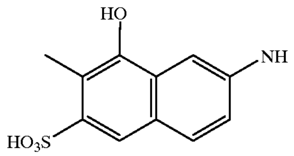 | Cl | 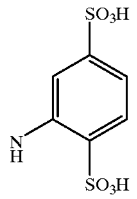 | reddish orange |
| 2.24 | $(CH_2)_2OSO_3H$ | $CH_2$ | m | 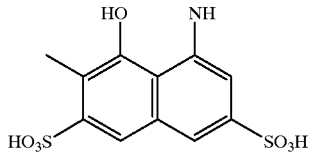 | Cl | 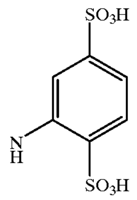 | bluish red |
| 2.25 | $(CH_2)_2OSO_3H$ | $CH_2$ | m | 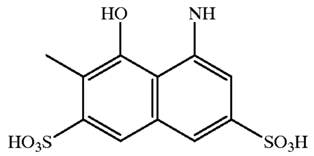 | Cl | 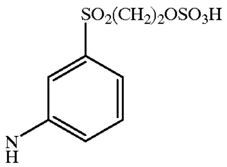 | bluish red |

TABLE 2-continued

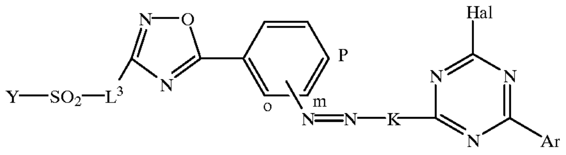

| Ex. No. | Y | $L^3$ | Pos | K | Hal | Ar | Hue |
|---|---|---|---|---|---|---|---|
| 2.26 | $(CH_2)_2OSO_3H$ | $(CH_2)_2O$ $(CH_2)_2$ | m | 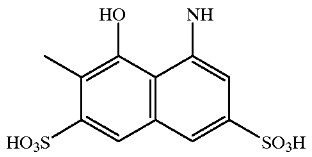 | Cl | 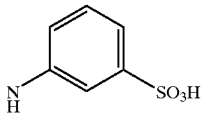 | bluish red |
| 2.27 | $(CH_2)_2OSO_3H$ | $(CH_2)_2$ | o | 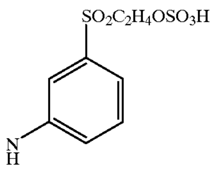 | Cl | 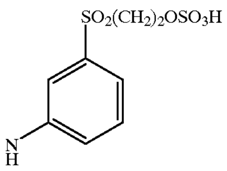 | bluish red |
| 2.28 | $(CH_2)_2OSO_3H$ | $CH_2$ | P | 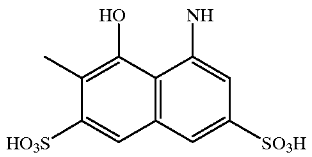 | Cl | 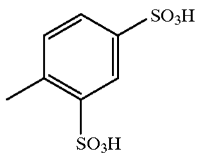 | bluish red |
| 2.29 | $(CH_2)_2OSO_3H$ | $(CH_2)_2$ | o | 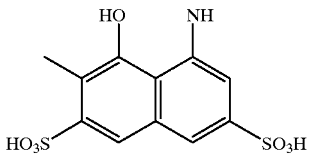 | F | 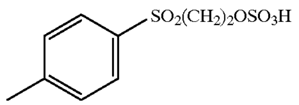 | bluish red |

Pos = Position of substituent in phenyl ring (definition also applies to the subsequent Tables)

The fiber-reactive moiety compound of formula

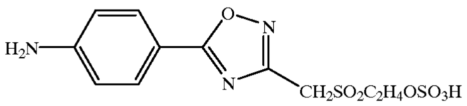

prepared from 3-chloromethyl-5-(4'-nitrophenyl)-1,2,4-oxadiazole by the method of Example 2 was diazotized under the conditions described in 2.1b) and coupled at pH 5 with N-acetyl-H-acid, prepared beforehand from H-acid and acetic anhydride in aqueous solution.

The dye of the formula

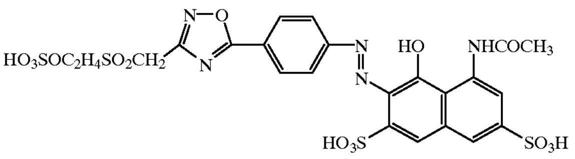

obtained by salting out with sodium chloride dyes cotton in a bright bluish-red shade having a good fastness profile.

Similar properties are possessed by the dyes listed below in Table 3.

TABLE 3

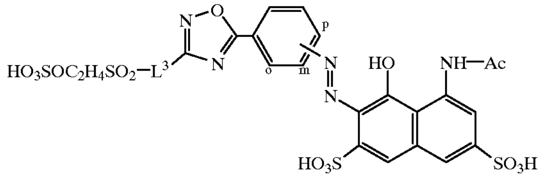

| Ex. No. | Ac | $L^3$ | Pos |
|---|---|---|---|
| 3.2 | $COC_6H_5$ | $(CH_2)_2$ | p |
| 3.3 | 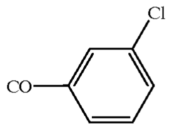 | $(CH_2)_2$ | p |
| 3.4 | $COC_2H_5$ | $(CH_2)_2$ | p |
| 3.5 | $CO(CH_2)_2COOH$ | $(CH_2)_2$ | p |
| 3.6 | $CO(CH_2)_2SO_3H$ | $(CH_2)_2$ | p |

TABLE 3-continued

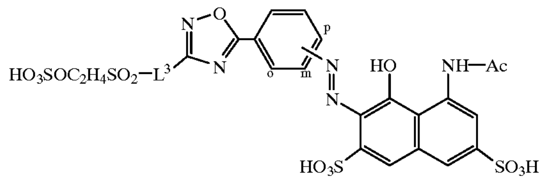

| Ex. No. | Ac | $L^3$ | Pos |
|---|---|---|---|
| 3.7 | 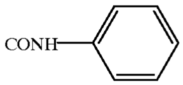 | $(CH_2)_2$ | p |
| 3.8 | 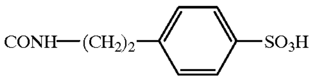 | $(CH_2)_2$ | p |
| 3.9 | $COC_6H_5$ | $(CH_2)_3$ | p |
| 3.10 | 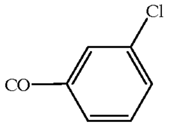 | $(CH_2)_3$ | p |
| 3.11 | $COC_2H_5$ | $(CH_2)_3$ | p |
| 3.12 | $CO(CH_2)_2COOH$ | $CH_2$ | p |
| 3.13 | $CO(CH_2)_2SO_3H$ | $(CH_2)_3$ | p |
| 3.14 | 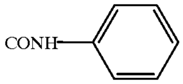 | $(CH_2)_3$ | p |
| 3.15 | 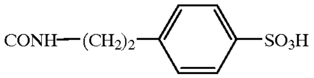 | $(CH_2)_3$ | p |
| 3.16 | 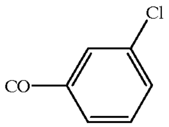 | $CH_2$ | p |
| 3.17 | $COC_2H_5$ | $(CH_2)_2O(CH_2)_2$ | p |
| 3.18 | 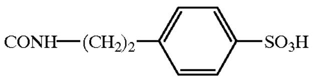 | $CH_2$ | p |
| 3.19 | $COCH_3$ | $(CH_2)_3$ | p |
| 3.20 | $COCH_3$ | $CH_2$ | p |
| 3.21 | $COCH_3$ | $(CH_2)_3$ | p |
| 3.22 | $COC_6H_6$ | $(CH_2)_2$ | o |
| 3.23 | $CO(CH_2)_2SO_3H$ | $(CH_2)_2$ | m |
| 3.24 | 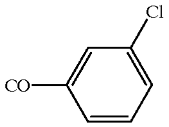 | $(CH_2)_3$ | m |

EXAMPLE 4.1 a) 18.5 g of cyanuric chloride were dispersed in 60 ml of a mixture of 60 ml of ice-water, 1 ml of 30% strength by weight hydrochloric acid and 0.5 g of a dispersant. A solution of 26.3 g of the disodium salt of H-acid in water, the solution further comprising 1 g of disodium phosphate, was added at 5–10° C., and complete reaction took place in the strongly acidic pH range. The resulting reaction mixture was admixed with a solution of 37.7 g of the compound of the formula

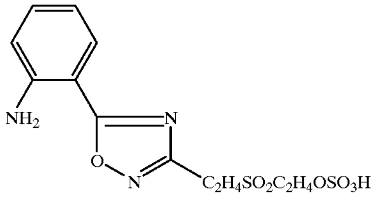

in 150 ml of water and 80 ml of 10% strength by weight aqueous sodium bicarbonate solution, and the reaction mixture was stirred at room temperature and pH 5 overnight.

The reaction product of the formula

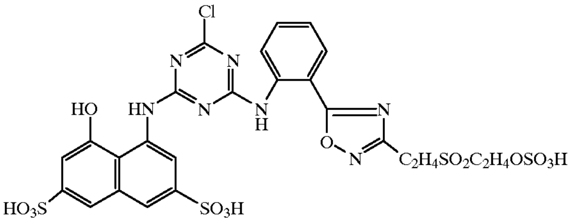

was precipitated with 180 g of sodium chloride, filtered off with suction and washed with 20% strength by weight aqueous sodium chloride solution.

b) 17 g of 2-aminonaphthalene-1,5-disulfonic acid were suspended in a mixture of 50 ml of water, 6 ml of 30% strength by weight hydrochloric acid and 50 g of ice and admixed with 16.5 ml of 3.33N aqueous sodium nitrite solution. After one-hour stirring at 5–10° C., the small excess of nitrous acid was destroyed with amidosulfuric acid, and the entire reaction mixture was combined with half the solution of the monochlorotriazine described under a) in 350 ml of water. Sodium bicarbonate was added at 15–20° C. to maintain a pH of 7 to 8 until the reaction had ended. The dye of the formula

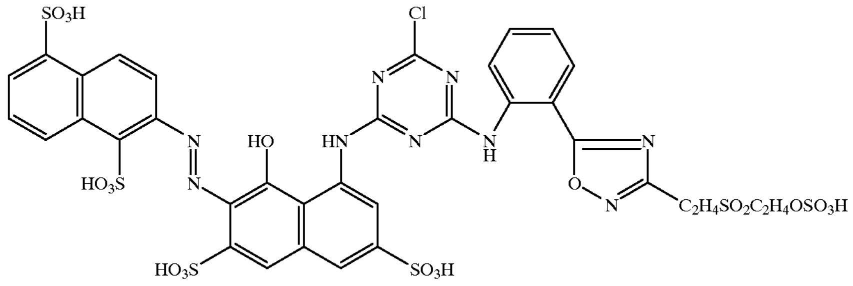
was precipitated with 230 g of potassium chloride and filtered off with suction. It dyes cotton from an alkaline bath in a bright bluish red shade having very good end-use fastness properties.
The same method affords the dyes listed below in Table 4.

TABLE 4
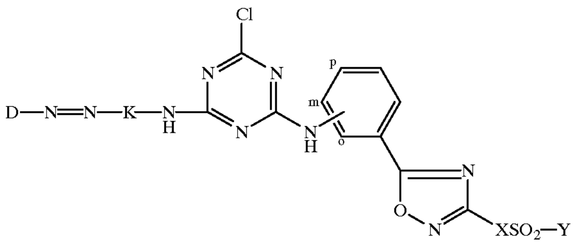
| No. | D | Ex. K | Pos | X | Y | Hue |
|---|---|---|---|---|---|---|
| 4.2 | 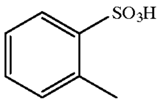 | 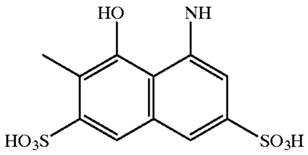 | o | $(CH_2)_2$ | $(CH_2)_2OSO_3H$ | red |
| 4.3 | 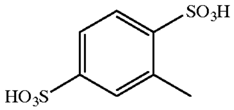 | 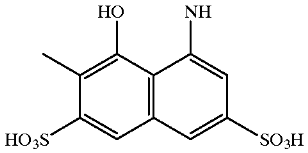 | o | $(CH_2)_2$ | $(CH_2)_2OSO_3H$ | yellowish red |
| 4.4 | 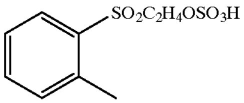 | 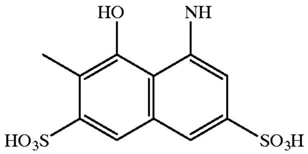 | p | $CH_2$ | $(CH_2)_2OCOCH_3$ | red |
| 4.5 | 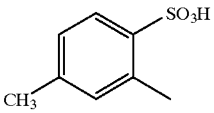 | 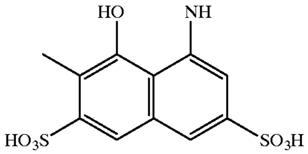 | m | $(CH_2)_2$ | $(CH_2)_2OSO_3H$ | bluish red |

TABLE 4-continued
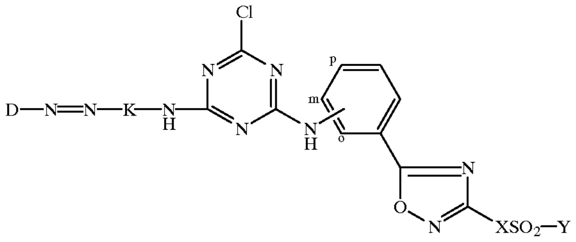
| No. | D | Ex. K | Pos | X | Y | Hue |
|---|---|---|---|---|---|---|
| 4.6 | 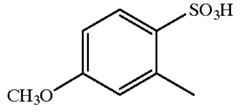 | 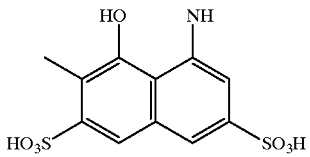 | p | $(CH_2)_2$ | $(CH_2)_2OSO_3H$ | bordeaux |
| 4.7 | 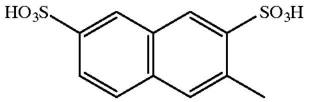 | 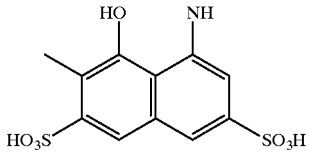 | o | $(CH_2)_2$ | $(CH_2)_2OSO_3H$ | red |
| 4.8 | 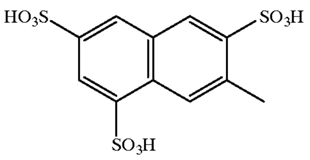 | 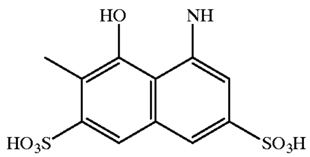 | m | $(CH_2)_2$ | $(CH_2)_2OSO_3H$ | bluish red |
| 4.9 | 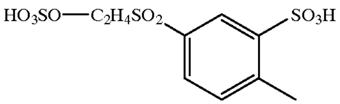 | 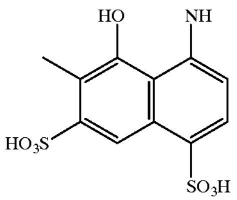 | o | $CH_2$ | $(CH_2)_2OSO_3H$ | bluish red |

TABLE 4-continued
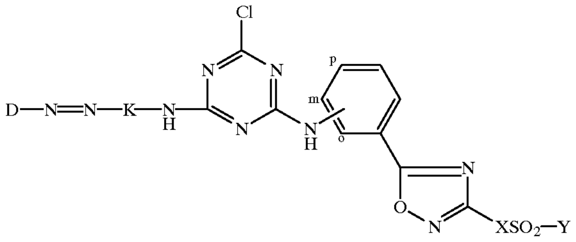
| No. | D | Ex. K | Pos | X | Y | Hue |
|---|---|---|---|---|---|---|
| 4.10 | 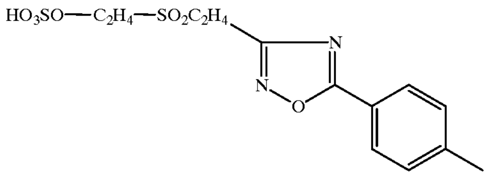 | 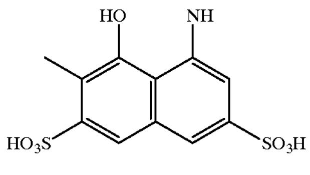 | m | $(CH_2)_2$ | $(CH_2)_2OSO_3H$ | red |
| 4.11 | 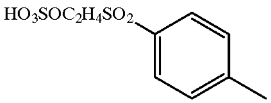 | 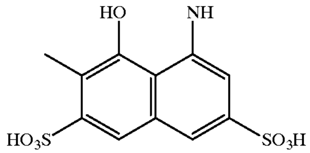 | o | $(CH_2)_2$ | $(CH_2)_2OSO_3H$ | bluish red |
| 4.12 | 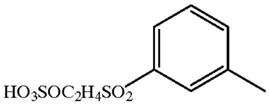 | 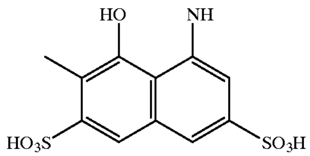 | p | $(CH_2)_2$ | $(CH_2)_2OSO_3H$ | red |
| 4.13 | 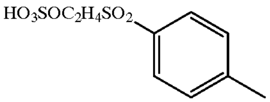 | 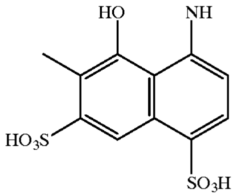 | m | $(CH_2)_2$ | $(CH_2)_2OSO_3H$ | red |

TABLE 4-continued
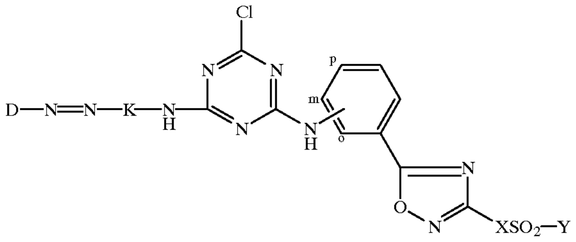
| No. | D | Ex. K | Pos | X | Y | Hue |
|---|---|---|---|---|---|---|
| 4.14 | 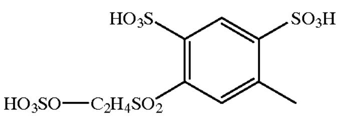 | 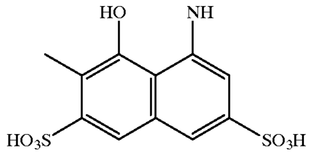 | o | $CH_2$ | $(CH_2)_2Cl$ | bluish red |
| 4.15 | 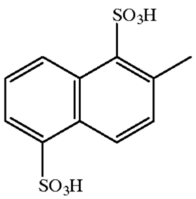 | 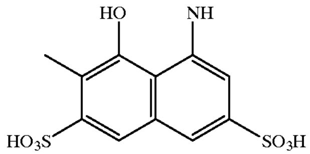 | m | $(CH_2)_3$ | $(CH_2)_2OSO_3H$ | bluish red |
| 4.16 | 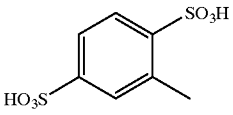 | 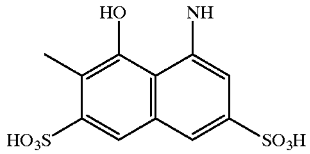 | m | $(CH_2)_3$ | $(CH_2)_2Cl$ | yellowish red |
| 4.17 | 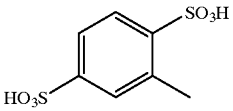 | 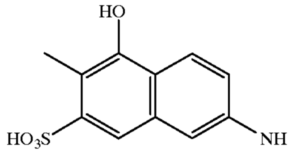 | p | $(CH_2)_2$ | $(CH_2)_2OSO_3H$ | orange |

TABLE 4-continued
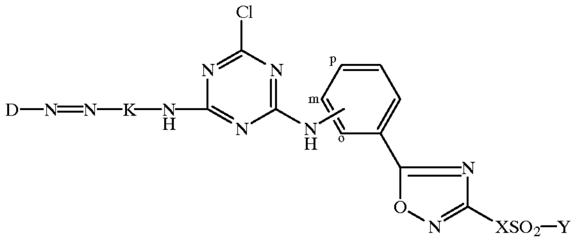
| No. | D | Ex. K | Pos | X | Y | Hue |
|---|---|---|---|---|---|---|
| 4.18 | 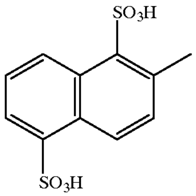 | 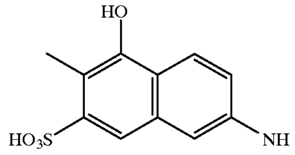 | o | $(CH_2)_2$ | $(CH_2)_2OSO_3H$ | reddish orange |
| 4.19 | 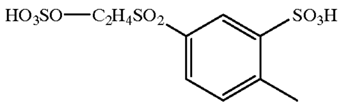 | 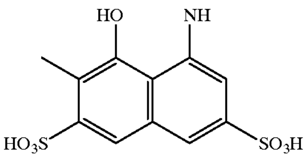 | o | $(CH_2)_2$ | $(CH_2)_2Cl$ | red |
| 4.20 | 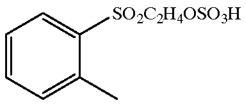 | 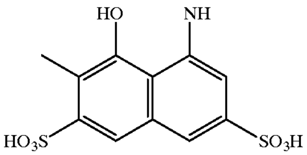 | m | $(CH_2)_2$ | $(CH_2)_2OSO_3H$ | red |
| 4.21 | 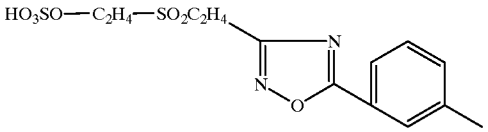 | 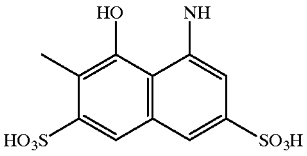 | o | $(CH_2)_2$ | $(CH_2)_2OSO_3H$ | red |

TABLE 4-continued
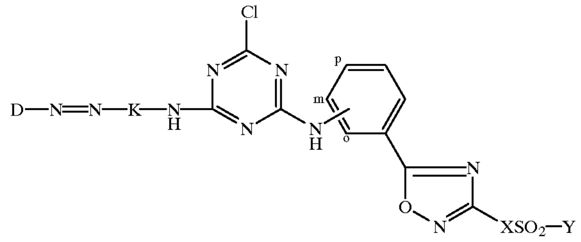
| Ex. No. | D | K | Pos | X | Y | Hue |
|---|---|---|---|---|---|---|
| 4.22 | 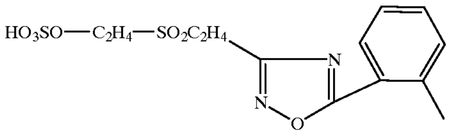 | 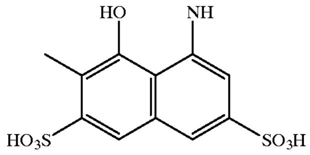 | o | $(CH_2)_2$ | $(CH_2)_2OSO_3H$ | red |
| 4.23 | 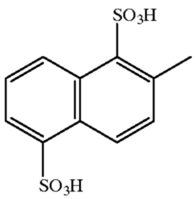 | 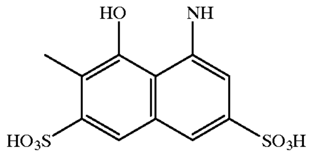 | p | $(CH_2)_2O(CH_2)_2$ | $(CH_2)_2OSO_3H$ | bluish red |
| 4.24 | 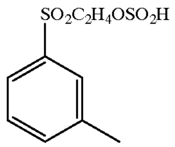 | 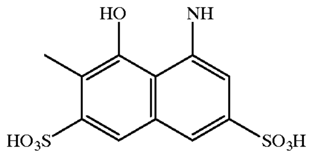 | o | $(CH_2)_3$ | $(CH_2)_2OSO_3H$ | bluish red |

EXAMPLE 5.1 a) 30.3 g of the sodium salt of 4-(2-Sulfatoethylsulfonyl)-aniline were dissolved in 500 ml of ice-water and admixed with 30 ml of 3.33N aqueous sodium nitrite solution. The diazotization was carried out by adding 30 ml of 30% strength by weight hydrochloric acid and stirring at 0–5° C. for one hour. After excess nitrous acid had been destroyed with amidosulfuric acid, the resulting dispersion of the diazonium salt was combined with a solution of 1-(4,6-dichloro-1,3,5-triazin-2-yl)amino-8-hydroxynaphthalene-4,6-disulfonic acid, prepared as follows:

A solution of 36.6 g of the disodium salt of K-acid and 25 g of sodium formate in 150 ml of water was added with thorough stirring to an ice-cold dispersion of 18.5 g of cyanuric chloride, 0.1 g of a dispersant, 1 ml of 30% strength by weight hydrochloric acid and 200 ml of ice-water, and the mixture was stirred at 5–10° C. and pH 1 for 2 h until the reaction had ended.

The coupling reaction was completed by buffering with sodium acetate solution (pH about 3) and 30 minutes' stirring at 10–15° C.

The dispersion of the resulting dichlorotriazinylazo dye was then admixed with 34.1 g of the monosodium salt of H-acid and adjusted to pH 5–5.5 by sprinkling with sodium bicarbonate, the temperature rising to 20° C. After 2 hours' stirring at 20–25° C. while the abovementioned pH was maintained, the reaction had ended and the dye of the formula

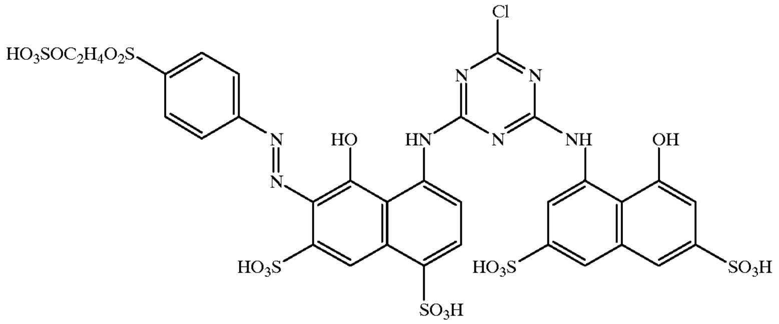

was completely precipitated by means of potassium chloride, filtered off with suction and washed with 5% strength by weight aqueous potassium chloride solution.

b) 0.05 mol of the dye described under a) was admixed with the fiber-reactive moiety compound described under Example 1c). Buffering with sodium acetate to a pH of 5 completed the coupling reaction. The dye of the formula

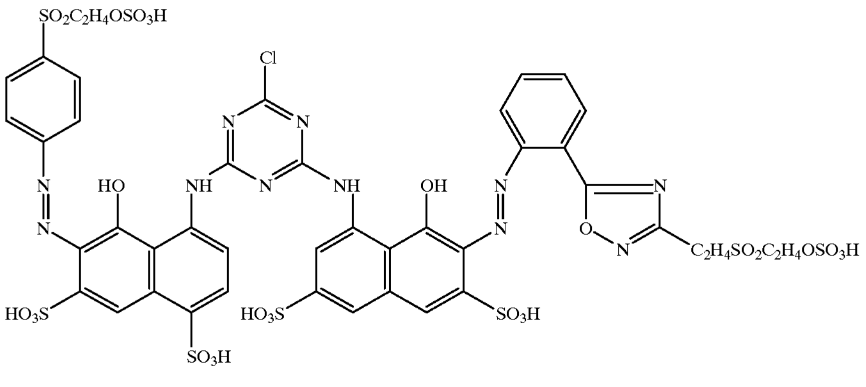

was precipitated with 130 g of potassium chloride, filtered off with suction, washed with 20% strength by weight aqueous potassium chloride solution and dried at 40° C. under reduced pressure.

The dye dyes cotton, both by the hot exhaust method and the cold pad-batch method, in bright neutral reds having very high color strength with a very high degree of fixation and high insensitivity to temperature fluctuations.

EXAMPLE 5.2

The sulfatoethylsulfonylaniline used in Example 5.1a) was replaced with an equivalent amount of the fiber-reactive moiety compound described under Example 1c) and then the method of Example 5.1b) was followed, affording the dye of the formula

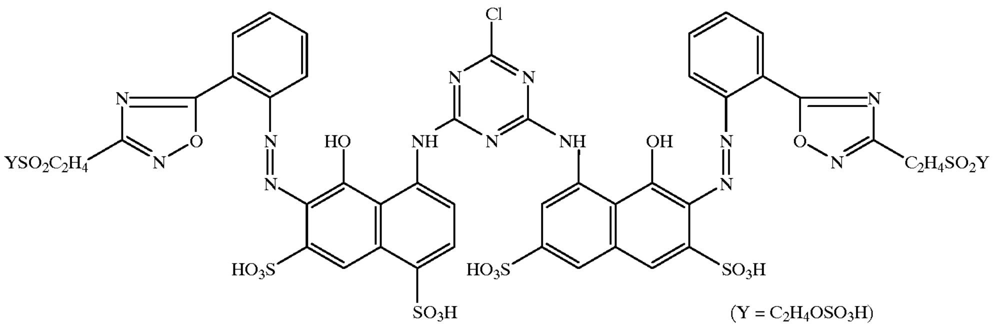

($Y = C_2H_4OSO_3H$)

The methods of Examples 5.1 and 5.2 also afford the following dyes shown in Table 5:

TABLE 5

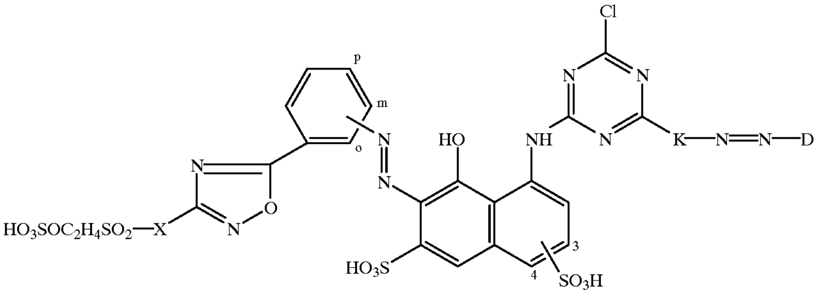

| Ex. No. | X | Pos | Pos. of $SO_3H$ group | K | D | Color |
|---|---|---|---|---|---|---|
| 5.3 | $C_2H_4$ | m | 4 | 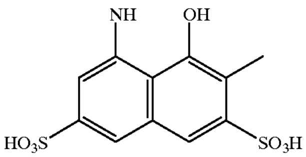 | 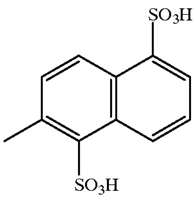 | bluish red |

TABLE 5-continued

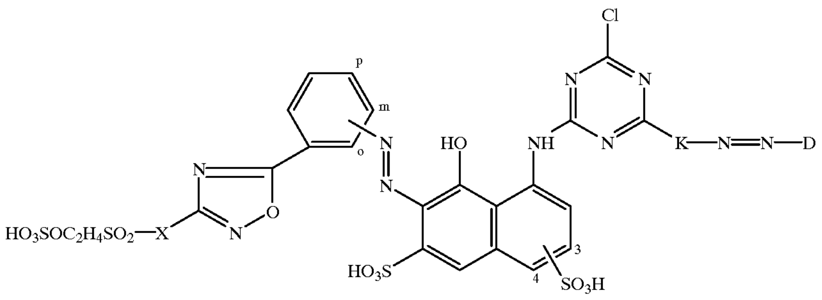

| Ex. No. | X | Pos | Pos. of $SO_3H$ group | K | D | Color |
|---|---|---|---|---|---|---|
| 5.4 | $C_3H_6$ | m | 3 | 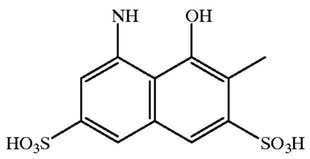 | 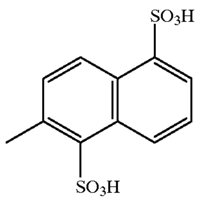 | bluish red |
| 5.5 | $CH_2$ | o | 3 | 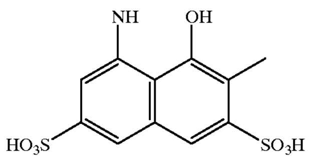 | 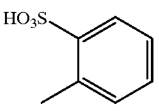 | bluish red |
| 5.6 | $C_2H_4$ | o | 4 | 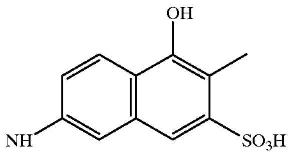 | 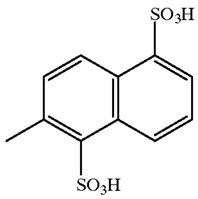 | scarlet |

EXAMPLE 6.1

8.9 g of the fiber-reactive moiety compound described under 1c) (5-(2'-aminophenyl)-3-[2-(2-sulfatoethylsulfonyl)ethyl]-1,2,4-oxadiazole) were diazotized as described in Example 5.1, combined with the dispersion of 16.5 g of the monosodium salt of H-acid in 150 ml of water and coupled at pH≦and 10° C.

The monoazo dye formed was combined with a further equivalent of the fiber-reactive moiety compound described under 1c) after its diazotization and coupled with sodium acetate at pH 5. The dye of the formula

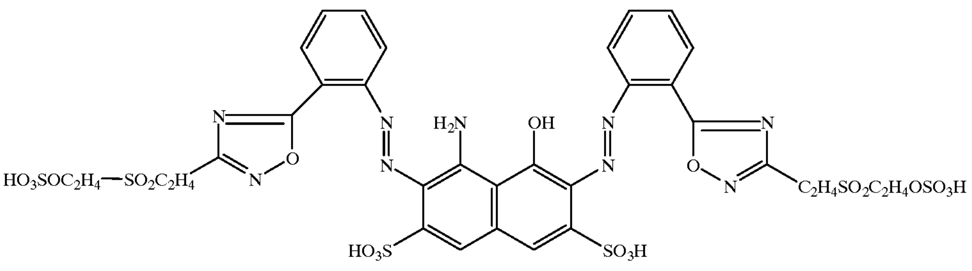

was precipitated as potassium salt, filtered off with suction, washed with 70% strength by weight aqueous ethanol and dried at 40° C. under reduced pressure.

It dyes cotton in neutral navies and blacks substantially irrespectively of dyeing methods and temperatures employed.

The same method affords the dyes listed below in Table 6.

TABLE 6
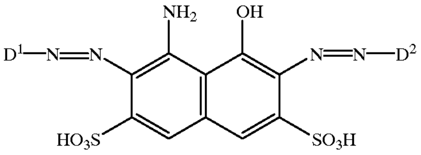
| Ex. No. | $D^1$ | $D^2$ |
|---|---|---|
| 6.2 | 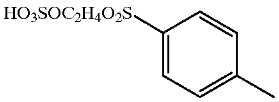 | 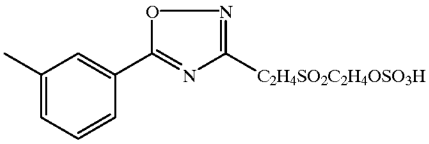 |
| 6.3 | 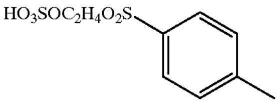 | 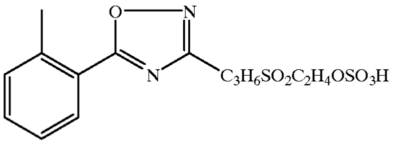 |
| 6.4 | 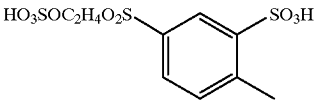 | 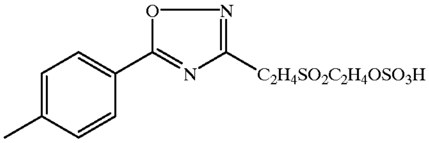 |
| 6.5 | 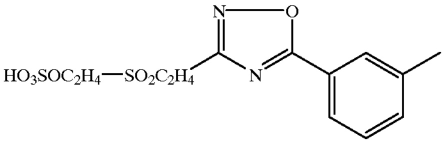 | 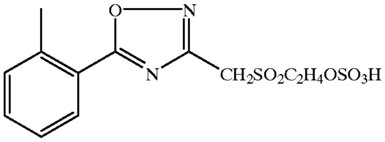 |
| 6.6 | 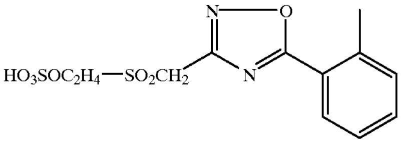 | 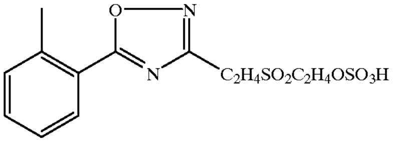 |
| 6.7 | 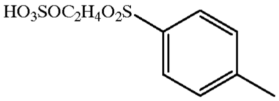 | 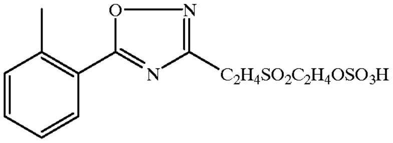 |
| 6.8 | 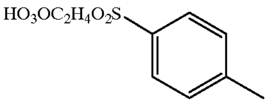 | 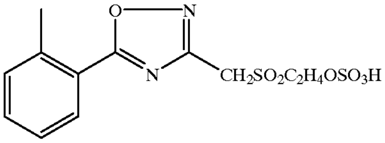 |
| 6.9 | 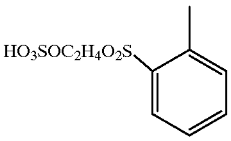 | 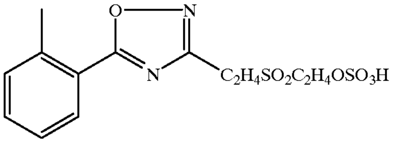 |

EXAMPLE 7.1 a) 29.7 g of the compound of the formula

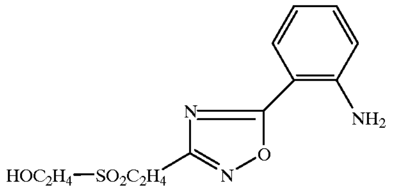

were suspended in 300 ml of water and 30 ml of 30% strength by weight hydrochloric acid and, after cooling with 100 g of ice, diazotized with 30 ml of 3.33N aqueous sodium nitrite solution. After 30 minutes' stirring at 0–5° C., the small excess of nitrous acid was destroyed with amidosulfuric acid and the diazonium salt solution was combined with a solution of 10.7 g of m-toluidine in 100 ml of water and 10 ml of 30% strength by weight hydrochloric acid. Saturated sodium acetate solution was used to set a pH of 1.5 and maintain it at room temperature overnight. The hydrochloride of the dye of the formula

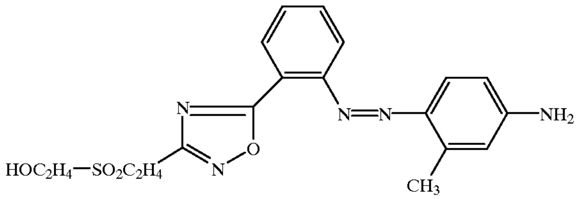

was filtered off with suction, washed with water rendered acid with hydrochloric acid and dried at 60° C. under reduced pressure.

b) 32 g of the compound described under a) were stirred in 200 g of concentrated sulfuric acid and held at 40° C. for 3 h until the sulfuric ester had formed to a substantial extent. 90 g of 65% strength by weight oleum and two hours' stirring at 80° C. brought about sulfonation. The resulting dye of the formula

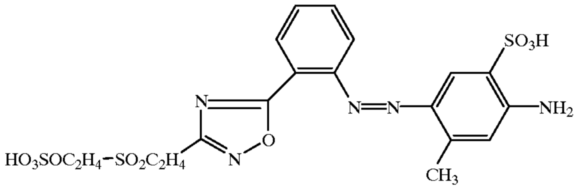

was stirred out onto 1000 g of ice and filtered off with suction.

c) The aqueous filter residue of Example 7.1b) which comprised sulfuric acid, was suspended in 150 ml of water and admixed at 10–15° C. with 11 ml of 3.33N aqueous sodium nitrite solution. After 30 minutes' stirring at 10–15° C., the excess of nitrous acid was destroyed and the diazonium salt solution was admixed with the solution of 24 g of the compound of the formula

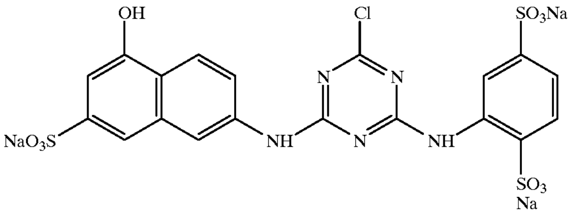

in 150 ml of water. Buffering with aqueous sodium acetate solution to pH 5 brought about the coupling to form the dye of the formula

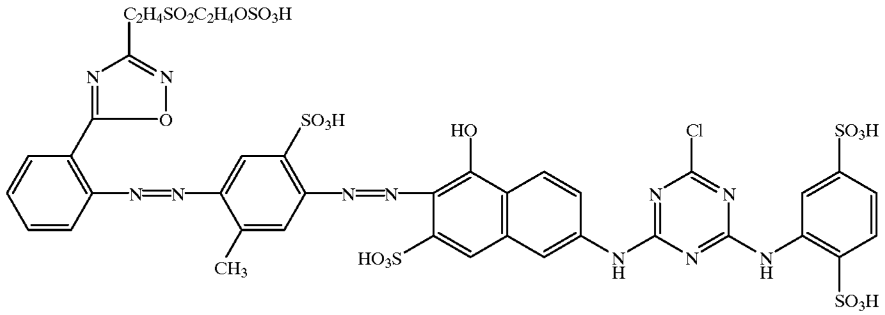

which was isolated as sodium salt. It dyes cotton in bright tile red shades having a good fastness profile.

EXAMPLE 8.1

The solution of the reaction product of cyanuric chloride with H-acid (as described under 4.1a)) was coupled at pH 5 with 5-(2'-aminophenyl)-3-[2-(2-sulfatoethyl-)sulfonylethyl]-1,2,4-oxadiazole diazotized as per Example 5.1. After addition of 5.4 g of p-phenylenediamine, the mixture was stirred at room temperature at pH 6 for about 6 hours.

After warming to 40° C. and pH 5, the condensation was complete, and the dye of the formula

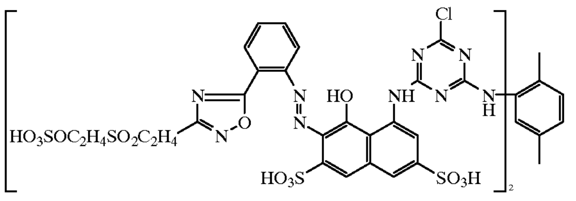

was obtained. The dye was precipitated with sodium chloride, filtered off with suction, washed with 15% strength by weight aqueous sodium chloride solution and dried at 40° C. under reduced pressure. It dyes cotton with a very high color yield in a bluish red shade of high brilliance.

EXAMPLE 8.2

First the dye of the formula

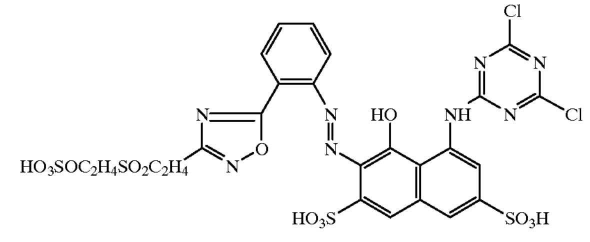

obtained in Example 8.1 by coupling was condensed with the equivalent amount of 2-methylamino-4-aminobenzenesulfonic acid at pH 5 and 25° C. Then it was reacted, under the same reaction conditions, with the dye of the formula

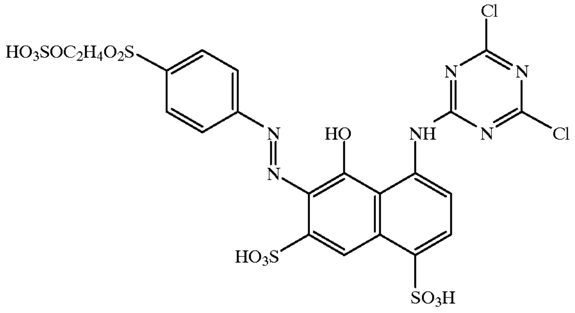

described in Example 5.1a) to obtain the dye of the formula

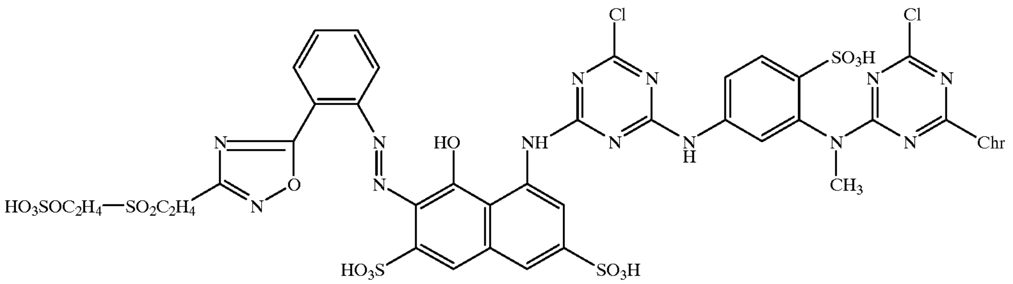

Chr =

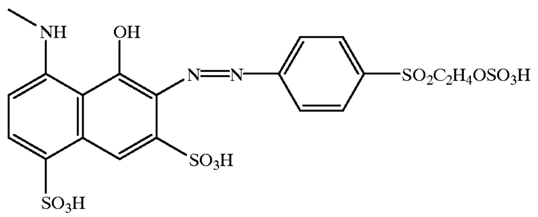

in high yield. It dyes cotton in a neutral red shade.

The same method affords the dyes listed below in Tables 7 and 8.

TABLE 7
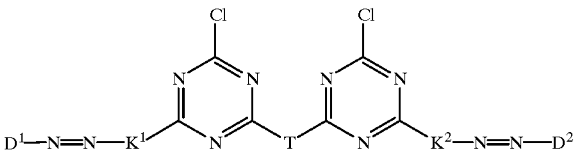
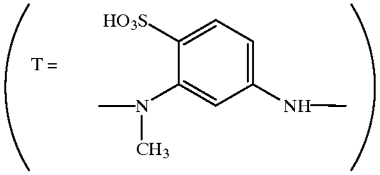
| Ex. No. | $D^1$ | $K^1$ | $K^2$ | $D^2$ | Hue |
|---|---|---|---|---|---|
| 8.3 |  | 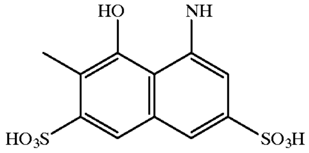 | 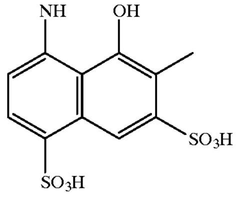 |  | red |
| 8.4 |  | 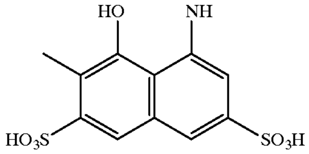 | 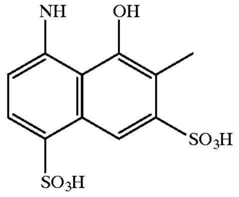 | 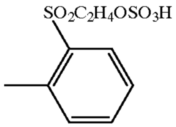 | red |

TABLE 7-continued
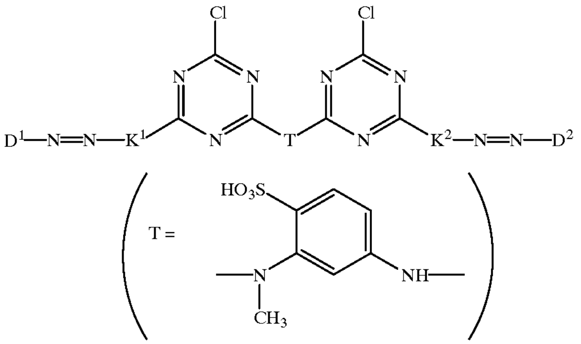
| Ex. No. | $D^1$ | $K^1$ | $K^2$ | $D^2$ | Hue |
|---|---|---|---|---|---|
| 8.5 | 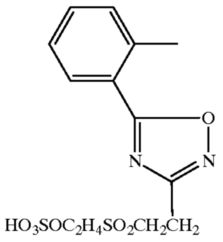 | 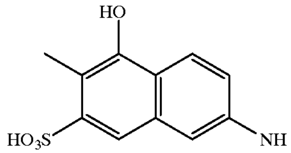 | 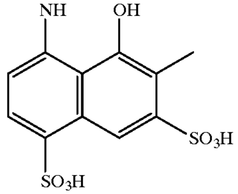 | 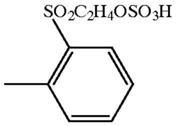 | yellowish red |
| 8.6 | 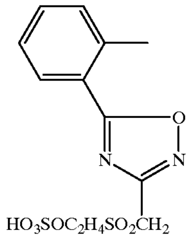 | 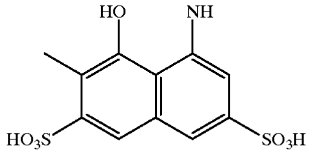 | 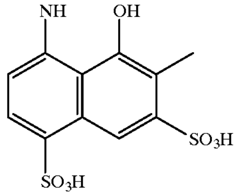 | 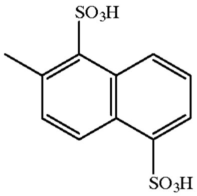 | bluish red |

TABLE 7-continued
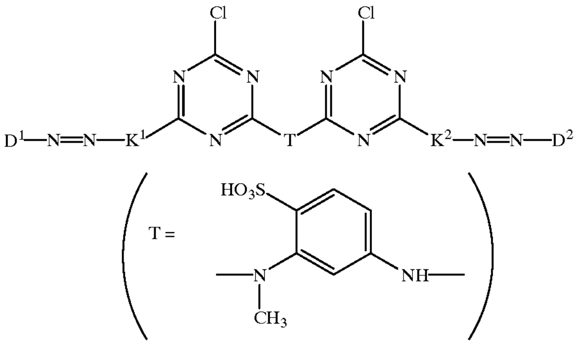
| Ex. No. | $D^1$ | $K^1$ | $K^2$ | $D^2$ | Hue |
|---|---|---|---|---|---|
| 8.7 | 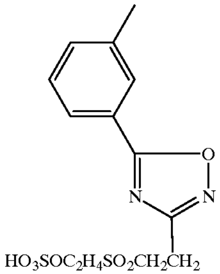 | 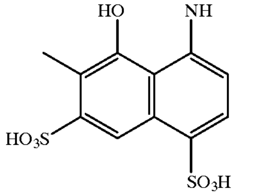 | 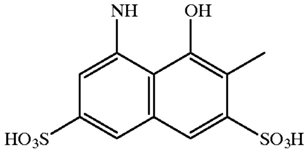 | 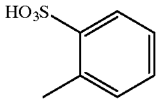 | red |
| 8.8 | 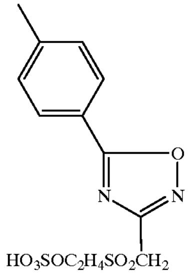 | 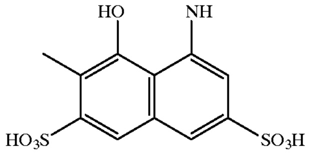 | 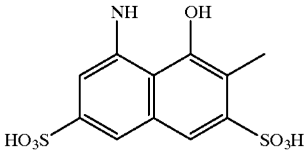 | 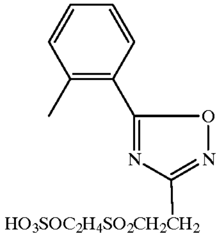 | red |

TABLE 8
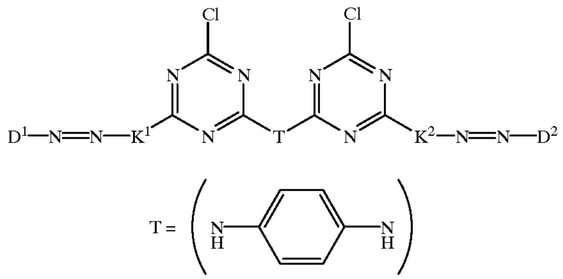
| Ex. No. | $D^1$ | $K^1$ | $K^2$ |
|---|---|---|---|
| 8.9 | 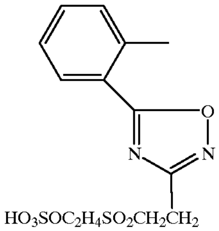 | 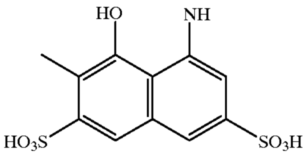 | 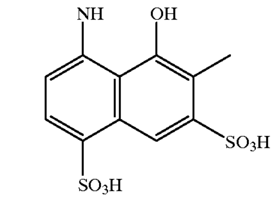 |
| 8.10 | 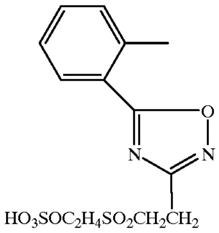 | 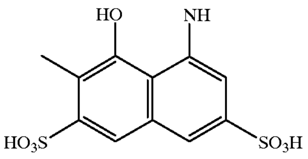 | 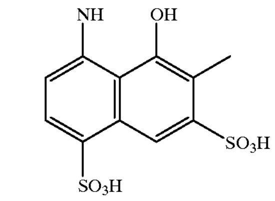 |
| 8.11 | 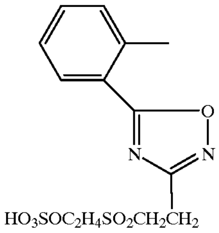 | 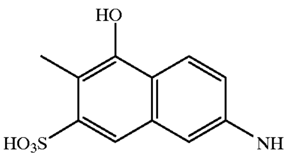 | 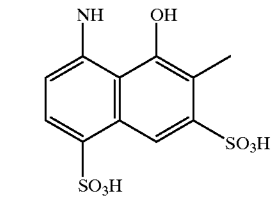 |
| 8.12 | 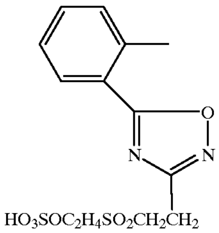 | 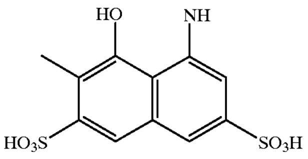 | 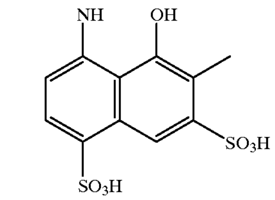 |
| 8.13 | 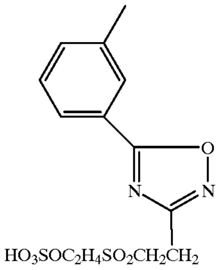 | 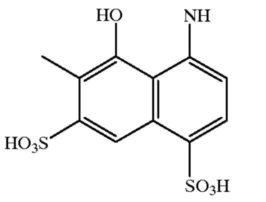 | 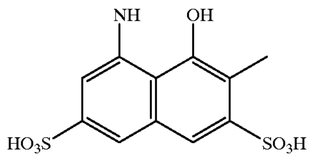 |

TABLE 8-continued
| | | | |
|---|---|---|---|
| 8.14 | 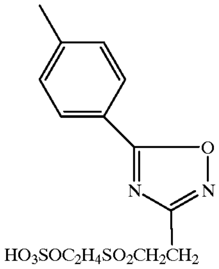 | 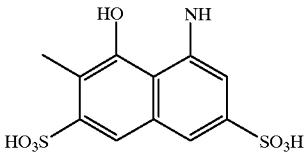 | 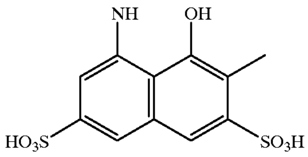 |
| Ex. No. | $D^2$ | Hue |
|---|---|---|
| 8.9 | 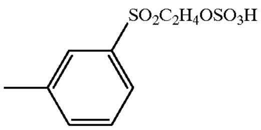 | red |
| 8.10 | 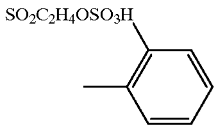 | red |
| 8.11 | 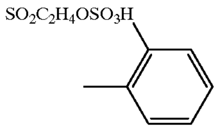 | yellowish red |
| 8.12 | 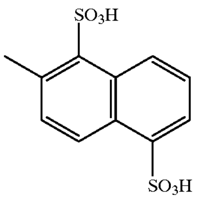 | bluish red |
| 8.13 | 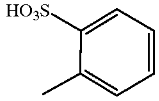 | red |
| 8.14 | 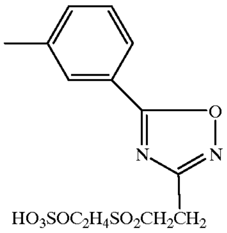 | red |

EXAMPLES OF TABLE 9
By following Example 6.1 it is possible to use the coupling component of the formula
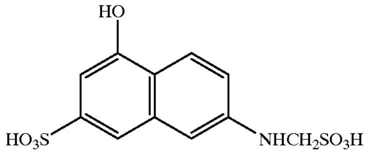
to prepare the disazo dyes of Table 9, which dye cotton in a reddish brown shade from an alkaline bath. They are high-yielding and have a very good fastness profile.
TABLE 9
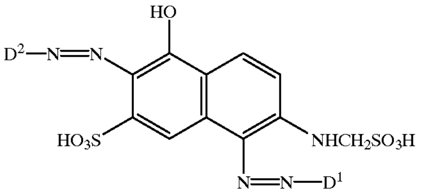
| Ex. No. | $D^1$ | $D^2$ |
|---|---|---|
| 9.1 | 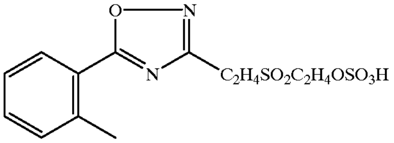 | 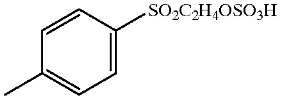 |
| 9.2 | 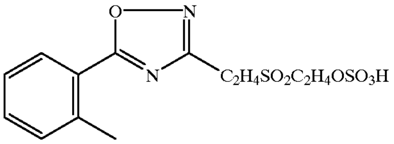 | 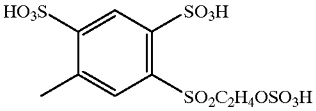 |
| 9.3 | 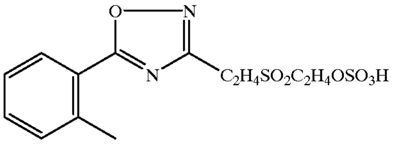 | 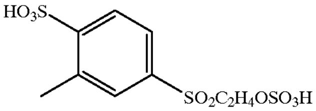 |
| 9.4 | 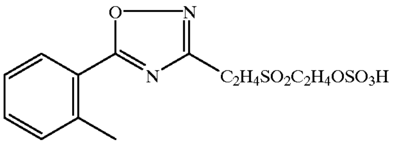 | 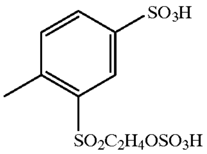 |
| 9.5 | 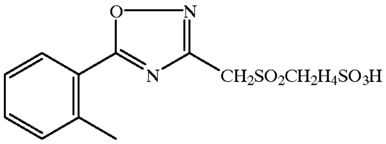 | 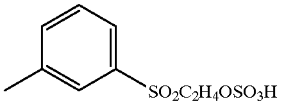 |

TABLE 9-continued

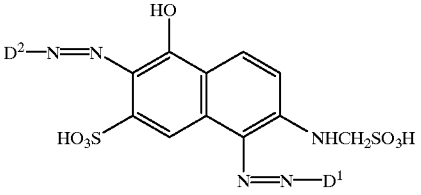

| Ex. No. | $D^1$ | $D^2$ |
|---|---|---|
| 9.6 | 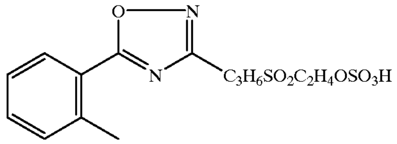 | 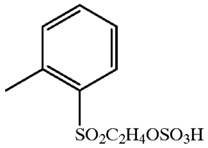 |
| 9.7 | 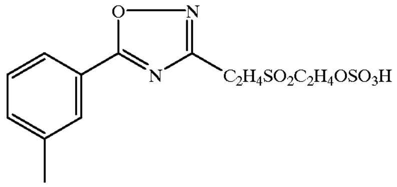 | 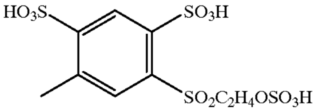 |
| 9.8 | 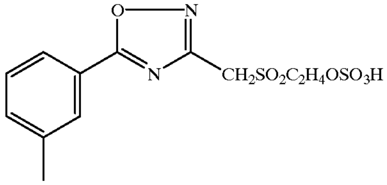 | 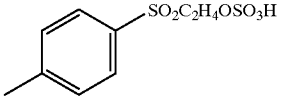 |
| 9.9 | 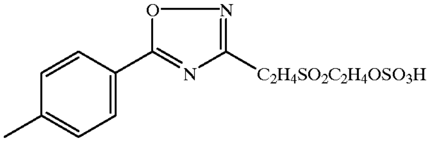 | 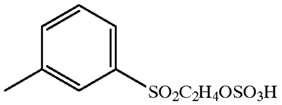 |
| 9.10 | 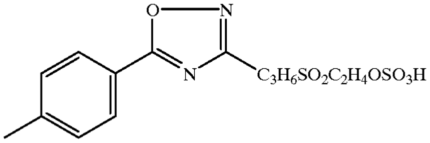 | 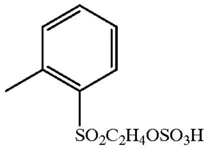 |

EXAMPLE 10.1 a) 58.6 g of 4-(2-sulfatoethylsulfonyl)aniline were suspended in 600 ml of ice-water and 80 ml of 30% strength by weight hydrochloric acid and diazotized with 60 ml of 3.33N aqueous sodium nitrite solution at 0–5° C. After two hours' stirring at 0–50° C., the small nitrite excess was removed with amidosulfuric acid, and 39.7 g of orthanilic acid were added for coupling. The coupling took place at pH 3 through addition of solid sodium acetate. 300 g of sodium chloride were added to obtain 92 g of a yellow dye of the formula

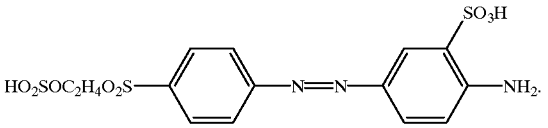

b) 37.7 g of 5-(2'-aminophenyl)-3-[2-(2-sulfatoethylsulfonyl)-ethyl]-1,2,4-oxadiazole were suspended in 400 ml of ice-water and 40 ml of 30% strength by weight hydrochloric acid and diazotized with 30 ml of 3.33N aqueous sodium nitrite solution at 0–50° C. After two hours' stirring at 0–5° C., a slight nitrite excess was removed with amidosulfuric acid, and 25.7 g of 2-amino-5-hydroxynaphthalene-7-sulfonic acid were added. Coupling took place at pH 2.5–3 through addition of solid sodium acetate. After stirring overnight, the pH was adjusted to 3.5 with sodium acetate, and the product was filtered off, affording 128 g of a red monoazo dye of the formula

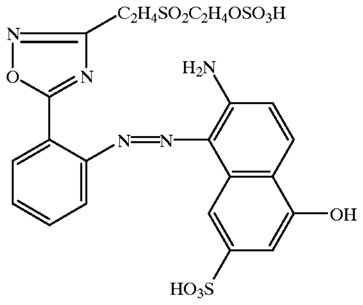

c) 92 g of the monoazo dye prepared under 10.1a) were suspended in 500 ml of ice-water and 20 ml of 30% strength by weight hydrochloric acid and diazotized with 15 ml of 3.33N aqueous sodium nitrite solution. After two hours' stirring at 0–5° C., the small nitrite excess was removed with amidosulfuric acid. The resulting diazonium salt was admixed with 64 g of the monoazo dye prepared under b). Coupling took place at pH 5–5.5 through addition of solid sodium acetate and sodium carbonate. 300 g of sodium chloride were added to obtain 102 g of a reddish brown trisazo dye.

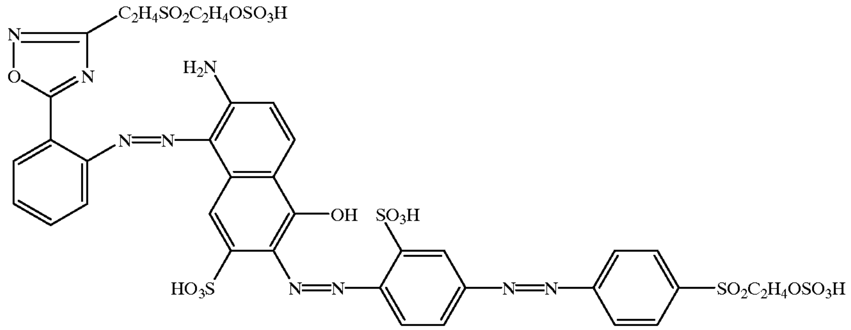

The trisazo dyes of Table 10 can be prepared similarly to Example 10.1. They dye cotton reddish brown from an alkaline bath and have a very good property profile.

TABLE 10
$D^1—N{=}N—K—N{=}N—D^2$
| Ex. No. | $D^1$ | K |
|---|---|---|
| 10.2 | 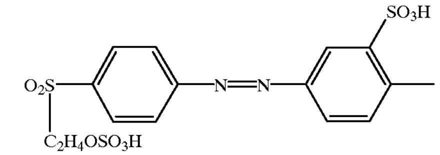 | 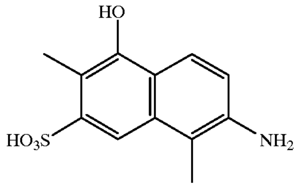 |
| 10.3 | 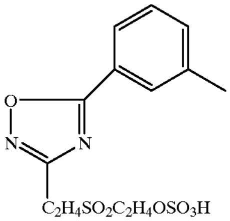 | 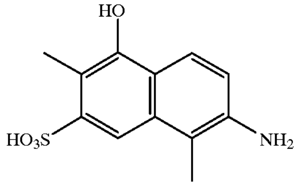 |
| 10.4 | 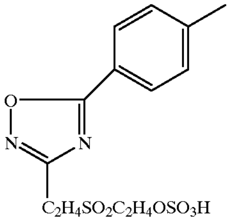 | 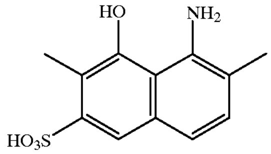 |
| 10.5 | 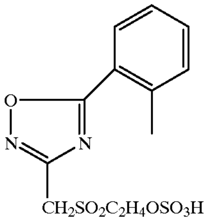 | 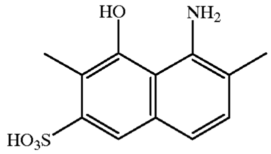 |
| 10.6 | 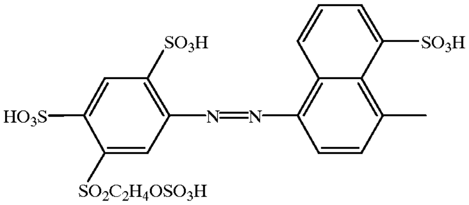 | 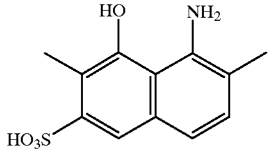 |
| 10.7 | 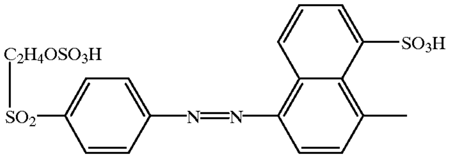 | 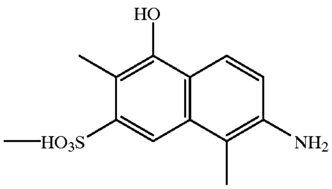 |

TABLE 10-continued $D^1—N=N—K—N=N—D^2$

| Ex. No. | $D^2$ |
|---|---|
| 10.2 | 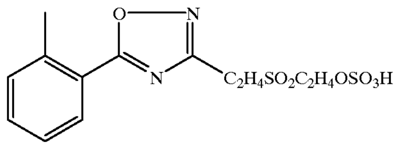 |
| 10.3 | 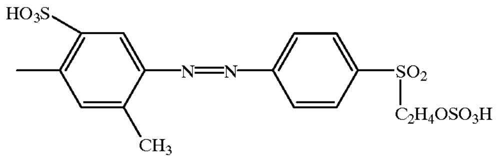 |
| 10.4 | 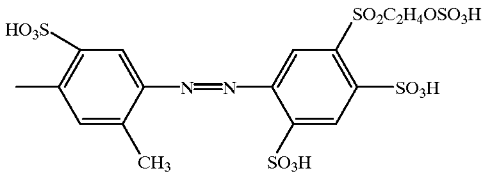 |
| 10.5 | 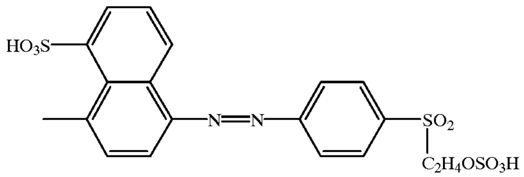 |
| 10.6 | 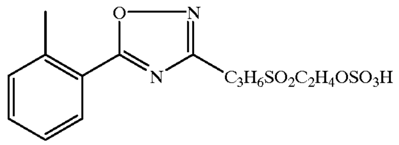 |
| 10.7 | 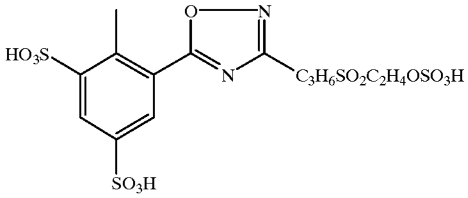 |

EXAMPLE 11.1

41.4 g of the compound of the formula

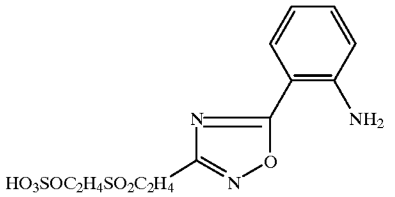

were suspended in 250 ml of water at 0–5° C. The pH was reduced to 1 with 18% strength by weight hydrochloric acid. The compound was diazotized by dropwise addition of 30 ml of 3.33N aqueous sodium nitrite solution.

After 30 minutes' stirring at 0–5° C., the slight nitrite excess was removed with amidosulfuric acid and the suspension of the diazonium salt was then admixed with 19.6 g of the pyridone of the formula

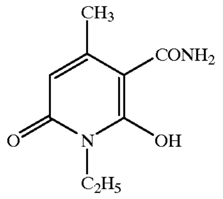

The pH was raised to 4.5–5.5 by addition of sodium carbonate, and then the reaction mixture was stirred at 0–5° C. at the stated pH for 4 h until coupling was complete.

Precipitation with 100 g of sodium chloride, filtration with suction and drying under reduced pressure led to 78 g of a greenish yellow electrolyte-comprising dye of the formula

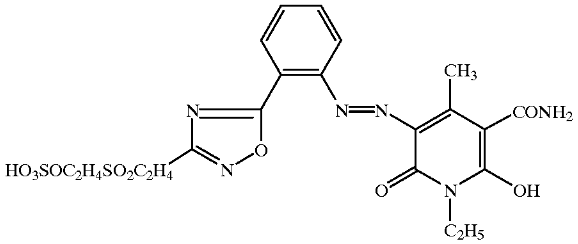

being obtained.

The method of Example 11.1 also affords the dyes listed below in Table 11.

TABLE 11

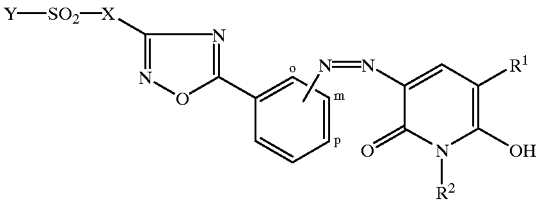

| Ex. | $R^1$ | $R^2$ | Pos | X | Y | Hue |
|---|---|---|---|---|---|---|
| 11.2 | H | $C_2H_5$ | o | $CH_2CH_2$ | $CH_2CH_2OSO_3H$ | greenish yellow |
| 11.3 | CN | $C_2H_5$ | o | $CH_2CH_2$ | $CH_2CH_2OSO_3H$ | greenish yellow |
| 11.4 | $CH_2SO_3H$ | $CH_3$ | o | $CH_2$ | $CH_2CH_2OSO_3H$ | greenish yellow |
| 11.5 | $CH_2SO_3H$ | $C_2H_5$ | m | $CH_2CH_2$ | $CH_2CH_2OSO_3H$ | greenish yellow |
| 11.6 | $CONH_2$ | $C_2H_5$ | m | $CH_2CH_2CH_2$ | $CH_2CH_2Cl$ | greenish yellow |
| 11.7 | $CONH_2$ | 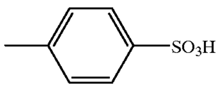 | p | $CH_2CH_2$ | $CH_2CH_2OSO_3H$ | greenish yellow |
| 11.8 | $CH_2SO_3H$ | 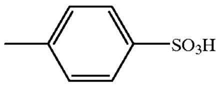 | o | $CH_2CH_2$ | $CH_2CH_2OSO_3H$ | greenish yellow |
| 11.9 | $CONH_2$ | 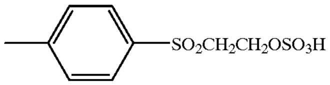 | o | $CH_2CH_2$ | $CH_2CH_2OSO_3H$ | greenish yellow |
| 11.10 | $SO_3H$ | $C_2H_5$ | o | $CH_2CH_2$ | $CH_2CH_2OSO_3H$ | greenish yellow |
| 11.11 | $CH_2SO_3H$ | 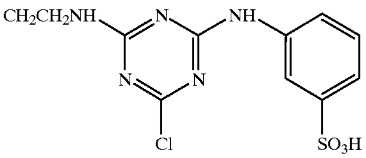 | p | $CH_2CH_2$ | $CH_2CH_2OSO_3H$ | greenish yellow |
| 11.12 | $CH_2SO_3H$ | 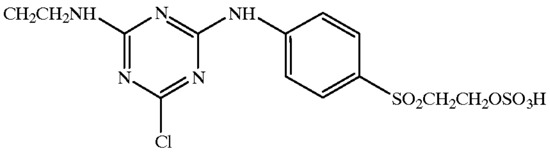 | m | $CH_2CH_2$ | $CH_2CH_2OSO_3H$ | greenish yellow |

EXAMPLE 12.1

Example 11.1 was repeated using as coupling component the pyrazole compound of the formula

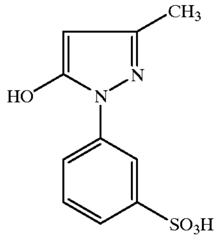

and, after precipitation with sodium chloride, filtration with suction and drying under reduced pressure, obtaining the dye of the formula

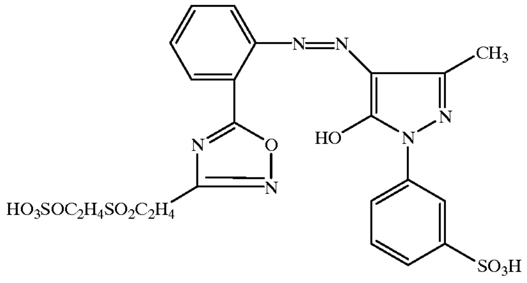

which dyes cotton in bright greenish yellow shades by the methods customary for reactive dyes.

Using similar coupling components it is possible to obtain the dyes listed below in Table 12.

TABLE 12

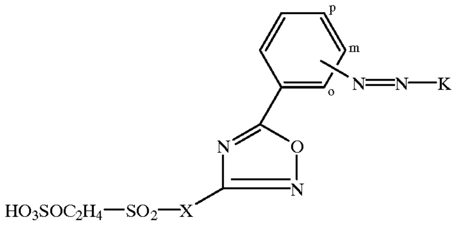

| Ex. No. | K | X | Hue |
|---|---|---|---|
| 12.2 | 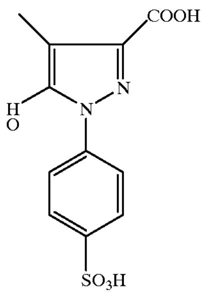 | $(CH_2)_2$ o | yellow |
| 12.3 | 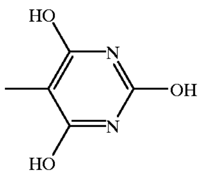 | $CH_2$ m | greenish yellow |
| 12.4 | 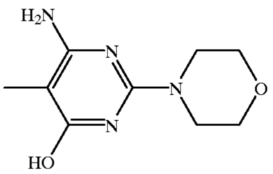 | $(CH_2)_3$ p | yellow |

TABLE 12-continued
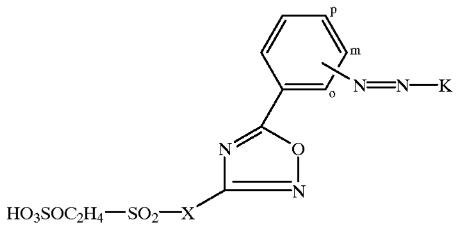
| Ex. No. | K | X | | Hue |
|---|---|---|---|---|
| 12.5 | 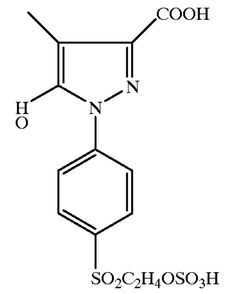 | $(CH_2)_2$ | o | greenish yellow |
| 12.6 | 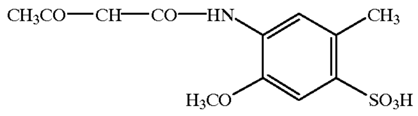 | $(CH_2)_2$ | o | greenish yellow |
| 12.7 | 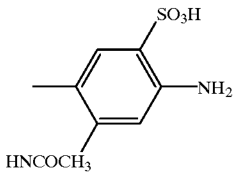 | $CH_2$ | p | golden yellow |
| 12.8 | 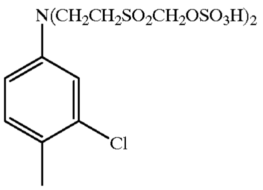 | $CH_2$ | p | orange |
| 12.9 | 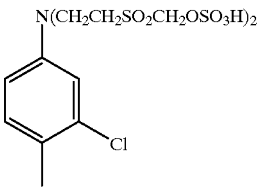 | $CH_2$ | m | orange |

EXAMPLE 13.1

54.8 g of the dye of the formula

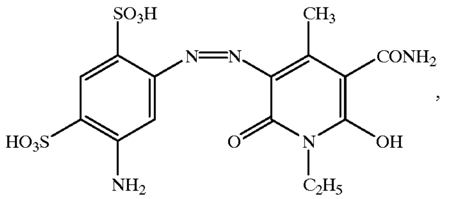

obtained by diazotization of 2,4-diaminobenzene-1,5-disulfonic acid and coupling at pH 5 with 1-ethyl-2-hydroxy-3-carbamoyl-4-methyl-6-pyridone, were dissolved in 350 ml of water at pH 5.5 and cooled down to 0–5° C. 18.4 g of cyanuric chloride dissolved in 100 ml of acetone were then added dropwise, and the reaction mixture was then stirred at 0–5° C. for 3 h to complete the reaction. During the dropwise addition and subsequent stirring, the pH was maintained within the range from 5.0 to 5.5 by addition of 5% strength by weight aqueous sodium bicarbonate solution.

Addition of 49.7 g of the compound of the formula

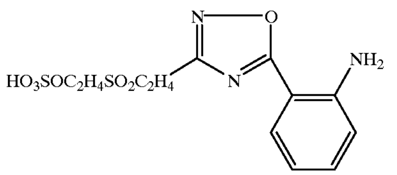

was followed by heating to 40–45° C. and subsequent stirring at that temperature for 5 h during which the pH was held within the range from 5.5 to 6.0 using 5% strength by weight aqueous sodium bicarbonate solution.

Precipitation with 200 g of sodium chloride, filtration with suctin and drying was used to isolate the dye of the formula

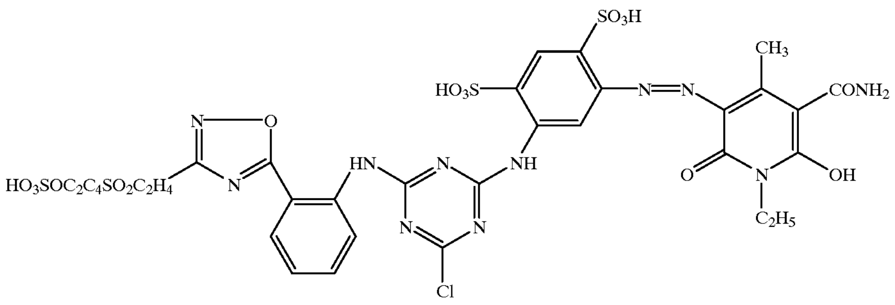

which dyes cotton in greenish yellow shades either by the exhaust method at 40–50° C. or the cold pad-batch method.

The dyes listed below in Table 13 are obtained in a similar manner.

TABLE 13
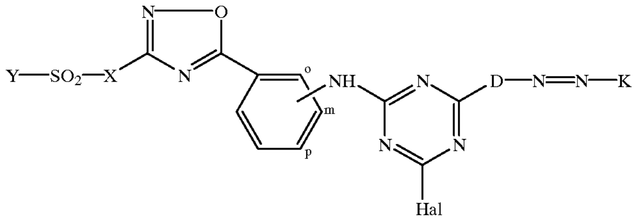
| Ex. No. | X | Hal | Y | D | K | Pos | Hue |
|---|---|---|---|---|---|---|---|
| 13.2 | $CH_2CH_2$ | Cl | $CH_2CH_2OSO_3H$ | 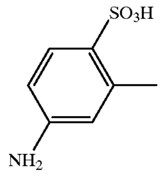 | 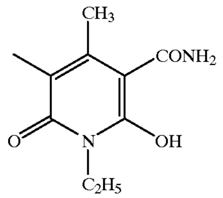 | o | greenish yellow |
| 13.3 | $CH_2CH_2$ | Cl | $CH_2CH_2OSO_3H$ | 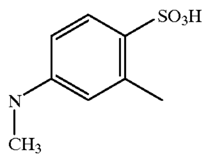 | 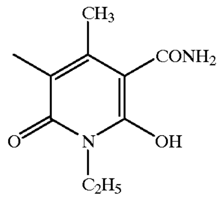 | o | greenish yellow |
| 13.4 | $CH_2CH_2$ | Cl | $CH_2CH_2OSO_3H$ | 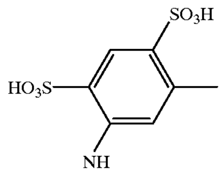 | 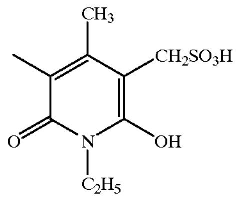 | p | greenish yellow |
| 13.5 | $CH_2CH_2$ | F | $CH_2CH_2OSO_3H$ | 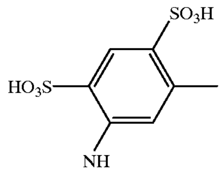 | 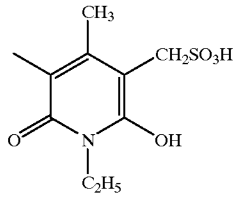 | o | greenish yellow |
| 13.6 | $CH_2CH_2$ | F | $CH_2CH_2OSO_3H$ | 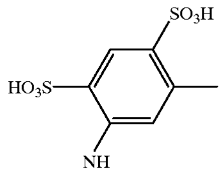 | 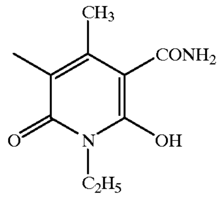 | m | greenish yellow |
| 13.7 | $(CH_2)_3$ | Cl | $CH_2CH_2OSO_3H$ | 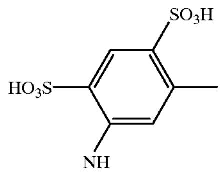 | 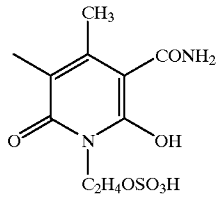 | m | greenish yellow |

TABLE 13-continued

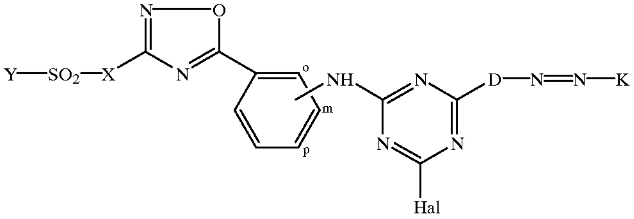

| Ex. No. | X | Hal | Y | D | K | Pos | Hue |
|---|---|---|---|---|---|---|---|
| 13.8 | $CH_2CH_2$ | Cl | $CH_2CH_2OSO_3H$ | 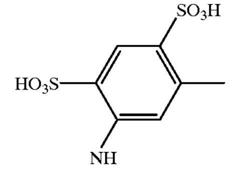 | 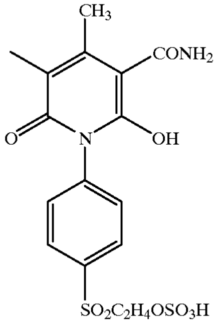 | o | greenish yellow |
| 13.9 | $CH_2CH_2$ | Cl | $CH_2CH_2OSO_3H$ | 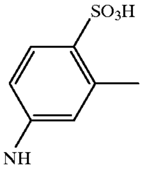 | 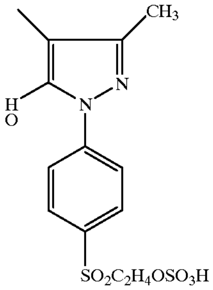 | m | reddish yellow |
| 13.10 | $CH_2CH_2$ | Cl | $CH_2CH_2OSO_3H$ | 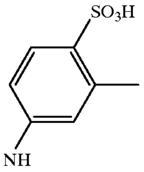 | 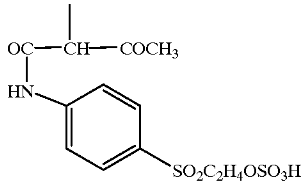 | p | greenish yellow |

EXAMPLE 14.1

85.1 g of the dye of the formula

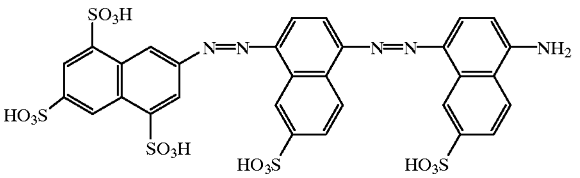

were initially charged in 750 ml of water at 0–5° C. and pH 5.5. 18.4 g of cyanuric chloride dissolved in 150 ml of acetone were then added dropwise while the pH was held within the range from 5.0 to 5.5 by addition of 5% strength by weight aqueous sodium bicarbonate solution.

After the reaction had ended, 50.5 g of the compound of the formula

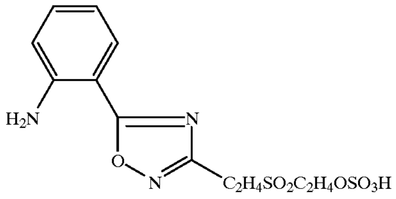

were added and the temperature was raised to 35–40° C. This was followed by stirring at 35–40° C. for 5 h during which the pH was held within the range from 5.5 to 6.0 using 5% strength by weight aqueous sodium bicarbonate solutution.

Precipitation with 200 g of sodium chloride, filtration with suction and drying was used to isolate the dye of the formula

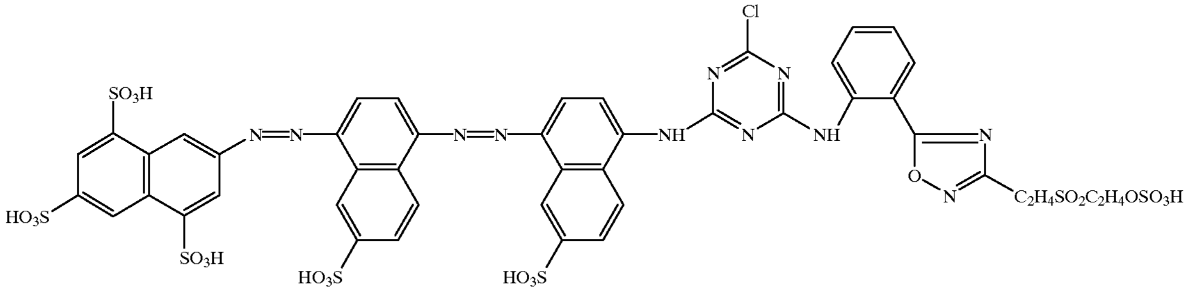
which dyes cotton on reddish brown shades by the methods customary for reactive dyes.
The dyes listed below in Table 14 are obtained in a similar manner.
TABLE 14
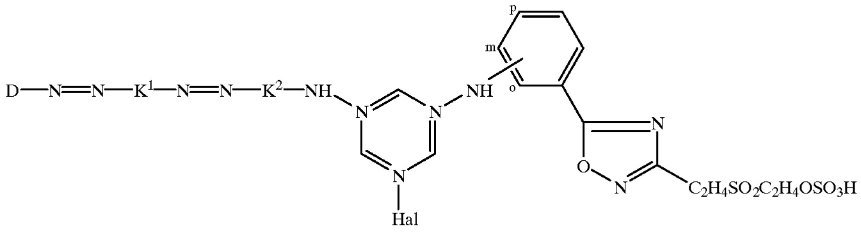
| Ex. No. | D | $K^1$ | $K^2$ | Hal | Pos | Hue |
|---|---|---|---|---|---|---|
| 14.2 | 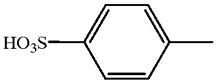 | 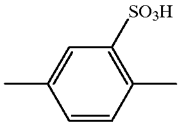 | 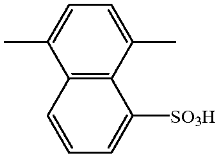 | Cl | o | yellowish brown |
| 14.3 | 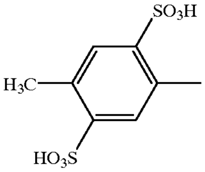 | 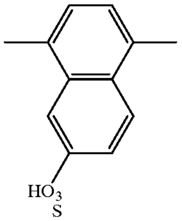 | 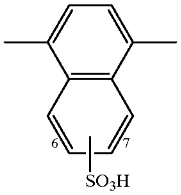 | Cl | o | reddish brown |
| 14.4 | 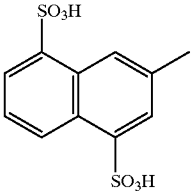 | 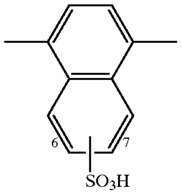 | 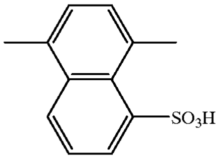 | F | p | reddish brown |
| 14.5 | 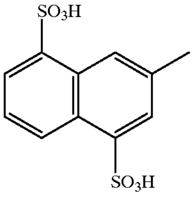 | 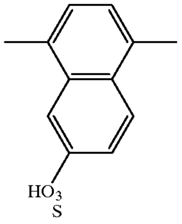 | 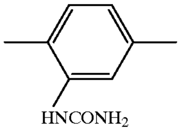 | Cl | o | reddish brown |

TABLE 14-continued

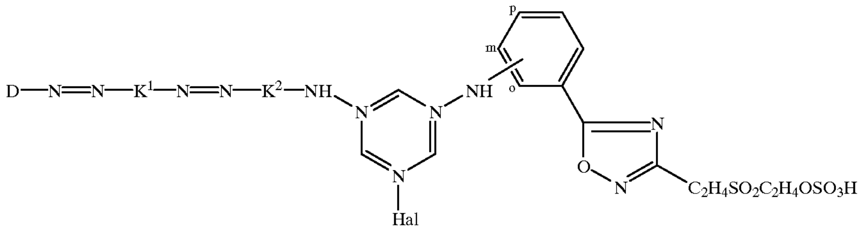

| Ex. No. | D | $K^1$ | $K^2$ | Hal | Pos | Hue |
|---|---|---|---|---|---|---|
| 14.6 | 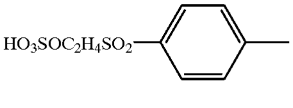 | 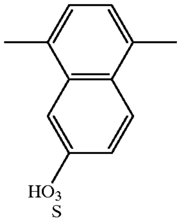 | 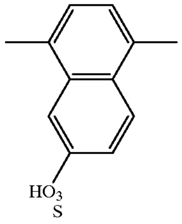 | Cl | o | reddish brown |
| 14.7 | 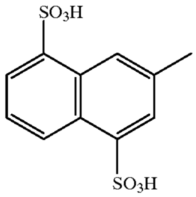 | 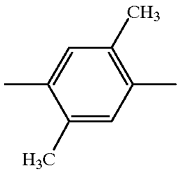 | 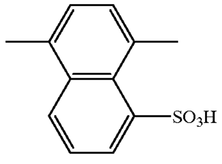 | Cl | o | yellowish brown |

EXAMPLE 15.1 a) 52.4 g of the compound of the formula

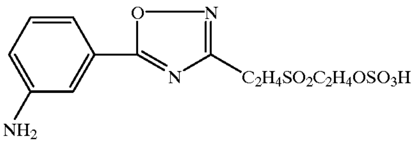

were diazotized similarly to Example 11.1 and admixed with 17.9 g of Cleve's acid dissolved in 100 ml of water under neutral conditions. The pH was then adjusted to 4.5–5.0 with saturated aqueous sodium acetate solution and the reaction mixture was subsequently stirred at room temperature for 24 h to effect complete coupling.

The pH was lowered with 18% strength by weight hydrochloric acid. After cooling down to 0–5° C., 30 ml of 3.33N aqueous sodium nitrite solution were added to effect diazotization as described in Example 11.1.

After diazotization was complete, another 17.9 g of Cleve's acid dissolved in 100 ml of water under neutral conditions were added. The pH was then raised to 4.0, and the reaction mixture was subsequently stirred at room temperature for 25 h to effect complete coupling.

Precipitation with ethanol, filtration with suction and drying under reduced pressure led to 80 g of electrolyte-comprising dye of the formula

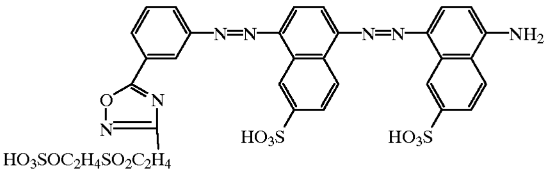

being obtained.

b) 83 g of the dye described under a) were reacted by the method of Example 13.1 with cyanuric chloride and the compound of the formula

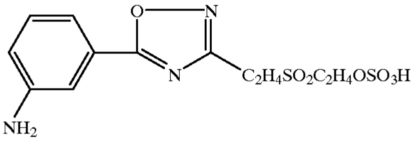

to form the dye of the formula

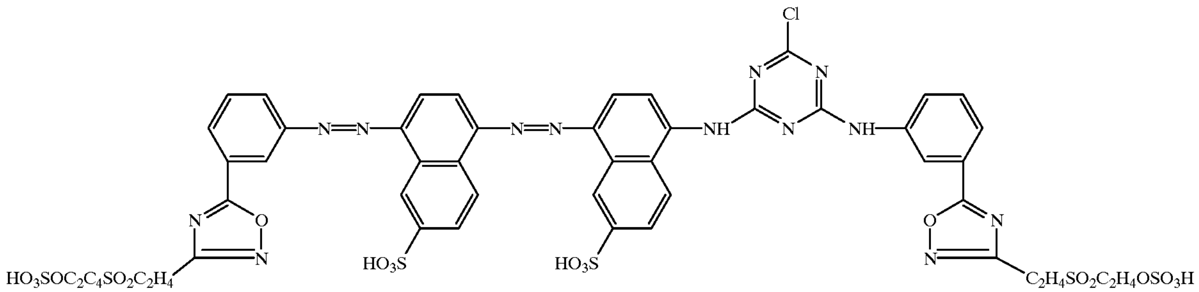
The dyes listed below in Table 15 are obtained similarly to Example 15.1.
TABLE 15
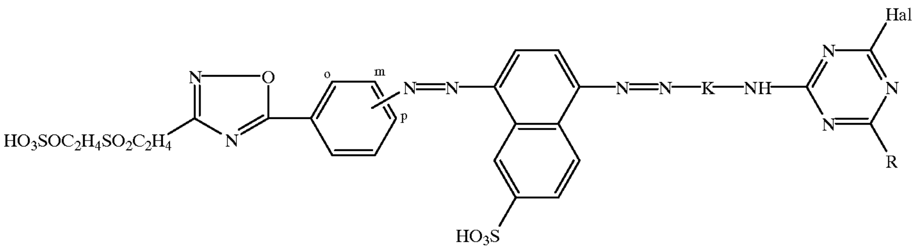
| Ex. No. | K | Hal | R | Pos | Hue |
|---|---|---|---|---|---|
| 15.2 | 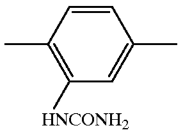 | Cl | 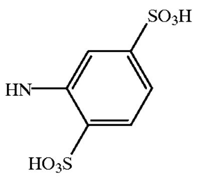 | o | brown |
| 15.3 | 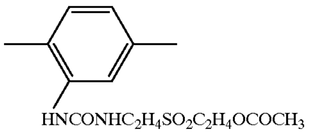 | Cl | 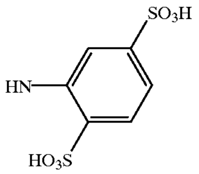 | o | brown |
| 15.4 | 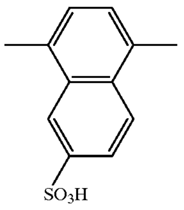 | F | 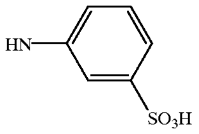 | P | brown |
| 15.5 | 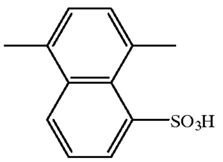 | Cl | 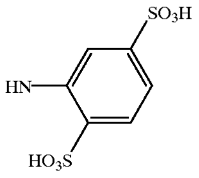 | o | brown |

TABLE 15-continued
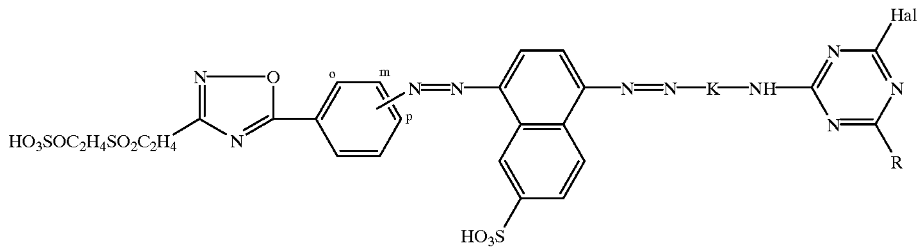
| Ex. No. | K | Hal | R | Pos | Hue |
|---|---|---|---|---|---|
| 15.6 | 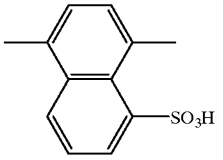 | Cl | 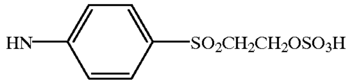 | m | brown |
| 15.7 | 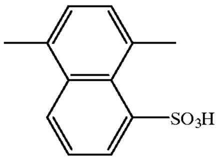 | Cl | 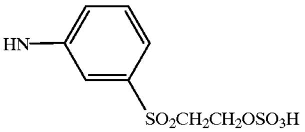 | m | brown |
EXAMPLE 16.1
To a suspension of 75 g of the dichlorotriazine dye of the formula
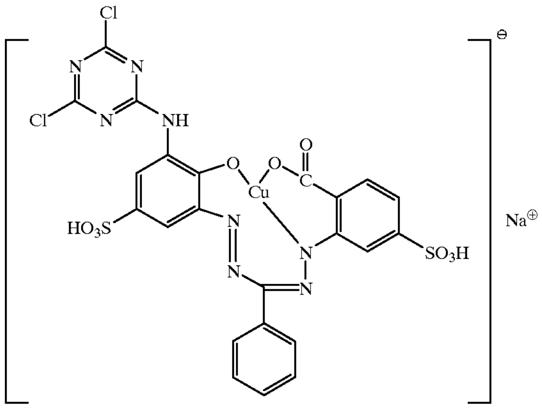
in 600 ml of water was added at pH 7 a solution of 41.4 g of the compound of the formula
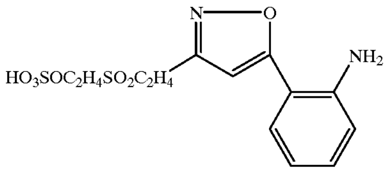
in 600 ml of water. The suspension was heated to 40–45° C., and the pH was held at the neutral point by addition of sodium bicqrbonate. After 2.5 h the resulting dye of the formula

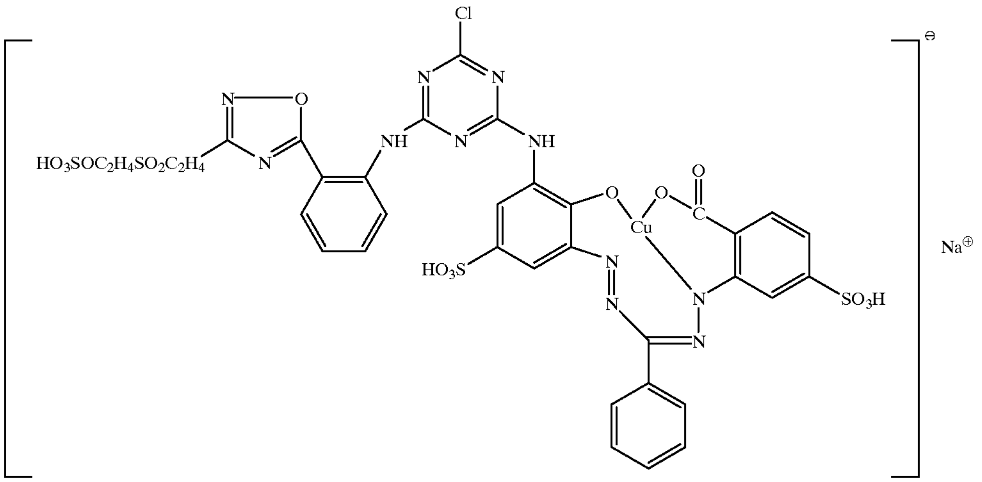

was salted out with 250 g of sodium chloride, filtered off dried. The dark dye powder obtained dyes cotton in a bright blue shade. The dyeings are light- and wetfast, and they have remarkable stability to oxidation effects.

The blue dyes listed below in Table 16 can be obtained similarly to Example 16.1.

TABLE 16

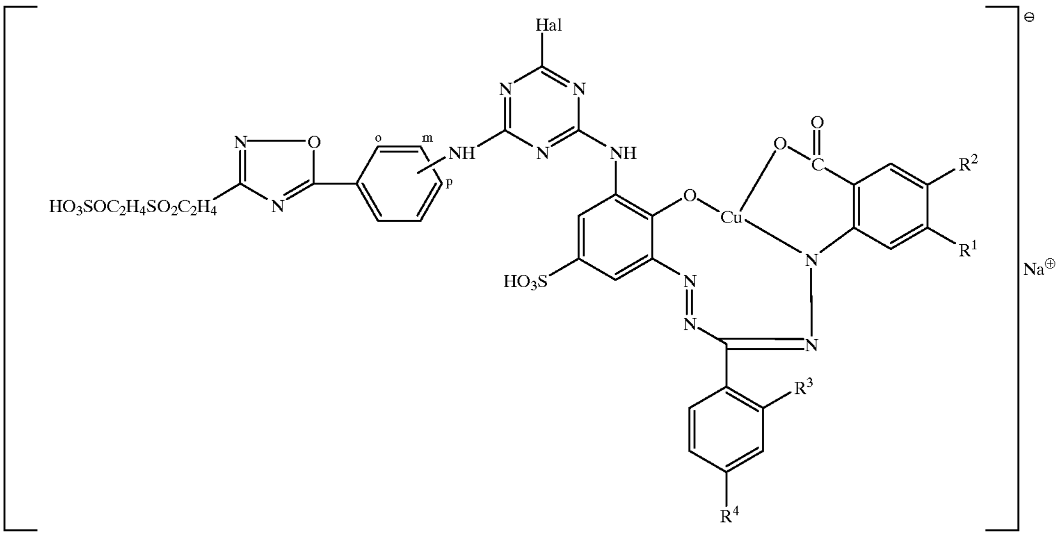

| Ex. No. | $R^1$ | $R^2$ | $R^3$ | $R^4$ | Hal | Pos |
|---|---|---|---|---|---|---|
| 16.2 | H | $SO_3H$ | H | H | F | o |
| 16.3 | $SO_3H$ | H | H | H | Cl | m |
| 16.4 | H | $SO_3H$ | $SO_3H$ | H | Cl | m |
| 16.5 | H | $SO_3H$ | H | $SO_2CH_2CH_2Cl$ | Cl | o |
| 16.6 | H | $NHCOCBr{=}CH_2$ | $SO_3H$ | H | Cl | o |
| 16.7 | H | $SO_2CH_2CH_2OSO_3H$ | $SO_3H$ | H | Cl | p |

EXAMPLE 17.1

19.1 g of the compound of the formula

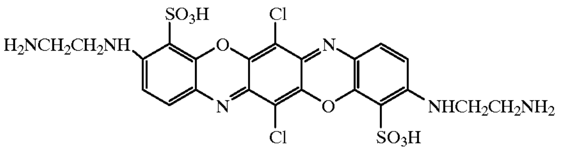

were stirred into 1000 ml of water while a pH of 10 was set with sodium hydroxide solution. The resulting solution was added drop-wise to a solution, adjusted to pH 6–8 and heated to 40–50° C., of the condensation product of 11.1 g of cyanuric chloride with 24.9 g of the compound of the formula

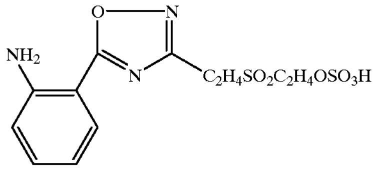

The mixture was stirred at 60° C. and a pH maintained at from 6.5 to 7 until the reaction had ended, which took about 1 h. After cooling to room temperature, the dye was salted out with 500 g of sodium chloride, filtered off with suction and dried. It dyes cotton in a brilliant blue shade having good fastness properties and conforms to the formula

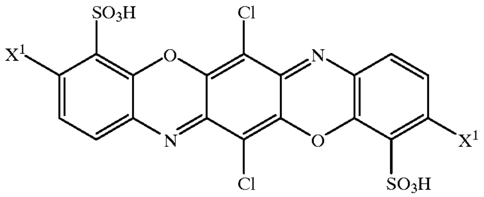

where $X^1$:

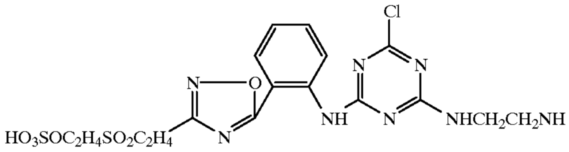

$\lambda_{max}$ (Water): 615 nm

Further dyes which are obtained in a similar manner are listed in Table 17.

TABLE 17

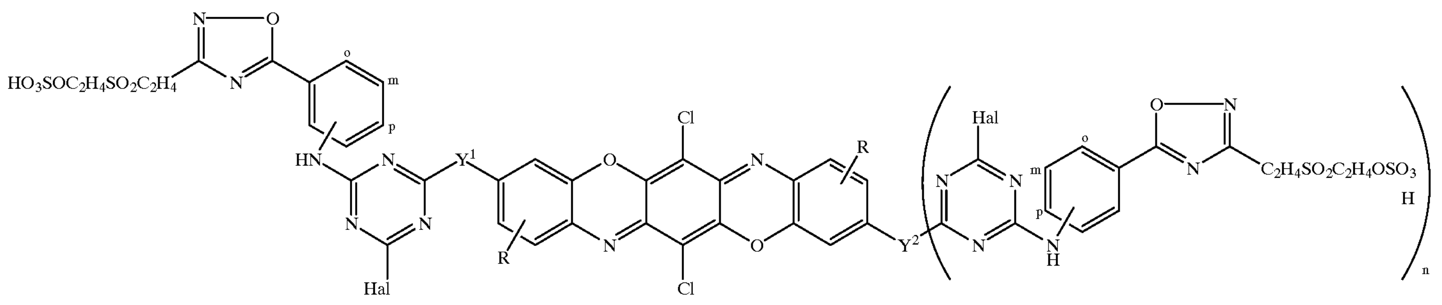

| Ex. No. | $Y^1$ | $Y^2$ | R | Hal | n | X | Pos | Hue |
|---|---|---|---|---|---|---|---|---|
| 17.2 | $HNCH_2CH_2NH$ | $Y^1$ | $SO_3H$ | F | 1 | $CH_2CH_2CH_2$ | o, o | blue |
| 17.3 | $HNCH_2CH_2NH$ | $Y^1$ | $SO_2CH_2CH_2OSO_3H$ | Cl | 1 | $CH_2CH_2$ | o, o | blue |
| 17.4 | 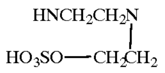 | $Y^1$ | $SO_2CH_2CH_2OSO_3H$ | Cl | 1 | $CH_2CH_2$ | m, m | blue |
| 17.5 | 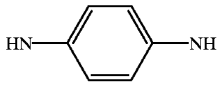 | $Y^1$ | $SO_3H$ | Cl | 1 | $CH_2CH_2$ | o, o | blue |
| 17.6 | $HNCH_2CH_2CH_2NH$ | $Y^1$ | $SO_3H$ | Cl | 1 | $CH_2CH_2$ | p, p | blue |
| 17.7 | $HNCH_2CH_2CH_2NH$ | $Y^1$ | $SO_3H$ | F | 1 | $CH_2CH_2$ | o, o | blue |
| 17.8 | $OCH_2CH_2NH$ | $Y^1$ | $SO_3H$ | Cl | 1 | $CH_2CH_2$ | o, o | red |
| 17.9 | 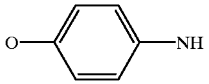 | $Y^1$ | $SO_3H$ | Cl | 1 | $CH_2CH_2$ | o, o | red |
| 17.10 | $HNCH_2CH_2CH_2NH$ | $Y^1$ | $SO_3H$ | F | 1 | $CH_2CH_2$ | o, o | blue |
| 17.11 | $HNCH_2CH_2CH_2NH$ | $NH_2$ | $SO_3H$ | Cl | 0 | $CH_2CH_2$ | m, m | blue |
| 17.12 | $HNCH_2CH_2CH_2NH$ | $NH_2$ | $SO_2CH_2CH_2OSO_3H$ | Cl | 0 | $CH_2CH_2$ | p, p | blue |
| 17.13 | $HNCH_2CH_2CH_2NH$ | 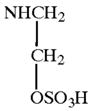 | $SO_2CH_2CH_2OSO_3H$ | Cl | 0 | $CH_2CH_2$ | o, o | blue |

EXAMPLE 18

In 400 ml of water, 42 g of bromamine acid, 58 g of the compound of the formula

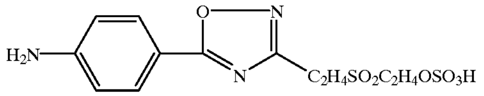

3 g of copper(I) chloride and 21 g of sodium bicarbonate were slowly heated to 50° C. and stirred at 50° C. for a further 5 h. The mixture was then cooled down to 5° C. and filtered with suction, and the filter residue was washed with 10% strength by weight aqueous sodium chloride solution. Drying under reduced pressure was used to isolate 60 g of the dye of the formula

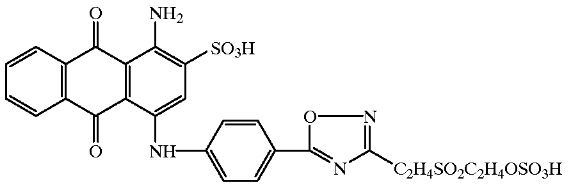

which dyes cotton in a brilliant blue shade.

EXAMPLE 19

25 g of copper phthalocyaninetetrasulfonyl chloride were suspended in 250 ml of ice-water. 39 g of the compound of the formula

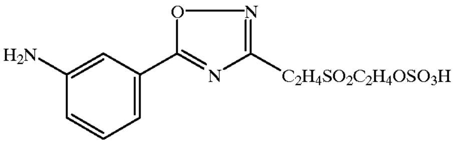

and 0.8 g of nicotinamide were added, and the pH was adjusted to 6.0–6.5 with 10% strength by weight aqueous sodium bicarbonate solution. The reaction mixture stirred at room temperature for 8 h during which the pH was held within the range from 6.0 to 6.5 by further addition of aqueous sodium bicarbonate solution. After clarification, the dye was precipitated by addition of acetone, filtered off with suction and dried, leaving 55 g of a dye of the formula

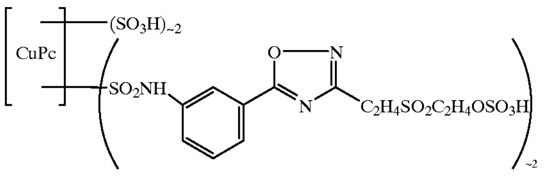

which dyes cotton in brilliant turquoise shades.

We claim:

1. A reactive dye of the formula I (I)

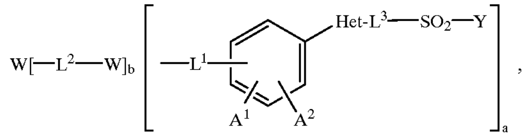

where a is 1 or 2, b is 0 or 1,

Y is vinyl or a radical of the formula $C_2H_4Q$, where Q is an alkali-detachable group, Het is the radical of a 5- or 6-membered aromatic heterocyclic ring having from 1 to 3 hetero atoms selected from the group consisting of oxygen, sulfur and nitrogen, W is either, in case 1) the radical of a coupling component, of a monoazo dye or additionally, when b=0, of a disazo dye, which may each bear further fiber-reactive groups, or in case 2) the radical of a chromophore which optionally has further fiber-reactive groups and is derived from an optionally metallized mono- or disazo dye, a triphendioxazine, an anthraquinone, a metallized formazan or a metallized phthalocyanine, $L^1$ is either, in case 1), an azo bridge or, in case 2), a bridge member of the formula $O_2S$—$NZ^1$, OC—$NZ^1$, $Z^1N$—$SO_2$, $Z^1N$—CO, $Z^1N$—CO—$NZ^2$, $NZ^1$ or

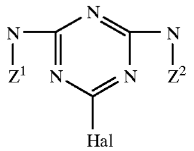

where $Z^1$ and $Z^2$ are independently of each other hydrogen, $C_1$–$C_6$-alkyl or phenyl and Hal is fluorine, chlorine or bromine, or $NZ^1$ or $NZ^2$ also represents 1,4-piperazinediyl, $L^2$ is a radical of the formula

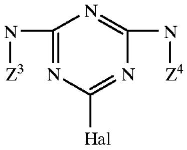

or

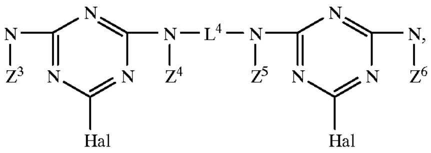

where $Z^3$, $Z^4$, $Z^5$ and $Z^6$ are each independently of the others hydrogen, $C_1$–$C_6$-alkyl or phenyl, $L^4$ is $C_2$–$C_8$-alkylene or unsubstituted or $C_1$–$C_4$-alkyl-, $C_1$–$C_4$-alkoxy- or hydroxysulfonyl-substituted phenylene, and Hal is in each case as defined above, $L^3$ is a direct bond or $C_1$–$C_6$-alkylene with or without interruption by 1 or 2 oxygen or sulfur atoms in ether function or 1 or 2 unadjacent imino, $C_1$–$C_4$-alkylimino or $C_1$–$C_4$-alkanoylimino groups, and $A^1$ and $A^2$ are independently of each other hydrogen, $C_1$–$C_4$-alkyl, $C_1$–$C_4$-alkoxy, halogen, nitro, amino, hydroxysulfonyl or a radical of the formula $L^3$—$SO_2$—Y, where $L^3$ and Y are each as defined above.

2. The reactive dye as claimed in claim 1, wherein $L^3$ is $C_1$–$C_4$-alkylene with or without interruption by one oxygen atom in ether function.

3. The reactive dye as claimed in claim 1, wherein $A^1$ and $A^2$ are independently of each other hydrogen, nitro, amino, hydroxysulfonyl or a radical of the formula $SO_2C_2H_4OSO_3H$.

4. The reactive dye as claimed in claim 1, wherein Het is derived from 1,2,4-oxadiazole, 1,3,4-oxadiazole, 1,2,4-thiadiazole or 1,3,4-thiadiazole.

5. The reactive dye as claimed in claim 1, wherein Het is 1,2,4-oxadiazole-3,5-diyl.

6. The reactive dye as claimed in claim 1, wherein $L^1$ is a bridge member of the formula

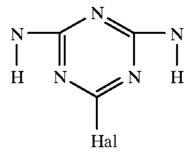

in case 2).

7. The reactive dye as claimed in claim 1, wherein $L^1$ is ortho-disposed to the heterocycle in case 1).

8. A process for dyeing or printing hydroxyl-containing or nitrogenous substrates comprising applying to said substrate a reactive dye according to claim 1.

* * * * *